(12) United States Patent
Takaishi et al.

(10) Patent No.: US 7,136,256 B2
(45) Date of Patent: Nov. 14, 2006

(54) HEAD POSITIONING CONTROL METHOD FOR A STORAGE DEVICE AND HEAD POSITIONING CONTROL DEVICE

(75) Inventors: Kazuhiko Takaishi, Kawasaki (JP); Shunji Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/168,738

(22) Filed: Jun. 28, 2005

(65) Prior Publication Data

US 2006/0007592 A1 Jan. 12, 2006

Related U.S. Application Data

(62) Division of application No. 09/713,578, filed on Nov. 16, 2000, now Pat. No. 6,995,944.

(30) Foreign Application Priority Data

Nov. 17, 1999 (JP) ............................ 11-327169
Oct. 20, 2000 (JP) ............................ 2000-321037

(51) Int. Cl.
*G11B 5/55* (2006.01)

(52) U.S. Cl. .............................. 360/78.04; 360/78.07; 360/78.09

(58) Field of Classification Search ................. None
See application file for complete search history.

(56) References Cited

U.S. PATENT DOCUMENTS

| | | |
|---|---|---|
| 4,894,599 A | 1/1990 | Ottesen et al. |
| 5,111,124 A | 5/1992 | Kurosawa |
| 5,126,897 A | 6/1992 | Ogawa et al. ........... 360/78.06 |
| 5,150,266 A | 9/1992 | Albert |
| 5,381,282 A | 1/1995 | Arai et al. |
| 5,459,624 A * | 10/1995 | Erickson et al. ......... 360/78.04 |
| 5,680,271 A | 10/1997 | Yatsu |
| 5,859,742 A | 1/1999 | Takaishi ................. 360/78.01 |
| 6,140,791 A * | 10/2000 | Zhang ....................... 318/632 |
| 6,166,876 A | 12/2000 | Liu ........................ 360/78.04 |

(Continued)

FOREIGN PATENT DOCUMENTS

JP 2-265079 A 10/1990

(Continued)

OTHER PUBLICATIONS

Machine Translation of JP7-57414, obtained via Internet on Jan. 29, 2006 from JPO website, 5 pages.*

*Primary Examiner*—Hoa T. Nguyen
*Assistant Examiner*—James L Habermehl
(74) *Attorney, Agent, or Firm*—Greer, Burns & Crain, Ltd.

(57) ABSTRACT

A head positioning method and device positions a head which reads a disk-type storage medium at a specified location, and accurately estimates a bias value during settling control. A disk device includes a disk medium, a head, an actuator, and a control circuit, and settling control is performed based on a detected position after coarse control without integral compensation or bias compensation having been performed. The position of the head for a next sample is estimated, and an initial bias value is estimated from the difference between the detected position and the estimated position. This initial bias value is then used to perform settling control together with integral compensation of bias compensation. Since the accurate initial bias value at the start of settling is estimated, it is possible to reduce the time for correcting the shift in the bias during settling control, and greatly reduce the time required for settling control.

12 Claims, 47 Drawing Sheets

U.S. PATENT DOCUMENTS

| | | |
|---|---|---|
| 6,429,996 B1 | 8/2002 | Iwashiro |
| 6,545,838 B1 * | 4/2003 | Burton ............... 360/78.06 |
| 6,590,735 B1 * | 7/2003 | Brittner et al. ......... 360/78.07 |

FOREIGN PATENT DOCUMENTS

| | | |
|---|---|---|
| JP | 3-288913 | 12/1991 |
| JP | 5-165528 A | 7/1993 |
| JP | 5-274040 A | 10/1993 |
| JP | 06139729 A | 5/1994 |
| JP | 7-57414 | 3/1995 |
| JP | 07192412 | 7/1995 |
| JP | 08255023 A | 10/1996 |
| JP | 08329630 A | 12/1996 |
| JP | 09139032 A | 5/1997 |
| JP | 10125020 A | 5/1998 |
| WO | WO99/44194 | 9/1999 |

* cited by examiner

Relation bias and position offset

Rectangular wave

Rectangular wave

HEAD POSITIONING CONTROL METHOD FOR A STORAGE DEVICE AND HEAD POSITIONING CONTROL DEVICE

This is a Divisional of parent application Ser. No. 09/713,578, filed Nov. 16, 2000, now U.S. Pat. No. 6,995,944.

BACKGROUND OF THE INVENTION

1. Field of the Invention

This invention relates a head positioning control method and a head positioning control device for positioning a head at a target position of a storage medium, and particularly to a head positioning control method and a head positioning control device for reducing the seek time.

2. Description of the Related Art

Disk devices that have a head for reading disk-type storage medium are widely used. For example the magnetic disk drives used as a storage devices for computers comprise a magnetic disk, a spindle motor for rotating the magnetic disk, a head for reading from and writing to the magnetic disk, and a VCM actuator for positioning the head on a track of the magnetic disk. The storage density of these kinds of disk drives is rapidly increasing, as well as is the track density of the magnetic disks. Therefore, it is necessary to perform high-precision positioning at high velocity.

When a read or write command is received from the computer, the disk drive moves the magnetic head from its current position to the target position. This is called the seek operation. This seek operation is transition operation which moves from coarse control to following control by way of settling control.

Coarse control controls the velocity to the target position. Coarse control comprises velocity control, PD control, or observer control that does not include steady-state bias estimation. There is no integral element (integral compensation or bias compensation) included in the control system. Coarse control switches the control mode among acceleration, constant velocity and deceleration. In the acceleration mode, current flows to increase the velocity. In the constant-velocity mode, the current is '0' or a previously measured bias compensation current flows, to keep the velocity constant. In the deceleration mode, the current flows in the opposite direction of the current during acceleration, to bring the velocity to almost zero near the target position. When the distance is very short, the constant-velocity mode is eliminated.

Following control controls the magnetic head so that it follows the target position. Following control comprises PID control, PI×Lead Lag, or observer control that includes steady-state bias estimation. This control is characterized by there being an integral element (integral compensation or bias compensation) included in the control system. Settling control is the control mode that connects coarse control with following control. In settling control, there may be an integral element in the control system.

The average time required for this seek operation for a 2.5-inch HDD is on the order of 10 of milliseconds. As the time required for coarse control is determined according to the distance of movement, and the maximum current value of the power amp, it is difficult to reduce this time. In order to reduce the seek time, it is necessary to reduce the time required for settling control and short distance seek.

The following prior method has been proposed for shortening this settling time.

First, a steady-state bias (external force) applied to the actuator influences the settling time. In other words, the actuator is applied constantly a steady-state bias (external force) from an external. To output the head signal from the actuator, a flexible cable (FPC) is provided to the actuator. This FPC shows spring-like characteristics. Moreover, as the disk rotates, the wind that is generated is applied to the actuator. These external forces also affect the friction and grease condition of the actuator bearings. The bias of the actuator due to these causes changes depending on the position of the head. When this bias value is not corrected, the settling time becomes long.

Therefore, in the prior art, an average bias value is measured beforehand for each position and stored in a table, then the value from the bias table, Bias Table (y[k]), that corresponds to the detection position y(k) is read and the instruction current value u(k) is corrected. (Disclosed for example in Japanese Unexamined published patent No. H2-232875 and H11-25623)

In addition, since the bias value fluctuates, a method of estimating the shift in this bias value during settling time, and correcting the instruction current value is also known. This shift is corrected by an integrator or a bias estimator in the control loop. When using an observer control system, a method of setting the current position and velocity as the initial observer value at the start of settling, and setting the estimated bias value to '0' is performed. The reason for initializing the estimated bias value to '0' is because the shift in the bias value is not known at the beginning of settling, so it is set to '0'. In this method, the current output is the sum of the status feedback current and the pre-measured bias value from the table, so the estimated bias value gradually converges according to the status feedback response, and so the position also converges to the target position.

Second, it has been attempted to shorten the settling time by changing the response characteristics of the feedback during settling control. For example, there is the method of setting the gain of the integrator in the loop to '0' or decreasing it during settling control (as disclosed in Japanese unexamined published patent No. H2-278582), or the method of increasing the gain in the loop during settling control (as disclosed in Japanese Unexamined published patent No. H7-153211 and H1-133272).

Moreover, it has been proposed to use feed-forward control in settling control and short-distance seeking, in which a feed-forward current is made to flow for correcting the position offset on the target trajectory, and thus making it possible to shorten the time required for settling control and short-distance seek. For example, this is proposed in Japanese unexamined published patent No. H9-139032 or in the technical report 'Fast Seek Control Taming Actuator Vibrations for Magnetic Disk Drives' (IEEE Intermag 99).

However, in the prior art, there are the following problems. FIG. 56 shows the characteristics of the steady-state bias.

(1) As shown in FIG. 56, the steady-state bias value not only changes depending on the position of the head, but that bias value also differs, even for the same track, depending on the where the head was located in the past. In other words, as shown in FIG. 56, it has hysteresis characteristics. Therefore, in the prior method of using a bias table of average bias values, the shift in bias values is large. For example, for a 2.5-inch HDD, there is 1 to 3 mA error. Since this error cannot be estimated in advance, correction is not possible. Therefore, in a feedback control system in settling control, there must be time to correct this shift in bias value, and so there is the problem of not being able to shorten the settling time.

(2) Moreover, in the prior method of using a bias estimator, this shift in the bias value is estimated and corrected. However, since the bias estimate at the beginning of settling is not known, the initial bias estimate value is set to '0'. Therefore, it takes time for the estimated bias value to converge to the correct value. Also, during this time to convergence, there is a shift in bias value, so as a result of estimating and correcting for shift, overshooting or undershooting occurs. Therefore, it takes time to correctly estimate the bias value, and so there was the problem of not being able to shorten the settling time.

(3) Furthermore, in the prior method of changing the response characteristics during settling control, the dynamic characteristics of the feedback control system are improved, however the position error increased and position offset occurred, making it impossible to shorten the settling time. Also, since it is necessary to correct the shift in the bias value, there is the problem of not being able to shorten the settling time.

(4) In the feed-forward control, the velocity at the start of feed-forward is not considered and is assumed, for example, to be zero. In addition, the prior idea is thought that the velocity error could be suppressed by feedback control. However, the track width becomes more narrow and it is not possible to ignore the effect on the velocity even when there is only small external vibration. When the velocity is large, there is the problem that it takes time for convergence, and it is difficult for the velocity error to be restored within the target time. The effect of this velocity error is especially large during short-distance seek, and in normal feedback control the convergence time is approximately 2 to 3 ms. For short-distance seek, it takes 1 ms or less to seek one track, for example, so there is the problem that the effect of velocity error is large, and that it is not possible to shorten the convergence time.

SUMMARY OF THE INVENTION

The objective of this invention is to provide a head positioning control method and a head positioning control device for shortening the seek time.

Moreover, another objective of this invention is to provide a head positioning control method and a head positioning control device that make it possible to more quickly and accurately estimate the steady-state bias and to reduce the settling time.

Another objective of this invention is to provide a head positioning control method and a head positioning control device that make it possible to more quickly and accurately estimate the steady-state bias and reduce the fluctuations in settling time.

A further objective of this invention is to provide a head positioning control method and a head positioning control device for controlling feed forward during settling control, and for shortening the settling time.

Yet a further objective of this invention is to provide a head positioning control method and a head positioning control device for supplying a target trajectory that corresponds to the initial velocity and initial position, and performing a high-speed seek operation.

In order to accomplish these objectives, one form of the head positioning control method for a disk device of this invention comprises: a step of performing coarse control without performing integral compensation or bias compensation based on the current position of the head; a step of estimating the position of the head for the next sample, and estimating the initial bias value from the difference between the detected position and the estimated position; and a step of performing settling control together with integral compensation or bias compensation by using the estimated initial bias value.

One form of the head positioning control device for a disk device of this invention comprises: a detection means for detecting a current position of the head; and a control means for performing settling control of an actuator based on the detected position, after performing coarse control without integral compensation or bias compensation. The control means estimate the position of the head for the next sample, and estimates the initial bias value from the difference between the detected position and the estimated position, and use the initial bias value to perform settling control together with integral compensation or bias compensation.

In the prior settling control method, it is not possible to avoid the effect on the shift in the steady-state bias. In other words, since the bias values has differing values for the same target position, it is not possible to avoid the effect on the shift of the steady-state bias. To solve this problem, it is necessary to accurately estimate the bias value at the start of settling.

In control where integral compensation or bias compensation is not performed, the difference between the detected position and estimated position is proportional to the bias value, so this invention estimates the initial bias value at the start of settling from the difference between the detected position and estimated position in control where integral compensation or bias compensation is not performed. Therefore, even when there are differing bias values for the same target position, the initial bias value for settling control, in which integral compensation or bias compensation are performed, is accurately set. In this way, since it is possible to reduce the time for correcting the bias shift during settling control, it is also possible to greatly reduce the time required for settling control.

It is also possible to prevent variations in seek time since the bias value for settling control, in which integral compensation or bias compensation are performed, is accurately set.

In another form of the head positioning control method of this invention, the step of performing settling control comprises a step of supplying at least one of the target trace or feed forward current, that are proportional to the initial position or initial velocity at the start of settling, to the control system that performs settling control.

In another form of the head positioning control device of this invention, the control means supply the target trace or feed forward current, that are proportional to the initial position or initial velocity at the start of settling, to the control system that performs settling control.

In this form of the invention, feed forward control is used during settling control. In the prior art, since only feedback control is used, it is not possible to speed up the response. In this form of the invention, the response time is positively reduced by feed forward control. However, it is not possible to reduce the time by feed forward control alone. In this form of the invention, the settling time is reduced by generating at least a target trace or feed forward current, that is proportional to the initial position or initial velocity during settling.

In another form of the head positioning control method of this invention, the step of performing settling control performs settling control by observer control. Observer control can accurately predict the control object, or in other words, the movement of the actuator, and can estimate the unobservable velocity. In addition, status feedback control is possible, and it is possible to design the pole arrangement of closed-loop characteristics. Also, by using observer control for the settling control, high-precision feedback control becomes possible, and it is effective in reducing the settling time.

In another form of the invention, the head position control method of a disk device for positioning the head at a specified position on the disk comprises: a step of generating a position trajectory and feed-forward current based on a current position and current velocity of the head; and a step of supplying the position trajectory and feed-forward current to the feedback control system that calculates the amount of control from the position error between the current position of the head and the target position.

The head positioning control device of a disk device, that drives an actuator of another form of the invention for positioning the head at a specified position on the disk, comprises a detection means for detecting the current position of the head; and a control means for performing seek control of the actuator based on the detected position; in which the control means generates a position trajectory and feed-forward current based on the current position and velocity of the head, and supplies the position trajectory and feed-forward current to the feedback control system that calculates the amount of control from the position error between the current position of the head and the target position.

In this form of the invention, feed-forward control is used during short-distance seeking and settling control so high-speed response becomes possible. In addition, since the initial velocity is also used as a parameter for trajectory generation together with the initial position, feed-forward control, that is capable of shortening the convergence time, is possible even though the initial velocity is different.

In the position control method of this invention, it is desirable for the supply step to comprise a correction step of correcting the position error by the position trajectory; and a step of adding the feed-forward current to the amount of control that is calculated by the feedback control system from the corrected position error, and by doing so an effective high-speed response is possible.

Furthermore, in the position control method of this invention, it is desirable for the generation step to be a step that is executed during relatively short-distance seeking or during settling control in relatively long-distance seeking.

DESCRIPTION OF THE PREFERRED EMBODIMENTS

The embodiments of this invention will be explained by dividing them into the disk device, positioning control system, positioning control process, example of bias estimation, positioning control for another embodiment, positioning control for a further embodiment, trajectory generation method, example of trajectory control, and another embodiment.

Disk Device

Figure 1:
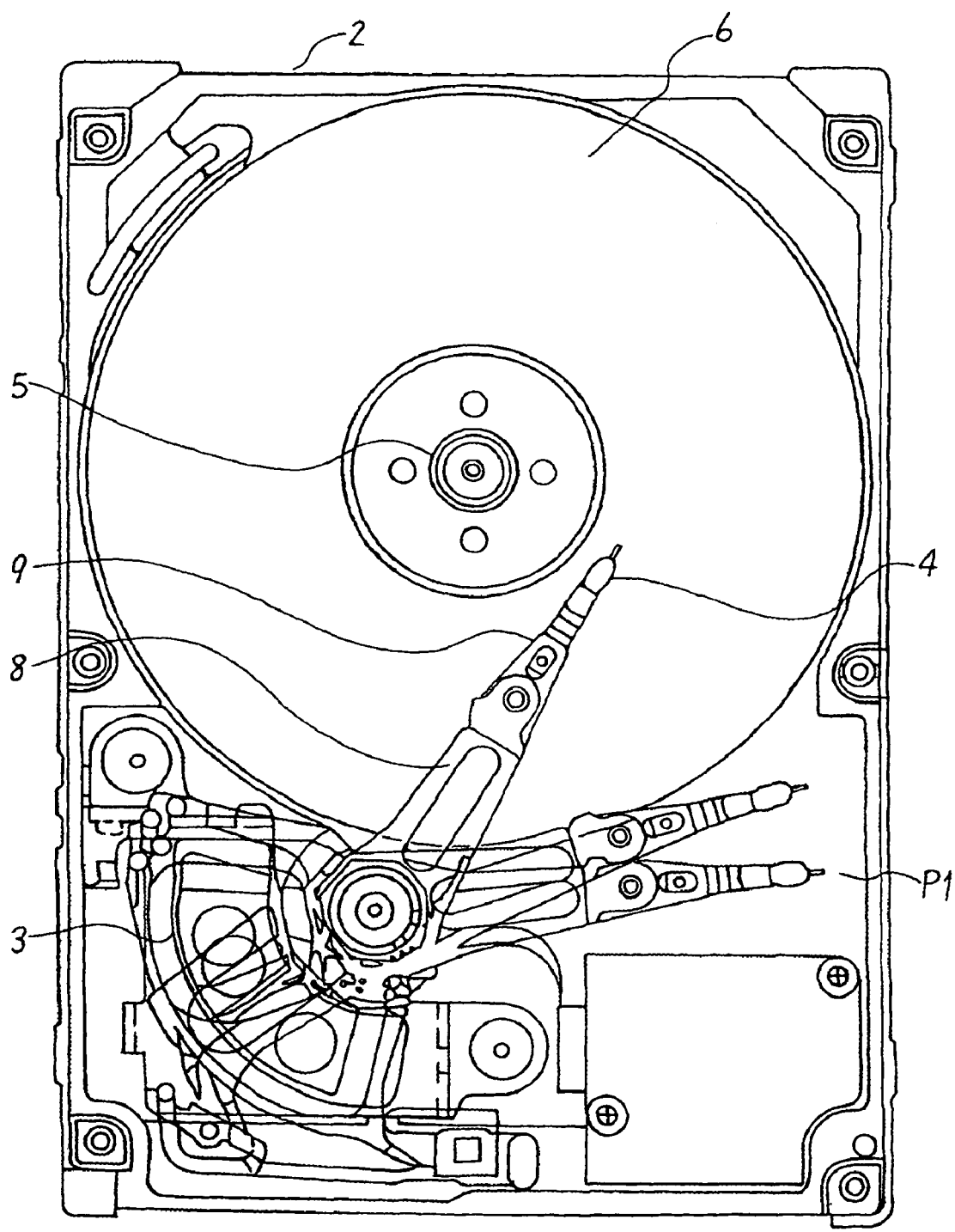
FIG. 1 is a top view of the disk drive of an embodiment of the invention.
Figure 2:
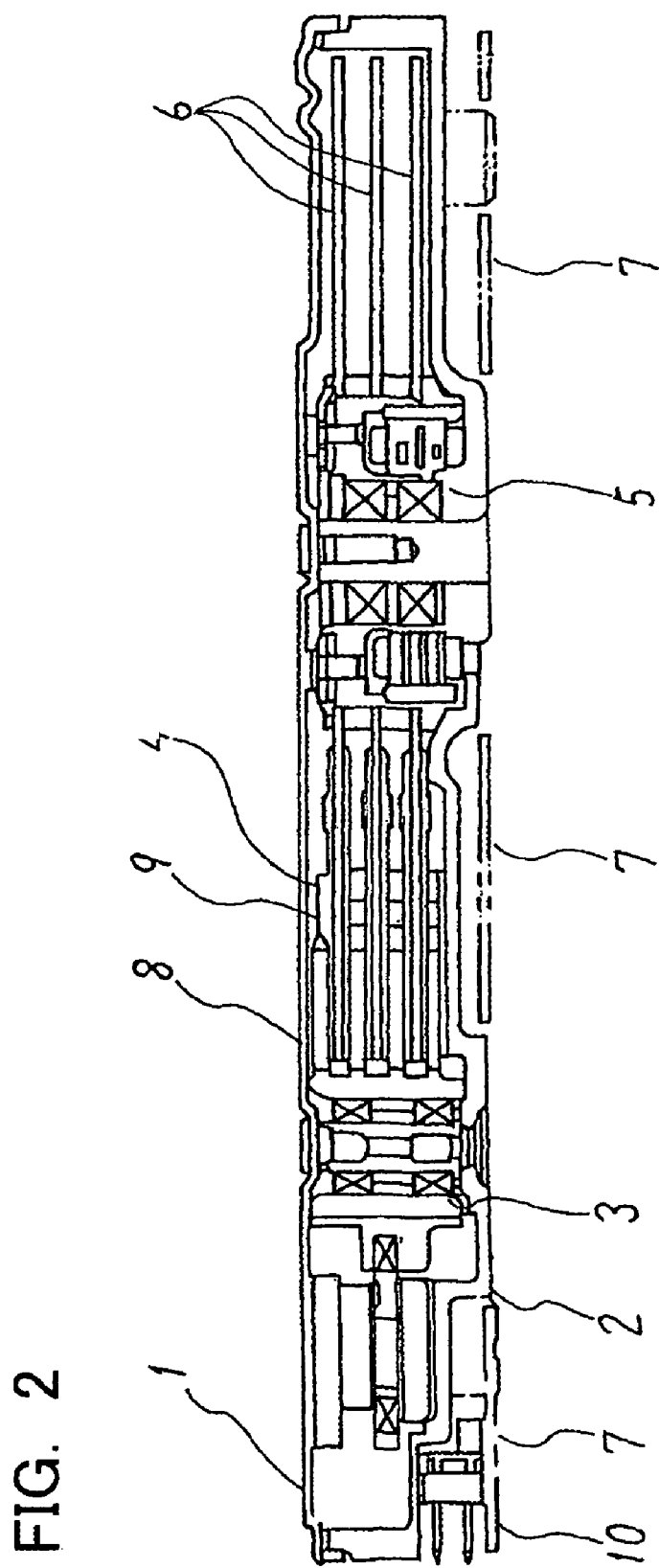
FIG. 2 is a cross-sectional view of the disk drive in FIG. 1.

FIG. 1 is a top view of the disk device of an embodiment of the invention, and FIG. 2 is a cross-sectional view of that disk device. In this example, a hard disk drive is used as the storage device.

As shown in FIG. 1 and FIG. 2, magnetic disks 6 are such that they form storage layers on a substrate (disk plate). The size of the magnetic disks 6 is 2.5 inches, and there are three disks inside the drive. A spindle motor 5 supports and rotates the magnetic disks 6. A magnetic head 4 is located on the actuator. The actuator comprises a rotary-type VCM (voice coil motor) 3, arm 8 and flexure (suspension) 9. The magnetic head 4 is attached to the tip of the flexure 9.

The magnetic head 4 reads and writes data from and on the magnetic disks 6. The actuator 3 positions the magnetic head 4 at a desired track on the magnetic disks 6. The actuator 3 and spindle motor 5 are located on a drive base 2. A cover 1 covers the drive base 2 and separates the internal working of the drive from the outside. A printed circuit board 7 is located under the drive base 2, and it contains circuits for controlling the drive. A connector 10 is also located under the drive base 2 and connects the control circuits with the outside.

This drive is compact with dimensions of about 90 mm (Horizontal)×63 mm (Vertical)×10 mm (Width). It is used as the internal disk drive of a personal computer.

Figure 3:
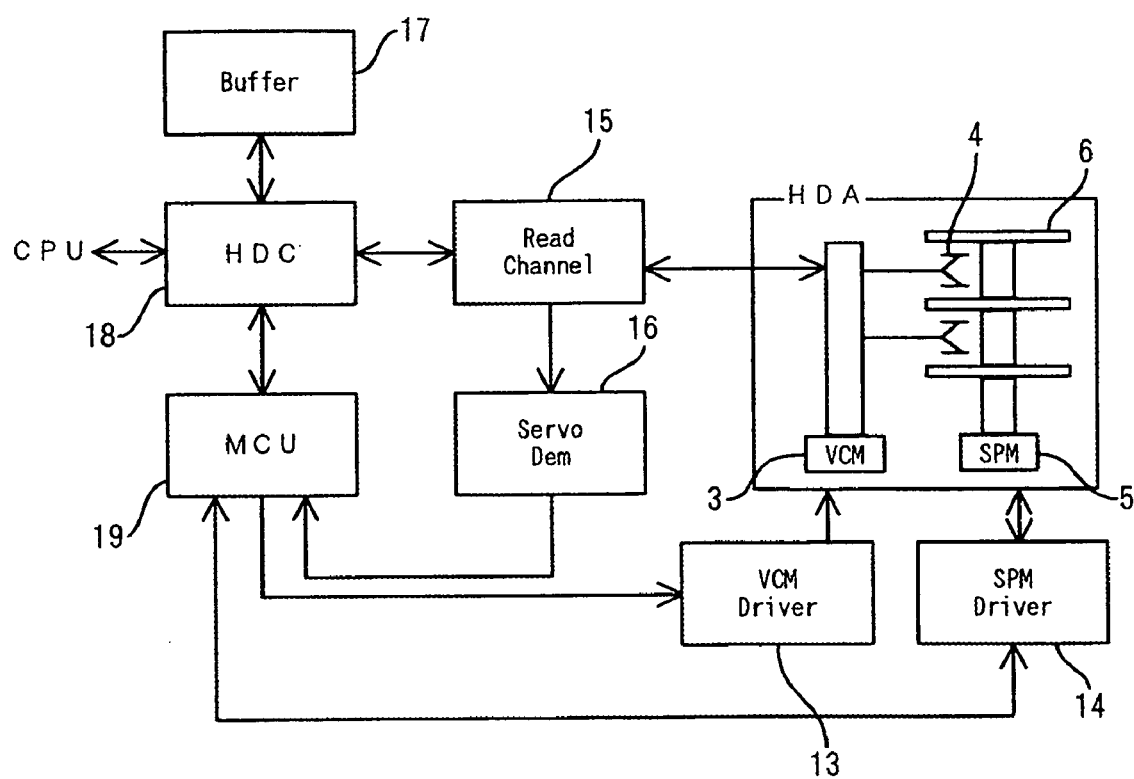
FIG. 3 is a block diagram of the disk drive in FIG. 1.

FIG. 3 is a block diagram of the control circuits on the printed circuit board 7 and in the drive. A HDC (hard disk controller) 18 receives commands from the host CPU and generates internal magnetic disk drive control signals for controlling the interface with the host CPU such as receiving data, and for controlling the read/write format of the magnetic disk medium 6. A buffer 17 is used for temporarily storing write data from the host CPU and for temporarily storing the data read from the magnetic disk 6.

A MCU (micro controller) 19 comprises a microprocessor (MPU), DA converter and AD converter. The MCU (called the MPU below) 19 performs servo controls for positioning the magnetic head 4. The MPU 19 executes the program stored in memory, detects the position signal from the servo demodulation circuit 16, and controls the VCM control current of the actuator 3 for positioning. Furthermore, the MPU 19 controls the drive current for the SPM drive circuit 14.

The VCM drive circuit 13 comprises a power amp for flowing drive current to the VCM (voice coil motor) 3. The SPM drive circuit 14 comprises a power amp for flowing drive current to the spindle motor (SPM) 5 that rotates the magnetic disk 6.

A read channel 15 is the circuit for reading and writing. The read channel 15 comprises a modulation circuit for writing the write data from the host CPU to the magnetic disk medium 6, a parallel-to-serial conversion circuit, a demodulation circuit for reading data from the magnetic disk medium 6 and a serial-to-parallel conversion circuit. The servo demodulation circuit 16 is a circuit for demodulating the servo pattern written to the magnetic disk medium 6, and comprises a peak hold circuit and an integrating circuit.

It is not shown in the figures, however in the drive HDA there is a head IC that comprises a writing amp that supplies current to the magnetic head 4 for writing, and a preamp for amplifying the read voltage from the magnetic head 4.

Here an example of a magnetic disk drive is explained as the disk device, however, it is also possible to use an optical disk drive such as a DVD or MO, a magnetic card device or an optical card device. Here a device capable of reading and writing is shown, however a read-only device (reproduction device) could also be used.

[Positioning Control System]

Next, the positioning control system executed by the MPU 19 is explained.

Figure 4:
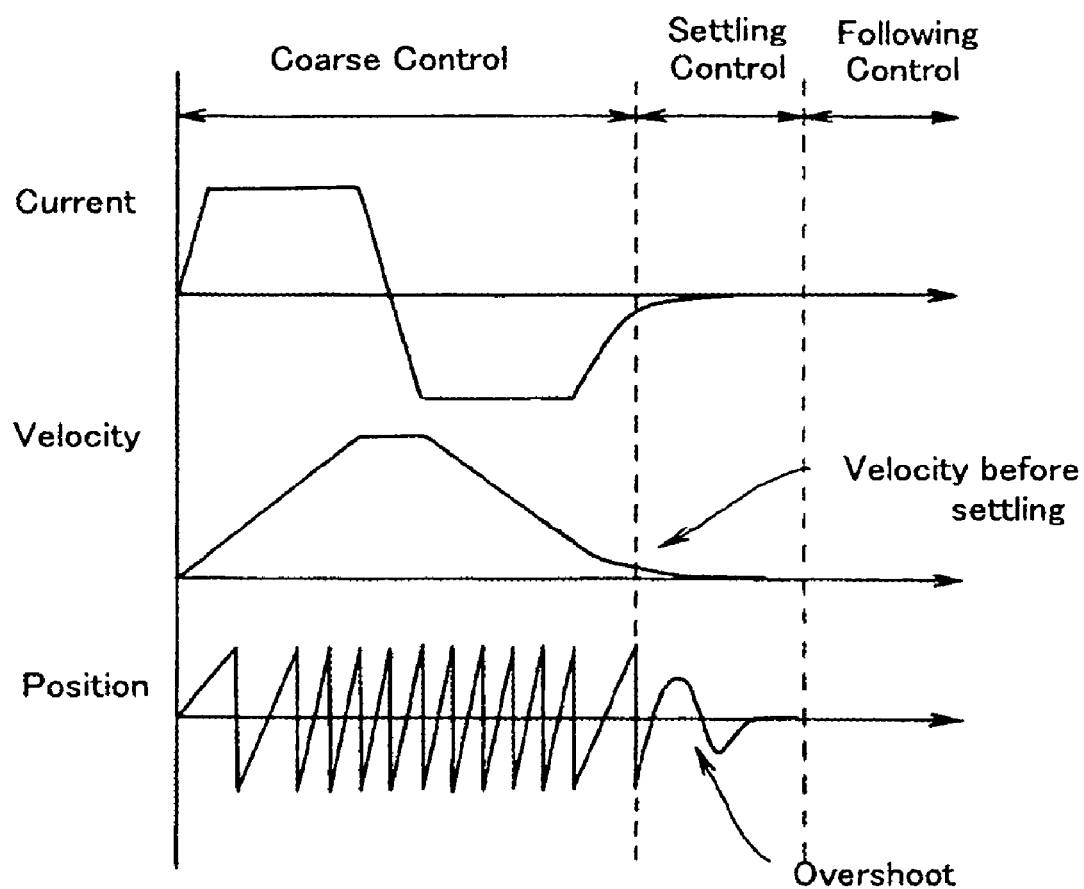
FIG. 4 is drawing showing the transition of the seek operation of an embodiment of the invention.
Figure 5:
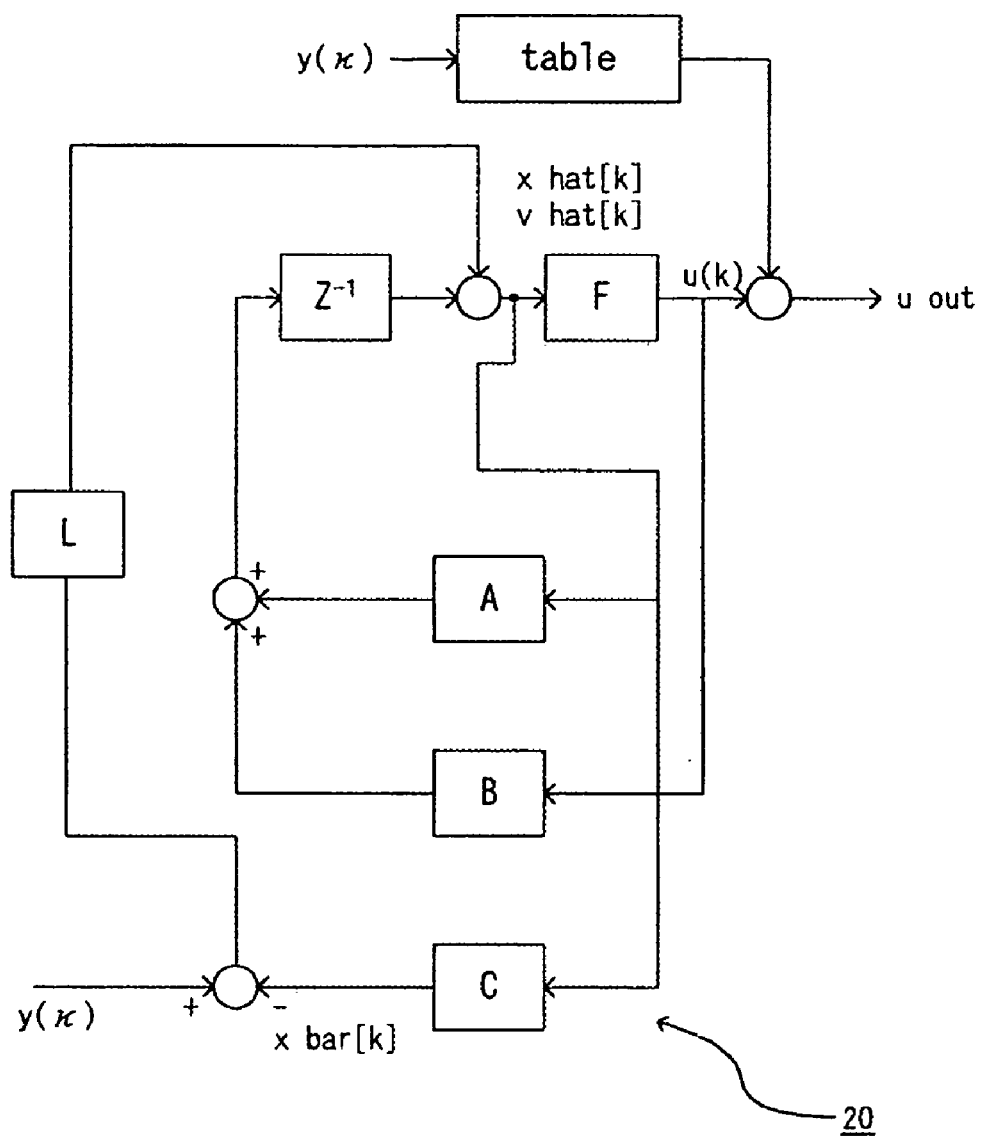
FIG. 5 is a drawing of a model of the observer control of an embodiment of the invention.

FIG. 4 is drawing showing the transition of the seek operation, and FIG. 5 is a drawing of a model of the observer.

As shown in FIG. 4, the seek operation is the transition between coarse control, settling control, and following control. Coarse control controls the velocity to the target position. Coarse control comprises velocity control, PD control or observer control that does not include steady-state bias estimation. There is no integrating element (integral compensation or bias compensation) included in the control system. The unit for velocity in the SI unit system is meters/sec. However, in the case of a disk drive, the unit for reading or writing data is tracks, so the velocity is expressed as the number of tracks per sample, tracks/sample.

As shown in FIG. 4, coarse control switches the control mode among acceleration, constant velocity, and deceleration. In the acceleration mode, current flows to increase the velocity. In the constant-velocity mode, the current is '0' or a previously measured bias compensation current flows, to keep the velocity constant. In the deceleration mode, the current flows in the opposite direction of the current during acceleration, to bring the velocity to almost zero near the target position. When the distance is very short, the constant-velocity mode is eliminated.

Following control controls the magnetic head 4 so that it follows the target position. Following control comprises PID control, PI×Lead Lag, or observer control that includes steady-state bias estimation. This control is characterized by there being an integral element (integral compensation or bias compensation) included in the control system. The unit of the target position in the SI unit system is meters. However, in the case of a disk drive, the unit for reading or writing data is tracks, so it is expressed in tracks or cylinders.

Settling control is the control mode that connects coarse control with following control. In settling control, there is an integral element included in the control system.

Next, observer control as suitable position control of this invention will be explained. Observer control is a method for simulating a control model for realizing a status feedback control. The actuator of the hard disk drive (HDD) is expressed by the transfer function of equation (1).

$$y = \frac{Bl}{m} \frac{1}{s^2} u \tag{1}$$

In the equation above, 'y' is the position, 'Bl' is the power constant, 'm' is the mass, 's' is the Laplace operator, and 'u' is the value of the drive current. In this expression, a rotation response is converted to a linear response.

When this expression of the transfer function is expressed in status format, the following equations (2) result.

$$s\begin{pmatrix} x \\ v \end{pmatrix} = \begin{pmatrix} 0 & 1 \\ 0 & 0 \end{pmatrix}\begin{pmatrix} x \\ v \end{pmatrix} + \frac{Bl}{m}\begin{pmatrix} 0 \\ 1 \end{pmatrix} u \tag{2}$$

$$y = (1\ 0)\begin{pmatrix} x \\ v \end{pmatrix}$$

Here, 'x' and 'y' are position and 'v' is the velocity.

These equations are in SI units, where position is in meters, velocity is in m/sec, and current is in ampere. However, in an actual device, the target position is in track units, and when the sample period is taken to be T(s), then it is better for the velocity to be expressed in units of track/sample. Furthermore, since the current output is set to a digital-analog converter (DAC), it is best for the maximum current to be normalized to '1'. In this way, by converting units, equations (2) are converted to equations (3). The status variables are converted to new units.

$$s\begin{pmatrix} x \\ v \end{pmatrix} = \begin{pmatrix} 0 & 1/T \\ 0 & 0 \end{pmatrix}\begin{pmatrix} x \\ v \end{pmatrix} + \frac{Bl}{m}\begin{pmatrix} 0 \\ T \end{pmatrix} u \tag{3}$$

$$y = (1\ 0)\begin{pmatrix} x \\ v \end{pmatrix}$$

When this analog model is converted to a digitized digital model, the following equations (4) are obtained.

$$\begin{pmatrix} x[k+1] \\ v[k+1] \end{pmatrix} = \begin{pmatrix} 1 & 1 \\ 0 & 1 \end{pmatrix}\begin{pmatrix} x[k] \\ v[k] \end{pmatrix} + Ka\begin{pmatrix} 1/2 \\ 1 \end{pmatrix} u[k] \tag{4}$$

$$y[k] = (1\ 0)\begin{pmatrix} x[k] \\ v[k] \end{pmatrix}$$

Here, $Ka = Bl/m$.

It is possible to construct an observer control system based on these equations. In order to actually apply observer control, the current observer construction of the following equations (5) are used.

$$\begin{pmatrix} x\_hat[k] \\ v\_hat[k] \end{pmatrix} = \begin{pmatrix} x\_bar[k] \\ v\_bar[k] \end{pmatrix} + \begin{pmatrix} L1 \\ L2 \end{pmatrix}(y[k] - x\_bar[k]) \tag{5}$$

$$u[k] = -Fx \cdot x\_hat[k] - Fv \cdot v\_hat[k]$$

$$u\_out[k] = u[k] + BiasTable(y[k])$$

$$\begin{pmatrix} x\_bar[k+1] \\ v\_bar[k+1] \end{pmatrix} = \begin{pmatrix} 1 & 1 \\ 0 & 1 \end{pmatrix}\begin{pmatrix} x\_hat[k] \\ v\_hat[k] \end{pmatrix} + Ka\begin{pmatrix} T^2/2 \\ T^2 \end{pmatrix} u[k]$$

The model of these equations is the model shown in FIG. 5. An explanation is given based on FIG. 5. The estimated position x hat[k] and the estimated velocity v hat[k] for this time are obtained by adding the estimated position x bar[k] and estimated velocity v bar[k] for this time, that were calculated during the previous sample, to the difference between the observed position (detected position) y(k) and estimated position x bar[k] that are multiplied by the gain L. The instruction value u(k) for this time is obtained by multiplying the current estimated position x hat[k] and estimated velocity v hat[k] by the gain F. The output current value u out(k) is obtained by adding the bias table value BiasTable (y[k]) to the instruction current value u(k).

The estimated position x bar[k+1] and estimated velocity v bar[K+1] of the next sample time, that are estimated according to this instruction current u(k), are calculated from the estimated position x hat[k] and estimated velocity v bar[k+1] for this time and the instruction current u(k).

The bias table value BiasTable(y[k]) is the average value of previously measured bias values and is stored in a table. This control system is used in coarse control. Since the average bias value is corrected even in coarse control, there are few velocity errors due to bias.

Next, the observer control system used on settling control and following control and that included bias value estimation will be explained. A steady-state bias model, or in other words, the following equation (6) is added to the analog plant model (equations (3)) in units of acceleration. Furthermore, when these equations are digitized and a current observer is constructed in the same way as described above, the observer control system of equations (7) are obtained.

$$sB = 0 \tag{6}$$

$$\begin{pmatrix} x\_hat[k] \\ v\_hat[k] \\ b\_hat[k] \end{pmatrix} = \begin{pmatrix} x\_bar[k] \\ v\_bar[k] \\ b\_bar[k] \end{pmatrix} + \begin{pmatrix} L1 \\ L2 \\ L3 \end{pmatrix}(y[k] - x\_bar[k])$$

$$u[k] = -Fx \cdot x\_hat[k] - Fv \cdot v\_hat[k] - Fb \cdot b\_hat[k] \tag{7}$$

$$u\_out[k] = u[k] + BiasTable(y[k])$$

$$\begin{pmatrix} x\_bar[k] \\ v\_bar[k] \\ b\_bar[k] \end{pmatrix} = \begin{pmatrix} 1 & 1 & 1 \\ 0 & 1 & 2 \\ 0 & 0 & 1 \end{pmatrix}\begin{pmatrix} x\_hat[k] \\ v\_hat[k] \\ b\_hat[k] \end{pmatrix} + Ka\begin{pmatrix} 1/2 \\ 1 \\ 0 \end{pmatrix} u[k]$$

These equations (7) are the result of adding bias 'B' as acceleration to the model in FIG. 5, and as a model is the same.

In other words, The estimated position x hat[k], estimated velocity v hat[k] and estimated bias b hat[k] for this time are obtained by adding the estimated position x bar[k], estimated velocity v bar[k] and estimated bias b bar[k] for this time, that were calculated during the previous sample, to the difference between the observed position (detected position)

y(k) and estimated position x bar[k] that are multiplied by the gain L. The instruction value u(k) is obtained by multiplying the current estimated position x hat[k], estimated velocity v hat[k] and estimated bias b hat[k] by the gain F. The output current value u out (k) is obtained by adding the bias table value BiasTable (y[k]) to the instruction current value u(k).

The estimated position x bar[k+1], estimated velocity v bar[K+1] and estimated bias b bar[k+1] of the next sample time, that are estimated according to this instruction current u(k), are calculated from the estimated position x hat[k], estimated velocity v bar[k+1] and estimated bias b hat[k] for this time and the instruction current u(k).

The construction of this observer control system is used for settling control and following control. The steady-state bias is estimated and corrected so the DC component of the position error becomes '0'. The observer gain (l1, L2) or (L1, L2, L3), and the status feedback gain (Fx, Fv) or (Fx, Fv, Fb) are obtained from known optimal control theory or optimal pole location method.

Figure 6:
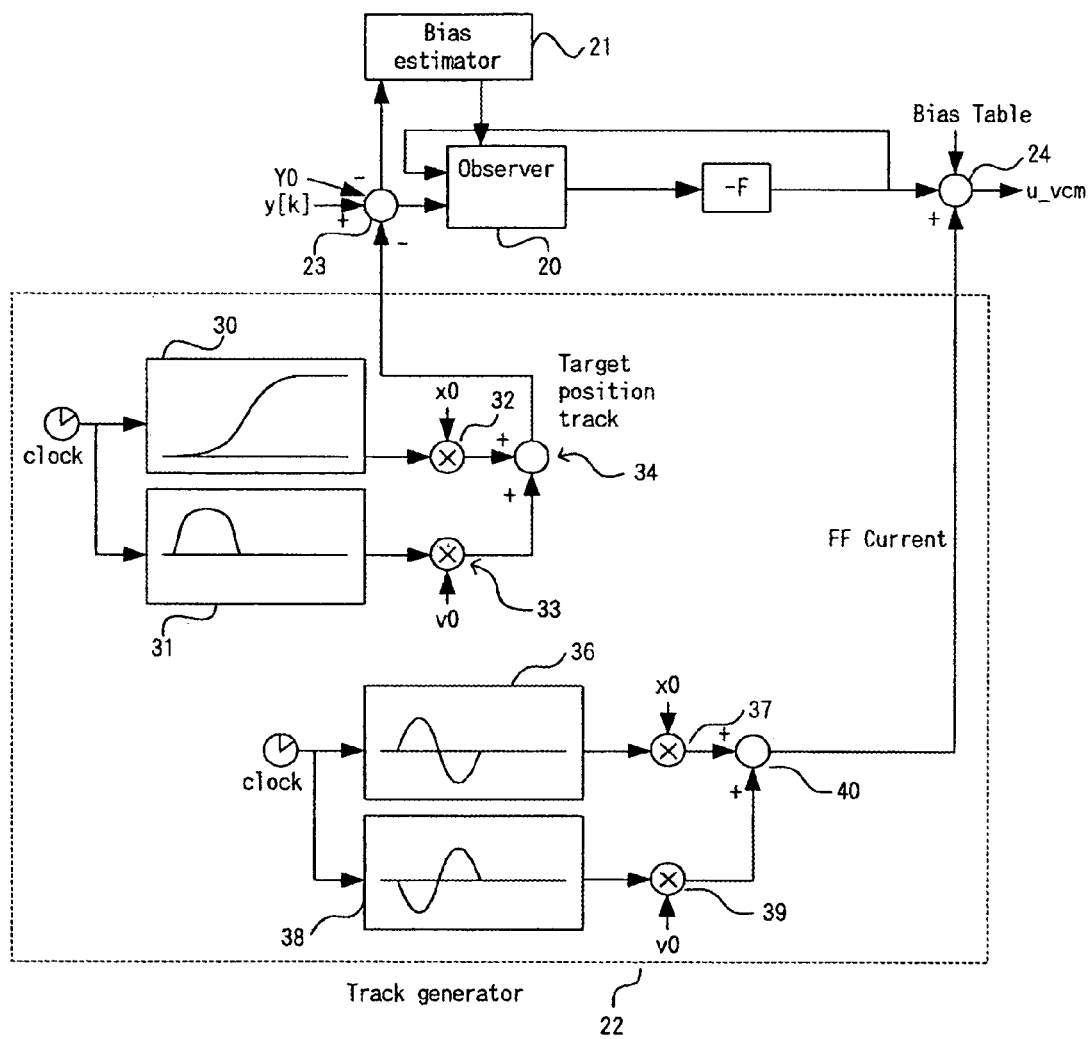
FIG. 6 is a drawing of a model of the settling control of an embodiment of the invention.
Figure 7:
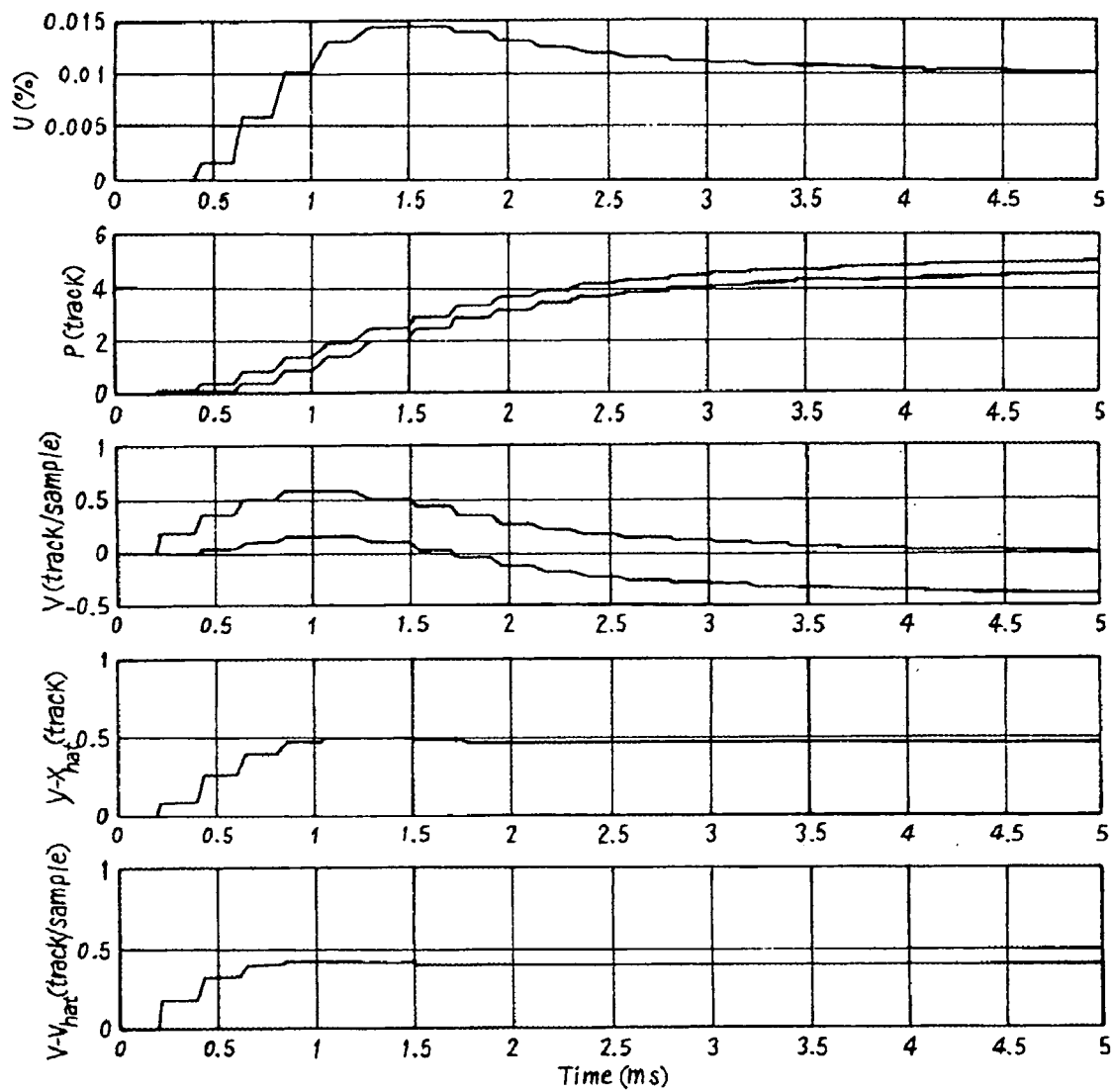
FIG. 7 is a drawing showing the response waveform when bias is applied (1/2).
Figure 8:
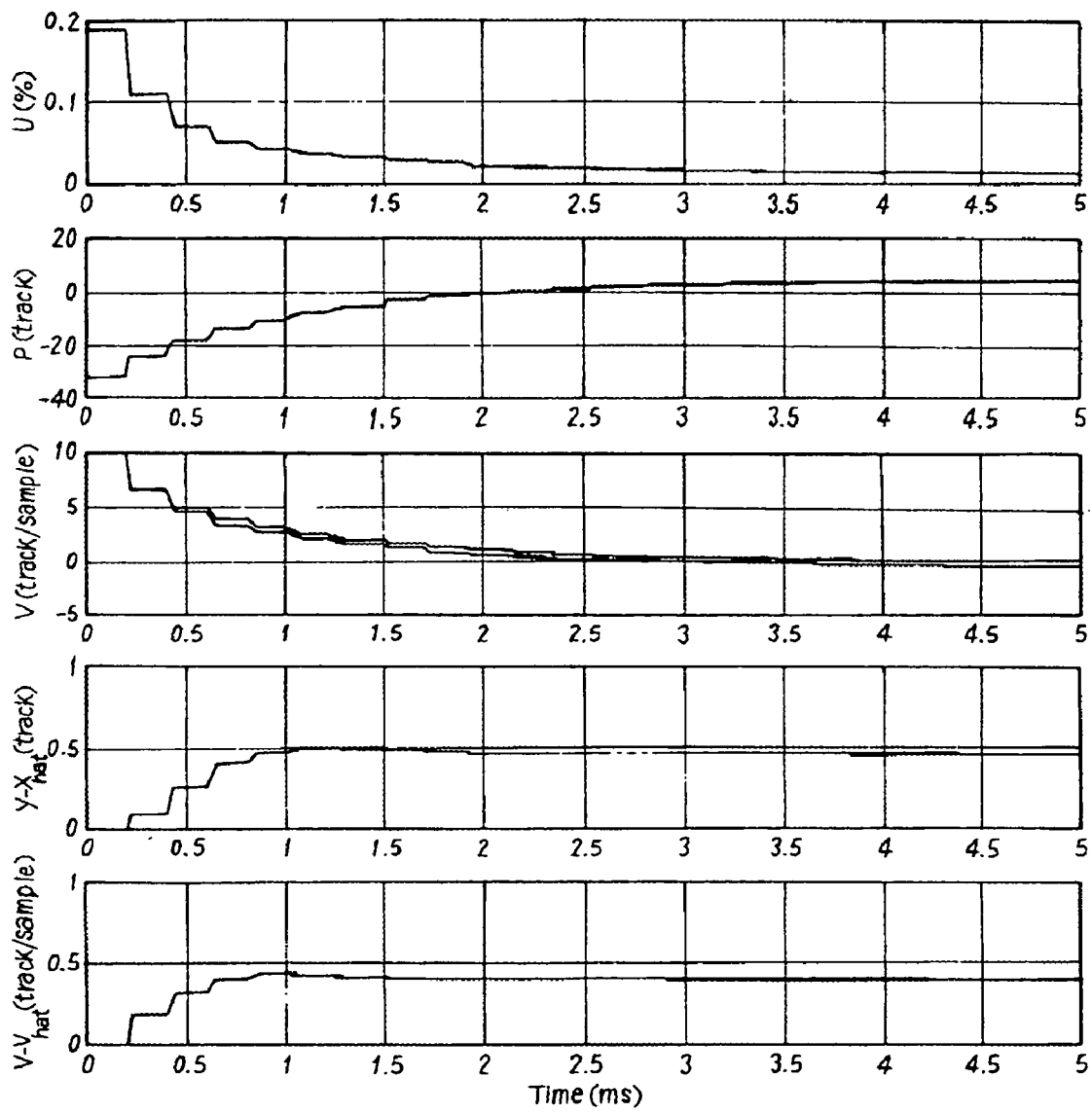
FIG. 8 is a drawing showing the response waveform when bias is applied (2/2).
Figure 9:
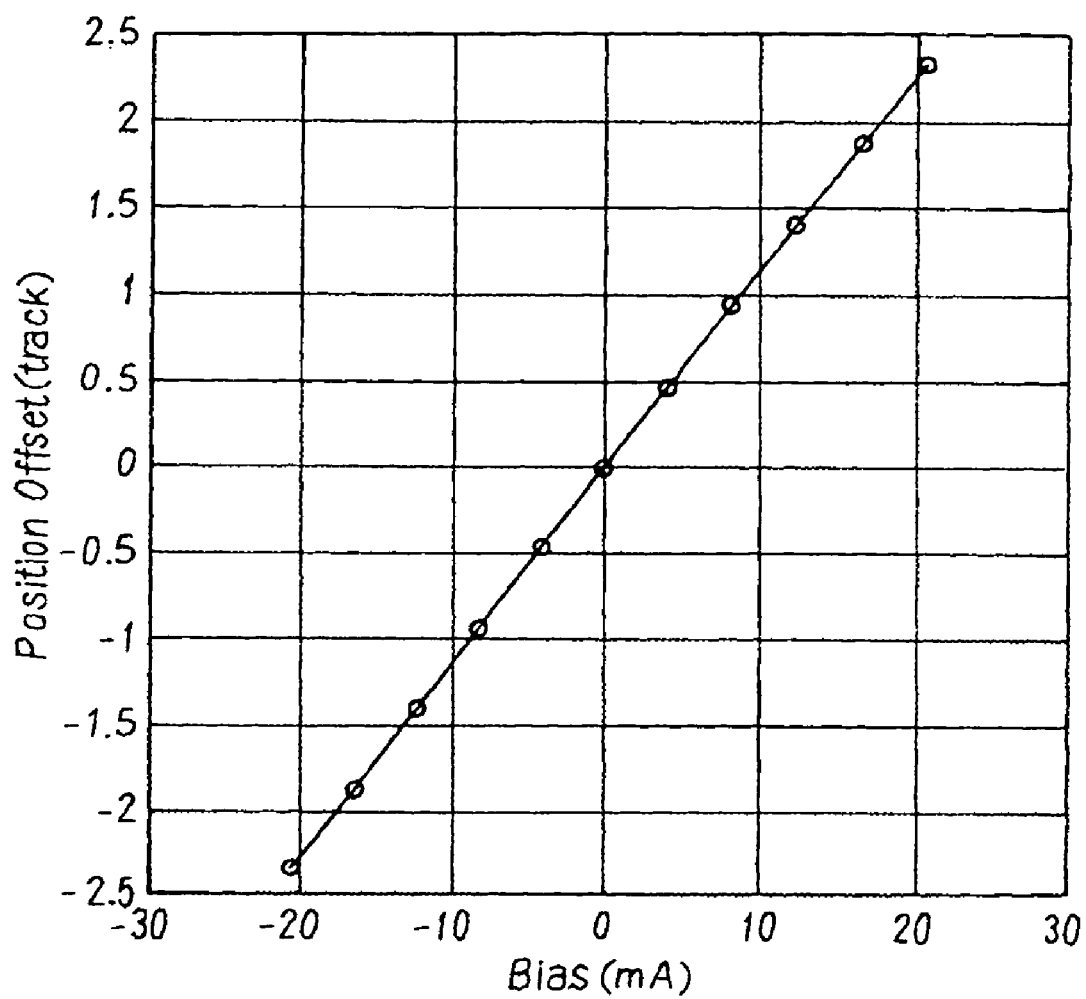
FIG. 9 is a drawing showing the relationship between the bias and shift in position.
Figure 10:
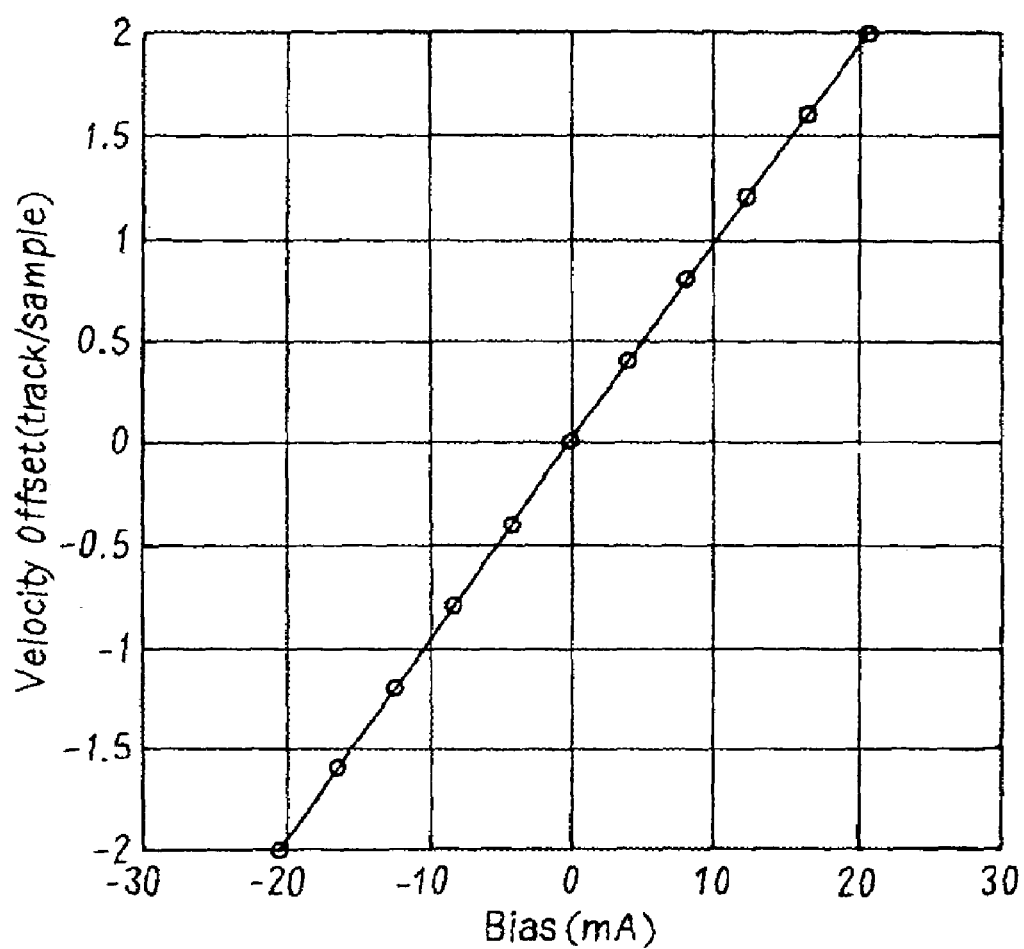
FIG. 10 is a drawing showing the relationship between the bias and shift in velocity.

Next, the settling control of this invention is explained. FIG. 6 shows a model of the settling control of an embodiment of this invention, FIGS. 7 and 8 show simulation of the response to the bias value of the observer control system with no estimation of steady-state bias, FIG. 9 shows the relationship between the shift in actual position and estimated position with respect to the bias, and FIG. 10 shows the relationship between the shift in actual velocity and estimated velocity with respect to the bias.

As shown in FIG. 6, there is an initial bias estimator 21 for the observer 20. The initial bias estimator 21 is explained.

In the deceleration mode in coarse control just before settling control, the control system does not include an integrator (or bias estimator). In settling control and following control, the control system includes an integrator (or bias estimator). The initial bias estimator 21 calculates the difference between the observed position x bar[k] of the observer 20, and the actual position y[k] at the start of or just before the start of settling, then multiplies that position error (the difference) by a preset gain Kx to calculate the initial bias, and sets that initial value in the observer 20.

Furthermore, the estimator 21 calculates the product of the position error and the gain Kv and adds it to the estimated velocity v bar[k] of the observer 20 to correct the estimated velocity. In FIG. 6, the target position 'Y0' is subtracted from the detected position y[k] (absolute position), and that value is taken to be the actual position (relative position) y[k]. The detected position y[k] is obtained from the position signal of the magnetic head 4.

This theory is explained. In a control system (coarse control) that does not include an integrator (or bias estimator), when the bias value is added, shifts occur in the estimated position and velocity value of the observer. This shift is proportional to the bias value. Therefore, by detecting the position error, it is possible to estimate the bias value.

FIG. 7 and FIG. 8 are simulation drawings of the response to the bias value of an observer control system that does not include steady-state bias estimation when the pole of the status feedback is taken to be 330 Hz. FIG. 7 shows the time response for the instruction current U (%), position P (track), velocity V (track/sample), position error (actual position y−observed position x), velocity error (actual velocity v−estimated velocity vhat), when the initial position and initial velocity are '0', and when a steady-state bias of +4 mA is applied.

FIG. 8 shows the time response for the instruction current U (%), position P (track), velocity V (track/sample), position error (actual position y−observed position x), velocity error (actual velocity v−estimated velocity vhat), when the initial position is −32 track and initial velocity is '10', and when a steady-state bias of +4 mA is applied.

In FIG. 7 and FIG. 8, where there are two lines for the position P (track) and velocity V (track/sample), the top line is the estimated position or estimated velocity, and the bottom line is the real position or real velocity.

In both FIG. 7 and FIG. 8, the position error between the real position and the estimated position, and the velocity error between the real velocity and estimated error show the same response. Also, after 1.5 ms, they show constant values. The value for the position error is 0.47 tracks, and the velocity error is 0.40 tracks/sample when the bias value is 4 mA.

When the relationship between the bias value Bias and position error Position Offset and velocity error Velocity Offset are simulated, the relationship between bias value Bias and position error Position Offset shown in FIG. 9, and the relationship between bias value Bias and velocity error Velocity Offset shown in FIG. 10 are obtained. It can be seen that the shift in estimated position (position error Position Offset) and the shift in estimated velocity (velocity error Velocity offset) are proportional to the bias value Bias. This means that in an observer control system that does not include steady-state bias estimation it is possible to estimate the bias value by determining the error between the real position and the position estimated by the observer.

In addition, it is possible to estimate the bias value based on the error between the real position and the observer estimated position that is measured at the beginning of settling. The bias value b bar[k] can be obtained from equation (8) below.

$$b \operatorname{bar}[k] = Kx(y[k] - x \operatorname{bar}[k]) \quad (8)$$

Similarly, it is possible to correct the velocity error. The corrected estimated velocity v bar[k] can be obtained from equation (9) below.

$$v \operatorname{bar}[k] = va \operatorname{bar}[k] + Kv(y[k] - x \operatorname{bar}[k]) \quad (9)$$

Note that it is necessary to switch the gain Kx, Kv depending on the seek direction.

This estimated bias value can be obtained, as described above, in an observer control system that does not include steady-state bias estimation. Therefore, it is calculated as the initial value before settling control that is performed by observer control that includes steady-state bias estimation, or in other words, at the start or just before the start of settling. From then on, this initial value is used in settling control by observer control that includes steady-state bias estimation.

In this way, it is possible to accurately estimate the bias value. Moreover, it is possible to suppress fluctuation in seek time that accompany the fluctuations in the bias value during seeking. Therefore, the average seek time is reduced. For example, the average seek time for a 2.5-inch HDD can be reduced to 10 ms.

Also, here the observer estimated position is used to estimate the bias value. However, the observer estimated position is expressed by the previous position, velocity and current value. In addition, since the velocity is small enough, the observer estimated value can be expressed by the previous position and current. With this equation, the observer estimated position does not need to be used. In other words, the position can be similarly calculated from just an equation that estimates the next sample position from the previous sample position.

Next, in this invention, in order to further reduce the settling time, feed forward control is used during settling control. In other words, by just estimating the bias value, there are limits to how much the settling time can be reduced because the response depends on the control band of the control system and the poles of the state feedback. For example, when the state feedback pole is located at 500 Hz, then convergence takes 1/500=2 ms.

In order to speed up the response, feed forward control is used in the settling control. To do this, a track generator 22 is installed as shown in FIG. 6. The track generator 22 generates a target track and feed forward current (called FF current below) according to the initial position 'x0' and initial velocity 'v0' at the start of settling, and gives them to the control system.

It is necessary to generate this target track and feed forward current corresponding to the initial position 'x0' and initial velocity 'v0'. The track and current for doing this are designed in advance. In this control, it is necessary to design by taking into consideration the effect of the cut-off frequency of the current amp, and the effect of resonance of the actuator.

Figure 11:
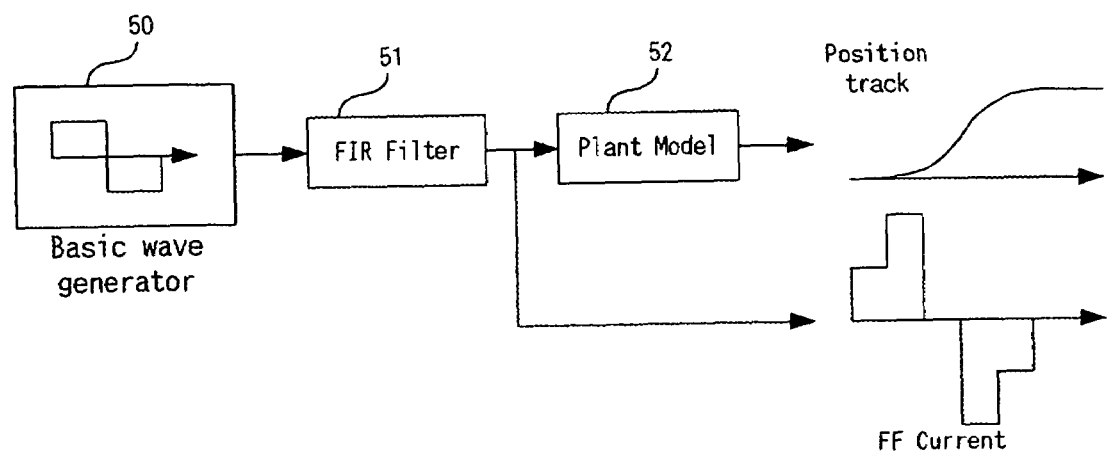
FIG. 11 is a block diagram of the track and feed forward current of an embodiment of the invention.
Figure 12:
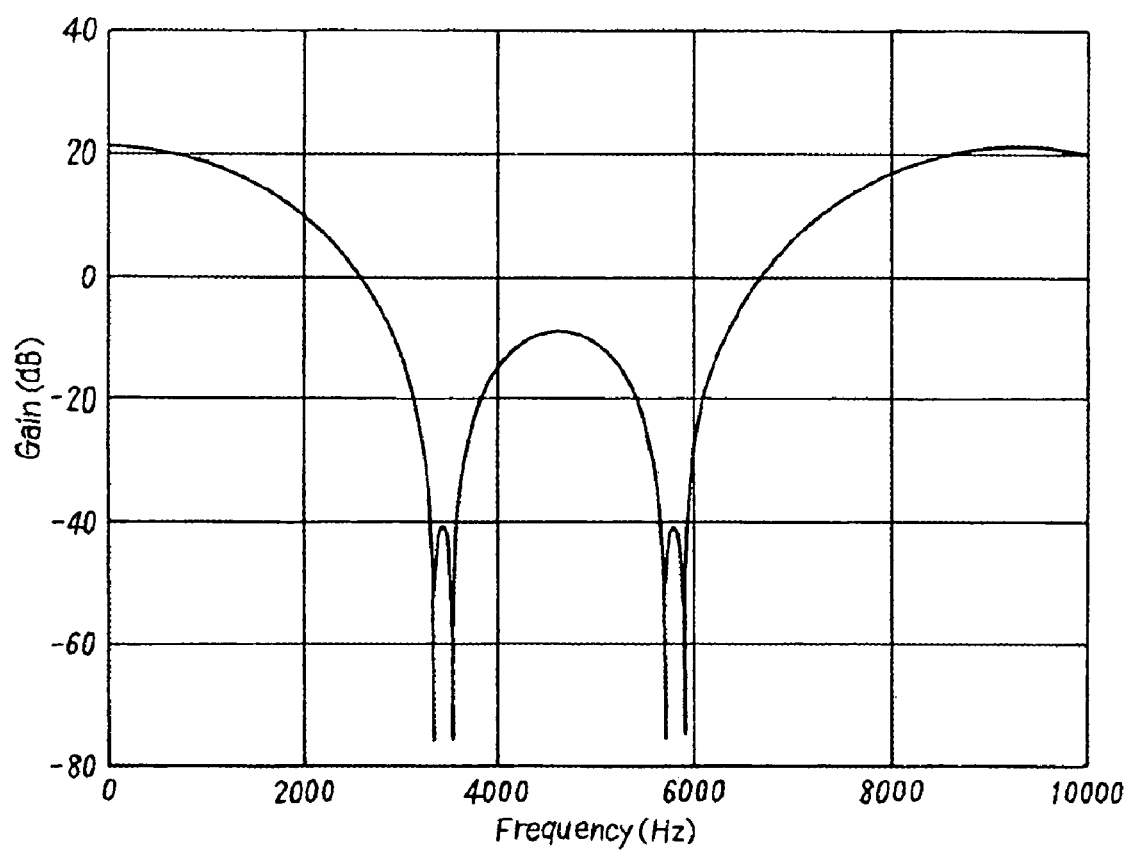
FIG. 12 is a drawing showing the frequency characteristics of the FIR filter in FIG. 11.
Figure 13A:
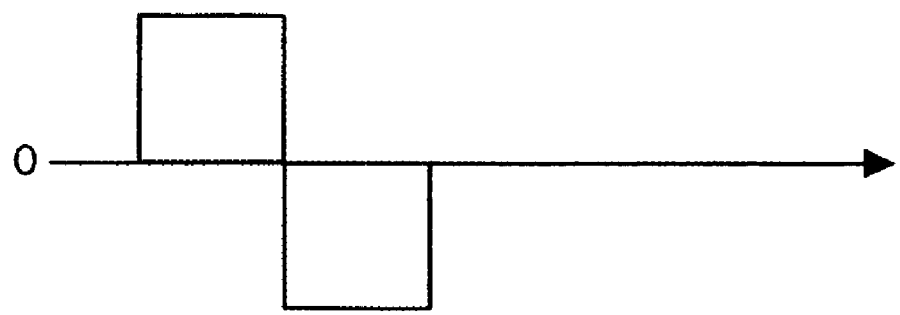
FIGS. 13A and 13B are drawings explaining the basic wave in FIG. 11.
Figure 13B:
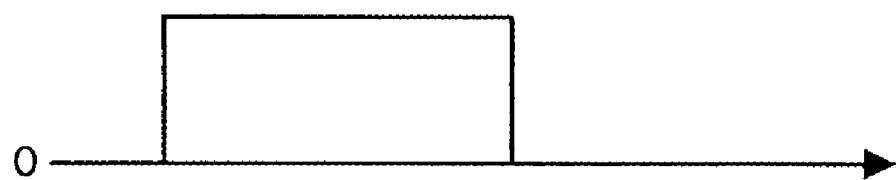

FIG. 11 is a block diagram for designing the track and FF current. FIG. 12 is a drawing showing the characteristics of a FIR filter for suppressing resonance of the actuator. FIG. 13A and FIG. 13B are drawings explaining the basic wave. FIG. 14 to FIG. 17 are drawings explaining the design track.

First, the track for the target position is designed as follows. As shown in FIG. 11, a FIR filter 51 is prepared for removing the resonant frequency component. The FF current is designed by passing an arbitrary waveform to this FIR filter 51 from a basic wave generator 50. In this way, the resonant frequency component is removed from the designed waveform.

This FIR filter 51 is such that it contains the zero point of the resonant frequency. This dampens the frequency component of the zero point or makes it zero. Here, when an arbitrary waveform is passed through this FIR filter 51, the waveform that is output from the FIR filter 51 becomes a waveform for which the gain near the resonant frequency has been suppressed. As shown in FIG. 11, the position track is obtained by applying the current that has been passed through the FIR filter 51 to a plant model 52.

FIG. 12 is a drawing showing the characteristics of the frequency of the FIR filter 51 that suppresses 5.8 kHz actuator resonance. Here, the zero point is placed at two frequencies near 5.7 kHz and 5.9 kHz, to remove a wide frequency component near 5.8 kHz. It is possible to use just one zero point, or it is possible to use a plurality of zero points placed at different locations.

Next, the trajectory is divided into a position trajectory and a velocity trajectory. In other words, provided is the first trajectory (position trajectory) when the initial position is 1 track and the initial velocity is 0 track/sample, and the second trajectory (velocity trajectory) when the initial position is 0 track and the initial velocity is 1 track/sample. Moreover, the trajectory when the initial position is track X0 and the initial velocity is V0 tracks/sample, is synthesized by multiplying the two trajectories by gains of X0 and V0. In this way, it is possible to obtain the trajectories for an arbitrary initial position and initial velocity by synthesizing one unit track.

Furthermore, the method of generating the target track for settling control and the method of generating the trajectory for controlling the resonant frequency component of the actuator are explained.

The resonant frequency is taken to be Fr (Hz). When there are changes in the resonant frequency due to different solids, aging or temperature change, the average value of the resonant frequencies is used. In this case, the value obtained by the following equations is used. The sample period is taken to be T(s). Here, the sample period is the time interval for changing the current. It may be different than the period for detecting the position.

$$\omega = 2\pi \cdot Fr$$

$$S^2 + 2\zeta\omega s + \omega^2 = 0$$

$$Z_0 = \exp(sT)$$

'Z0' is expressed the zero point of the filter that corresponds to the resonant frequency in a discrete system. There is not one 'Z0' but rather two or a complex number. Here, they will be expressed as 'Z01' and 'Z02'.

Consider the FIR filter that contains 'Z0' as a zero point.

$$F(z) = (1 - Z_{01}Z^{-1})(1 - Z_{02}Z^{-1}) = 1 - (Z_{01} + Z_{02})Z^{-1} + Z_{01}Z_{02}Z^{-2}$$

This characteristic is the same as for a notch filter. In FIG. 12 a total of four zero points 'Z0' have been designed and synthesized (connected in series with the filter) at frequencies 5.7 kHz and 5.9 kHz and with $\zeta$ set to 0. When the base wave is passed through this filter, the filter output is a wave in which the resonant frequency component has been controlled. Here, passing the rectangular waveform shown in FIG. 13A through the filter as the basic wave, tracks (FF current, position track) are generated that correspond to the initial position for settling control. Also, by passing the rectangular waveform shown in FIG. 13B through the filter, trajectories (FF current, position trajectory) are generated that correspond to the initial velocity.

The design of the position trajectory is obtained by designing a trajectory such that only the initial position moves after movement and where the current and velocity become zero. Also, in designing a trajectory for the initial velocity, it is okay to design trajectory where the velocity and position both become zero.

Figure 14:
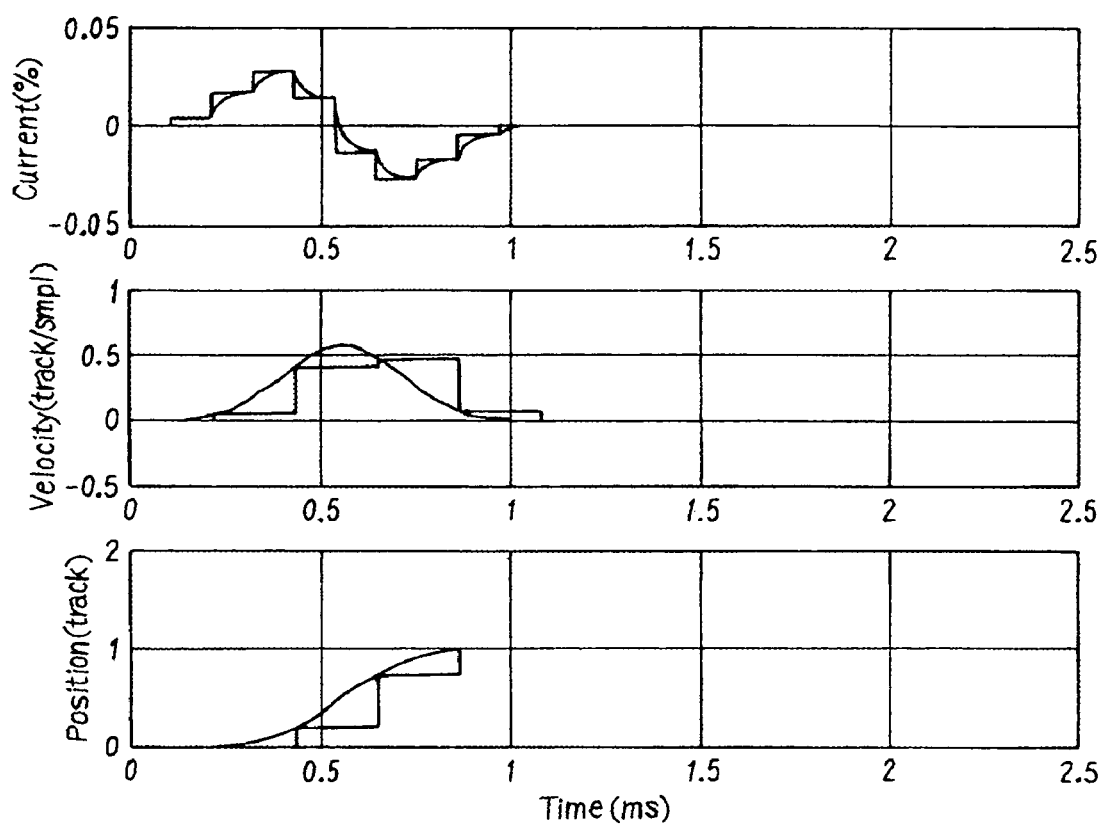
FIG. 14 is a drawing explaining an example of the design track of an embodiment of the invention (1/4).

In other words, the track for the position is designed by letting a suitable current flow. By dividing the current by the distance moved, it is possible to design the current for the distance 1 track. As shown in FIG. 14, with the initial velocity zero, the current, velocity and position trajectories for moving 1 track are obtained by simulation.

Figure 15:
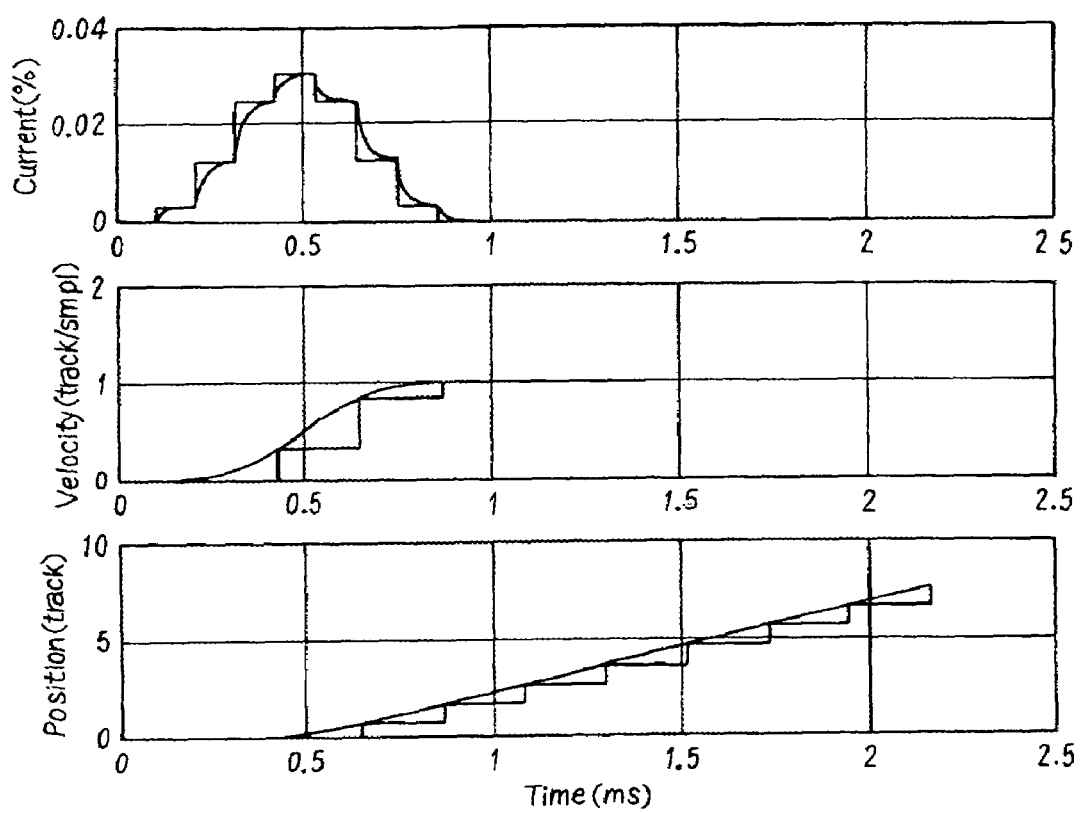
FIG. 15 is a drawing explaining an example of the design track of an embodiment of the invention (2/4).

Next, the current that will give a constant velocity is designed. After the current has flowed, constant velocity is maintained. By dividing the distance by that constant velocity, the track that will give 1 track/sample is obtained. FIG. 15 shows the current, velocity and position trajectories for obtaining a velocity of 1 track/sample.

Figure 16:
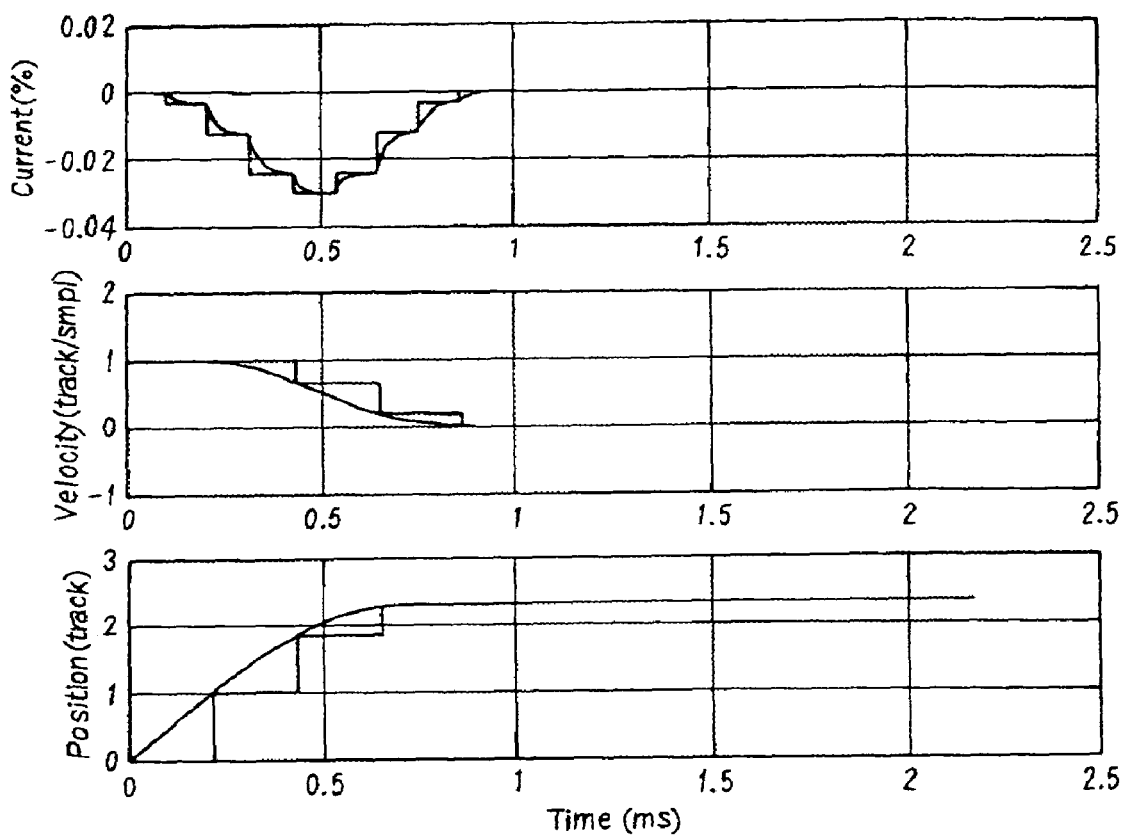
FIG. 16 is a drawing explaining an example of the design track of an embodiment of the invention (3/4).
Figure 17:
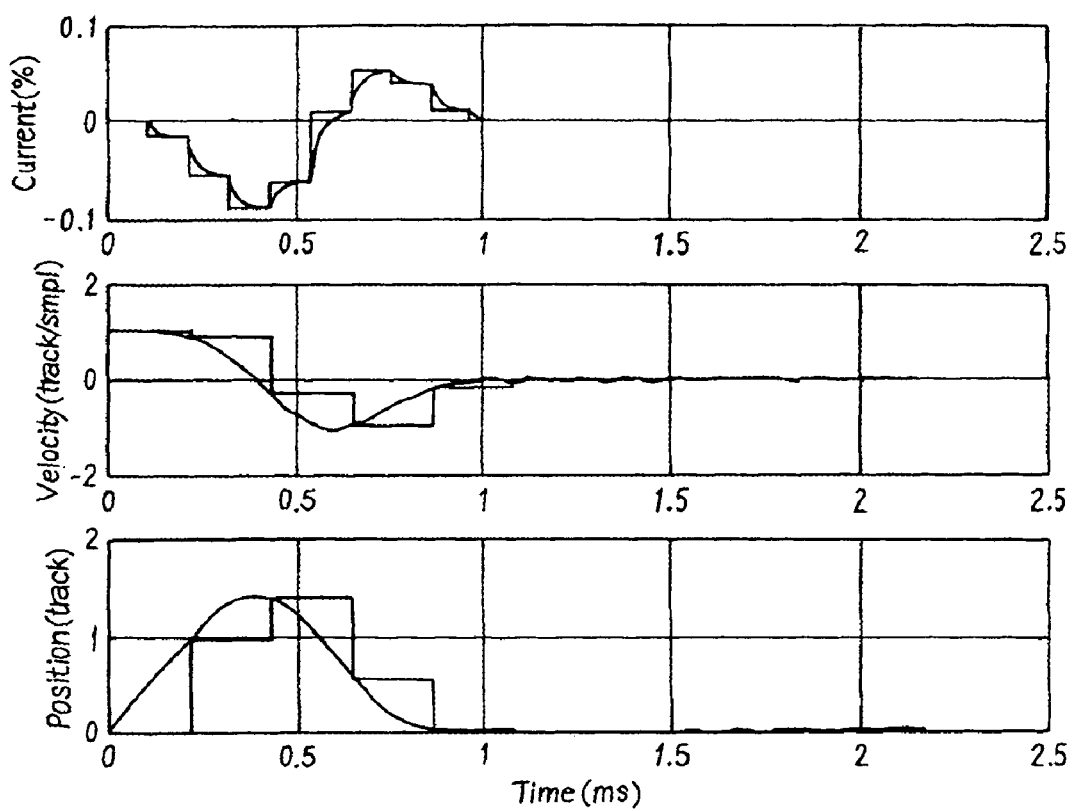
FIG. 17 is a drawing explaining an example of the design track of an embodiment of the invention (4/4).

Next, when the initial conditions are 0 track, and 1 track/sample, the arrival position in the minus direction that gave the aforementioned trajectory is obtained. FIG. 16 shows the current, velocity and position tracks for making the velocity '0' from an initial position of '0' and initial velocity of 1 track/sample. By applying the aforementioned position trajectory in order to make the arrival position '0', it is possible to design trajectories that will go from an initial position of 0 track, and initial velocity of 1 track/sample, to end with a position of '0' track and velocity of 0 tracks/sample. FIG. 17 shows the trajectories (current, velocity, position) that will go from an initial position of 0 track and initial velocity of 1 track/sample, and end at a position of 0 track and velocity of 0 tracks/sample.

In this way, it is possible to design a trajectory with initial conditions of 1 track and initial velocity of 0 tracks/sample, and end conditions of 0 track and 0 tracks/sample, and a trajectory with initial conditions of 0 track and initial velocity of 1 track/sample, and end conditions or 0 track and 0 tracks/sample.

FIG. 6 shows an example, of the trajectories shown in the figures, that give current and position to the control system. In other words, the trajectory generator 22 contains a current track and target position track. Therefore, there are current unit track generators 36, 38 and target position unit trajectory generators 30, 31. Moreover, the target position unit trajectory generators 30, 31 are driven by a clock source, and then a target position trajectory, that is proportional to the initial position 'X0' and initial velocity 'V0' at the start of settling, is generated by multipliers 32, 33 and an adder 34. This target position trajectory is given to the adder 23 in a prior step of the observer 20 as a target value, and the difference between the target position and the detected position is found and the difference is input to the observer 20 as the observed position.

Similarly, the current unit trajectory generators 36, 38 are driven by a clock source, and then a target position trajectory, that is proportional to the initial position 'X0' and initial velocity 'V0' at the start of settling, is generated by multipliers 37, 39 and an adder 40. This target trajectory is given to an adder in the output stage of the observer 20 as the feed forward current.

Since feed forward control is performed during settling control in this way, high-speed response is possible. Also, since current amp characteristics as well as the resonant effects are considered during trajectory design, high-speed response is possible even when feed forward control is performed.

[Positioning Control Process]

Figure 18:
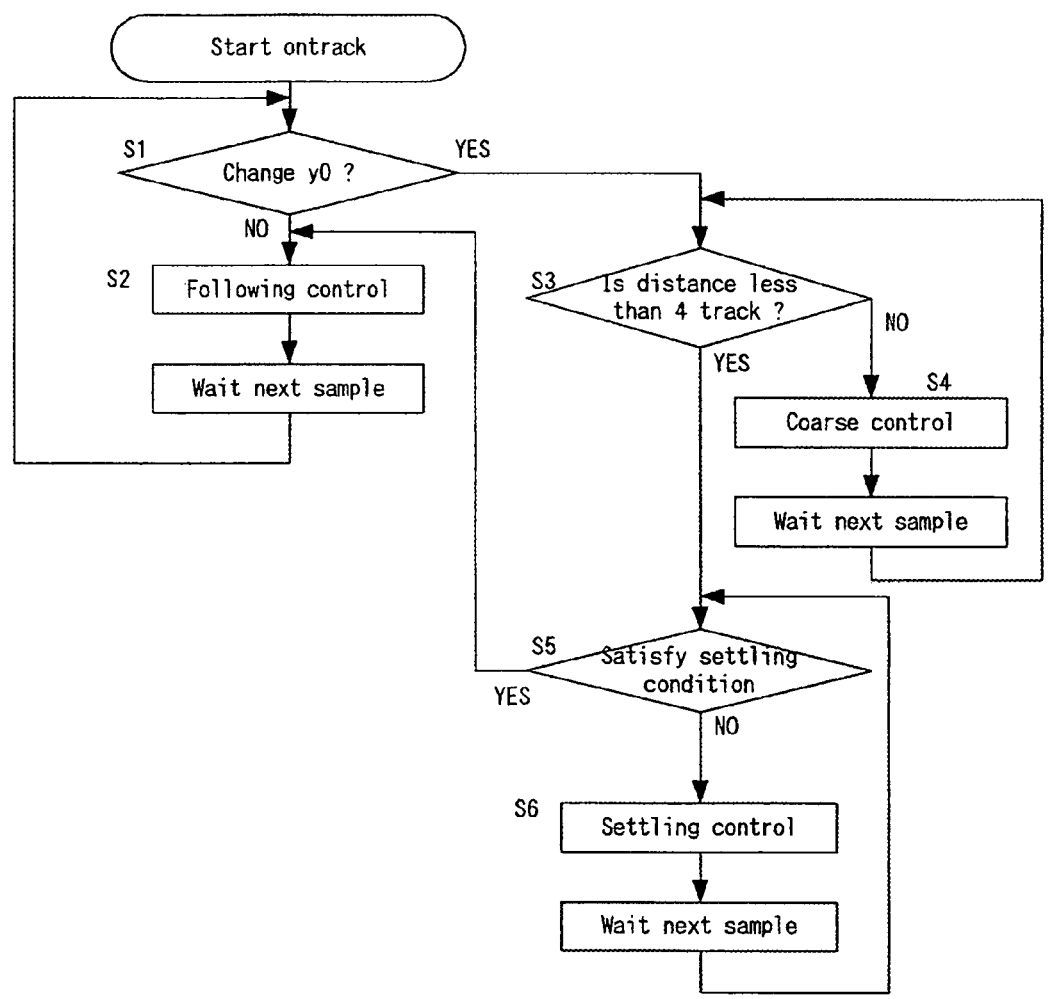
FIG. 18 is a flowchart of the task control of an embodiment of the invention.
Figure 19:
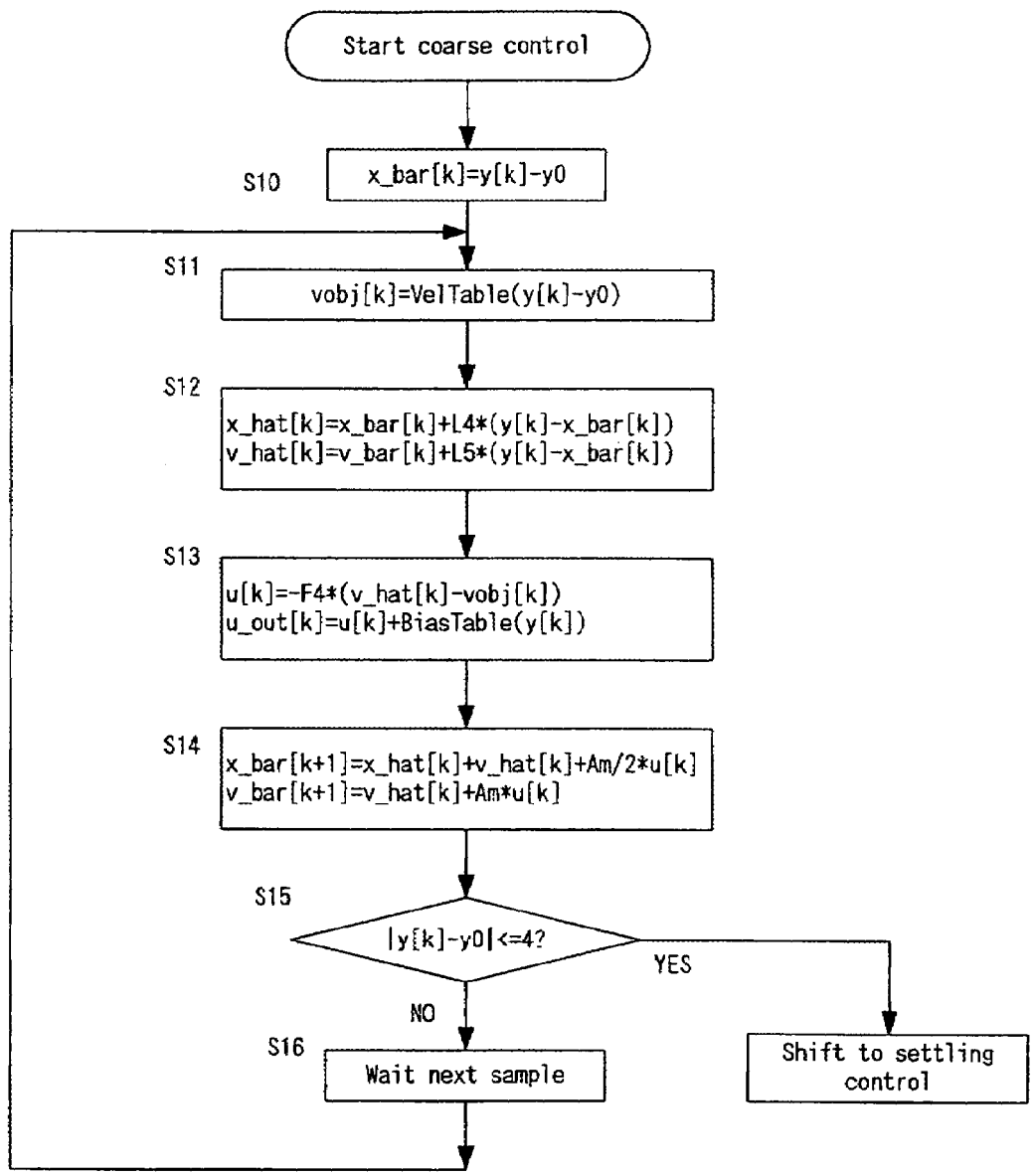
FIG. 19 is a flowchart of the coarse control in FIG. 18.
Figure 20:
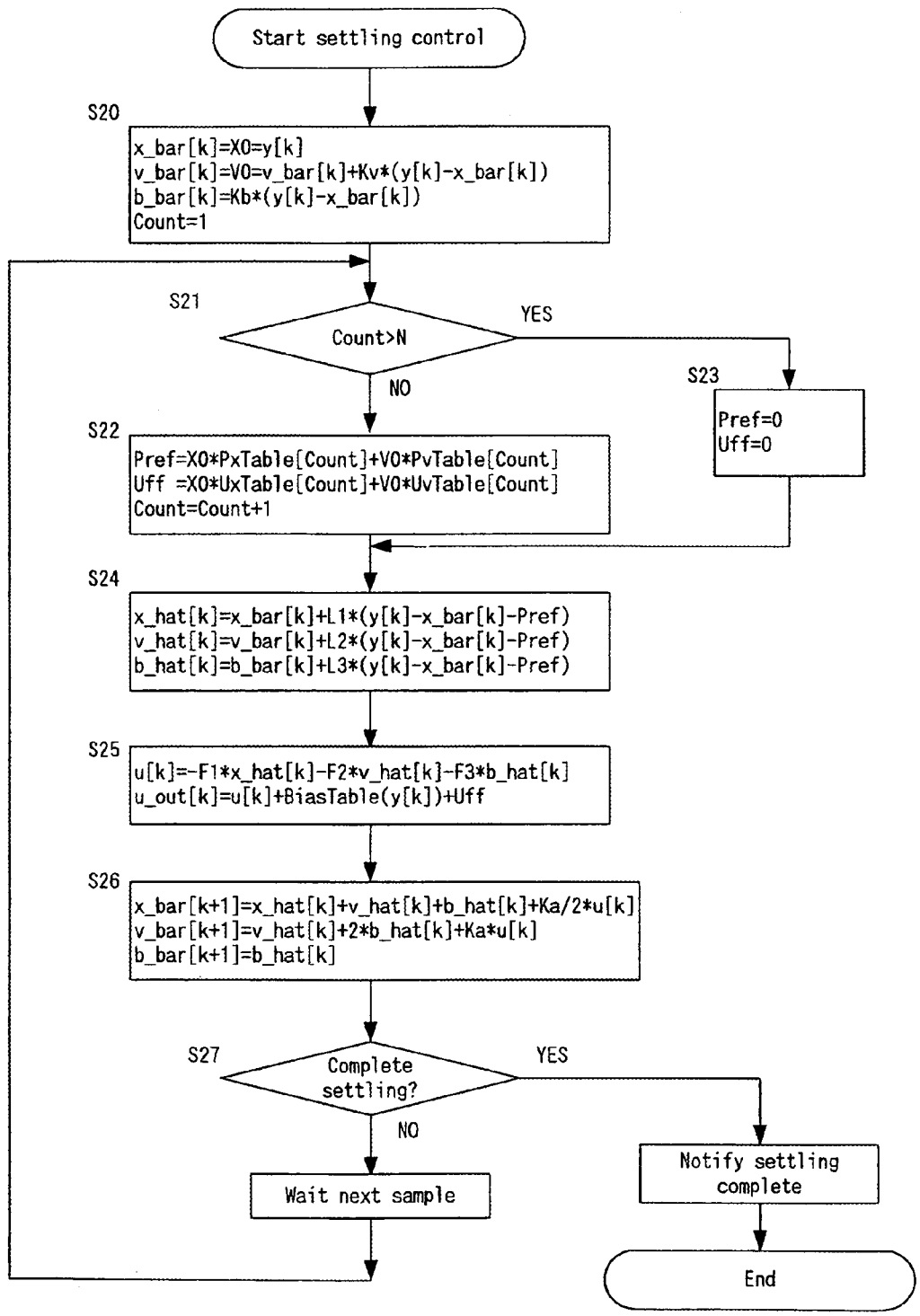
FIG. 20 is a flowchart of the settling control in FIG. 18.
Figure 21:
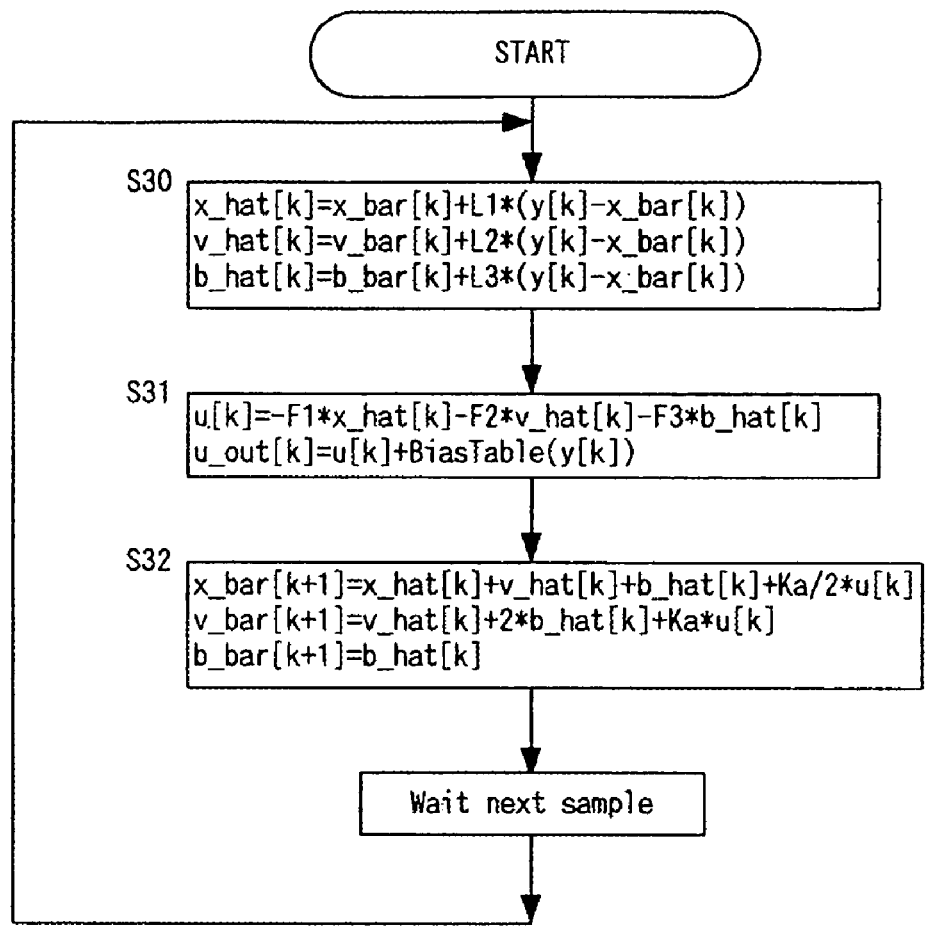
FIG. 21 is a flowchart of the following control in FIG. 18.

Next, the positioning control process by a program executed by the MPU 19 will be explained. FIG. 18 is a flowchart of the task controls of the positioning control process. FIG. 19 is a flowchart of the coarse control process. FIG. 20 is a flowchart of the settling control process. FIG. 21 is a flowchart of the following control.

First, the positioning control process will be explained using FIG. 18.

(S1) This task process is executed when an on-track start command is received. First, it is judged whether the target value 'y0' has changed.

(S2) When the target value 'y0' has not changed, following control (described later using FIG. 21) is executed and the process returns to step S1.

(S3) When the target value 'y0' has changed the distance to the target value 'y0' is checked whether it is 4 tracks or less.

(S4) When the distance to the target value 'y0' is not 4 tracks or less, coarse control (described later using FIG. 19) is executed and the process returns to step S3.

(S5) When the distance to the target value 'y0' is 4 tracks or less, then the specified settling conditions are checked whether they are satisfied. When the specified settling conditions are satisfied, processing advances to following control of step S2. The judgment conditions will be explained for the settling control in FIG. 20.

(S6) When the specified settling conditions are not satisfied, settling control (described later using FIG. 20) is executed and the process returns to step S5.

In the seek process, when coarse control is performed and the distance is within 4 tracks, then processing moves to settling control, and when the settling conditions are satisfied, processing moves to following control.

Next, coarse control is explained using FIG. 19. This coarse control is velocity control using an observer.

(S10) The estimated position x bar[k] for this time is initialized to the distance (y[k]−y0). y[k] is the detected position (current position) obtained from the head 4, and 'y0' is the target position.

(S11) The target velocity vobj[k] that corresponds to the distance (y[k]−y0) is calculated according to the velocity curve for coarse control shown in FIG. 4.

(S12) Also, the estimated position x hat[k] and estimated velocity v hat[k] for this time are obtained from the sum of the estimated position x bar[k] and estimated velocity v bar[k] for this time that were calculated during the previous sample, and the difference between the observed position (detected position) y(k) and estimated position x bar[k] that is multiplied by a gain L. The equations are shown below.

$$x\ \mathrm{hat}[k]=x\ \mathrm{bar}[k]+L4(y[k]-x\ \mathrm{bar}[k])$$

$$v\ \mathrm{hat}[k]=v\ \mathrm{bar}[k]+L5(y[k]-x\ \mathrm{bar}[k])$$

(S13) The instruction current u[k] is obtained by multiplying the difference (velocity error) between the estimated velocity v hat[k] and target velocity vobj[k] for this time by a gain F. The output current u out(k) is obtained by adding the bias table value BiasTable(y[k]) to the instruction current u(k). The equations are given below.

$$u[k]=-F4(v\ \mathrm{hat}[k]-vobj[k])$$

$$u\ \mathrm{out}[k]=u(k)+\mathrm{BiasTable}(y[k])$$

(S14) The estimated position x bar[k+1] and estimated velocity v bar[k+1] that are estimated for the next sample using the instruction current u(k), are calculated from the estimated position x hat[k] and estimated velocity v hat[k] for this time, and the instruction current u(k). The equations are given below.

$$x\ \mathrm{bar}[k+1]=x\ \mathrm{hat}[k]+v\ \mathrm{hat}[k]+Am/2\cdot u(k)$$

$$v\ \mathrm{bar}[k+1]=v\ \mathrm{hat}[k]+Am\cdot u(k)$$

(S15) The distance (y[k]−y0) is checked whether it is 4 tracks or less. When the distance (y[k]−y0) is 4 tracks or less, then processing moves to settling control. To make this easier to understand, the conditions in FIG. 17 are duplicated here.

(S16) When the distance (y[k]−y0) is not 4 tracks or less, processing waits for the next sample and then returns to step S11.

Coarse control is performed in this way.

Next, settling control will be explained using FIG. 20. This settling control is the observer control that estimates the steady-state bias.

(S20) Initial values are set at the start of settling. First, the estimated velocity v bar[k] is set to the current velocity V0. As previously mentioned, when doing this, it is corrected by the difference between the observed position y[k] and the estimated position x bar[k]. In other words, the initial value for the estimated velocity v bar[k] is obtained from equation (9) above.

$$v\ \mathrm{bar}[k]=v\ \mathrm{bar}[k]+Kv\cdot(y[k]-x\ \mathrm{bar}[k]) \qquad (9)$$

Moreover, based on the error between the actual position and the observer estimated position, the initial bias value is calculated from equation (8) above.

$$b\ \text{bar}[k] = Kx \cdot (y[k] - x\ \text{bar}[k]) \quad (8)$$

Furthermore, the estimated position x bar[k] is set to the current position X0 (=y[k]). Next, the count value Count, that indicates the aforementioned feed forward period, is initialized to '1'.

(S21) The count value Count is then checked whether it is over the value 'N' (feed forward end value).

(S22) When the count value Count is not over the value 'N', then the unit track values PxTable[Count] and PvTable[Count], that correspond to the count value Count, are read from the track table (blocks 30 and 31 in FIG. 6), and the track value Pref that corresponds to the initial position X0 and initial velocity V0 is calculated by the equation below.

$$Pref = X0 \cdot PxTable[Count] + V0 \cdot PvTable[Count]$$

Moreover, the unit current values UxTable[Count] and Uvtable[Count], that correspond to the count value Count, are read from the current table (blocks 36 and 38 in FIG. 6), and the current Uff, that corresponds to the initial position 'X0' and initial velocity 'V0', is calculated by the equation below.

$$Uff = X0 \cdot UxTable[Count] + V0 \cdot UvTable[Count]$$

Furthermore, the count value Count is increased by '1'.

(S23) On the other hand, when the count value Count is greater than the value 'N', the feed forward period is finished, so the track value Pref and current value Uff are set to '0'.

(S24) Also, the estimated position x hat[k], estimated velocity v hat[k] and estimated bias b hat[k] for this time are obtained from the sum of the estimated position x bar[k], estimated velocity v bar[k] and estimated bias b bar[k] for this time that were calculated during the previous sample, and the difference between the observed position (detected position) y(k) and estimated position x bar[k] and track value Pref that is multiplied by a gain L. The equations are shown below.

$$x\ \text{hat}[k] = x\ \text{bar}[k] + L1(y[k] - x\ \text{bar}[k] - Pref)$$

$$v\ \text{hat}[k] = v\ \text{bar}[k] + L2(y[k] - x\ \text{bar}[k] - Pref)$$

$$b\ \text{hat}[k] = b\ \text{bar}[k] + L3(y[k] - x\ \text{bar}[k] - Pref)$$

(S25) The instruction current u[k] is obtained by multiplying the estimated velocity v hat[k], target velocity vobj[k] and estimated bias value b hat[k] for this time by a gain F. Furthermore, the output current u out(k) is obtained by adding the bias table value BiasTable(y[k]) and FF current value Uff to the instruction current u(k). The equations are given below.

$$u[k] = -F1 \cdot x\ \text{hat}[k] - F2 \cdot v\ \text{hat}[k] - F3 \cdot b\ \text{hat}[k]$$

$$u\ \text{out}[k] = u(k) + BiasTable(y[k]) + Uff$$

(S26) The estimated position x bar[k+1], estimated velocity v bar[k+1] and estimated bias value b bar[k+1] that are estimated for the next sample using the instruction current u(k), are calculated from the estimated position x hat[k], estimated velocity v hat[k] and estimated bias value b hat[k] for this time, and the instruction current u(k). The equations are given below.

$$x\ \text{bar}[k+1] = x\ \text{hat}[k] + v\ \text{hat}[k] + b\ \text{hat}[k] + Ka/2 \cdot u(k)$$

$$v\ \text{bar}[k+1] = v\ \text{hat}[k] + 2 \cdot b\ \text{hat}[k] + Ka \cdot u(k)$$

$$b\ \text{bar}[k+1] = b\ \text{hat}[k]$$

(S27) The settling is now checked whether it has finished. For example, when the distance (y[k]−y0) becomes within 0.1 track (during reading), or the state of within 0.1 track continues for a specified sample (during writing), settling is determined to be finished. A notification that settling is finished (enables reading/writing) is sent and processing ends. In other word processing moves to following control shown in FIG. 17. To make the explanation easier to understand, the transition conditions of FIG. 17 are duplicated. When settling has not finished, processing returns to step S21.

Settling control is performed in this way.

Next, following control will be explained using FIG. 21. This following control is observer control that estimates the steady-state bias.

(S30) First, the estimated position x hat[k], estimated velocity v hat[k] and estimated bias b hat[k] for this time are obtained from the sum of the estimated position x bar[k], estimated velocity v bar[k] and estimated bias b bar[k] for this time that were calculated during the previous sample, and the difference between the observed position (detected position) y(k) and estimated position x bar[k] that is multiplied by a gain L. The equations are shown below.

$$x\ \text{hat}[k] = x\ \text{bar}[k] + L1(y[k] - x\ \text{bar}[k])$$

$$v\ \text{hat}[k] = v\ \text{bar}[k] + L2(y[k] - x\ \text{bar}[k])$$

$$b\ \text{hat}[k] = b\ \text{bar}[k] + L3(y[k] - x\ \text{bar}[k])$$

(S31) The instruction current u[k] is obtained by multiplying the estimated velocity v hat[k], target velocity vobj[k] and estimated bias value b hat[k] for this time by a gain F. Furthermore, the output current u out(k) is obtained by adding the bias table value BiasTable(y[k]) to the instruction current u(k). The equations are given below.

$$u[k] = -F1 \cdot x\ \text{hat}[k] - F2 \cdot v\ \text{hat}[k] - F3 \cdot b\ \text{hat}[k]$$

$$u\ \text{out}[k] = u(k) + BiasTable(y[k])$$

(S32) The estimated position x bar[k+1], estimated velocity v bar[k+1] and estimated bias value b bar[k+1], that are estimated for the next sample using the instruction current u(k), are calculated from the estimated position x hat[k], estimated velocity v hat[k] and estimated bias value b hat[k] for this time, and the instruction current u(k). The equations are given below.

$$x\ \text{bar}[k+1] = x\ \text{hat}[k] + v\ \text{hat}[k] + b\ \text{hat}[k] + Ka/2 \cdot u(k)$$

$$v\ \text{bar}[k+1] = v\ \text{hat}[k] + 2 \cdot b\ \text{hat}[k] + Ka \cdot u(k)$$

$$b\ \text{bar}[k+1] = b\ \text{hat}[k]$$

(S33) Processing then waits for the next sample and returns to step S30.

Following control is performed in this way.

Also, since each of the steps of following control are the same as steps S24 to S26 of settling control, it is possible to use the same flow.

[Example of Bias Estimation]

Figure 22:
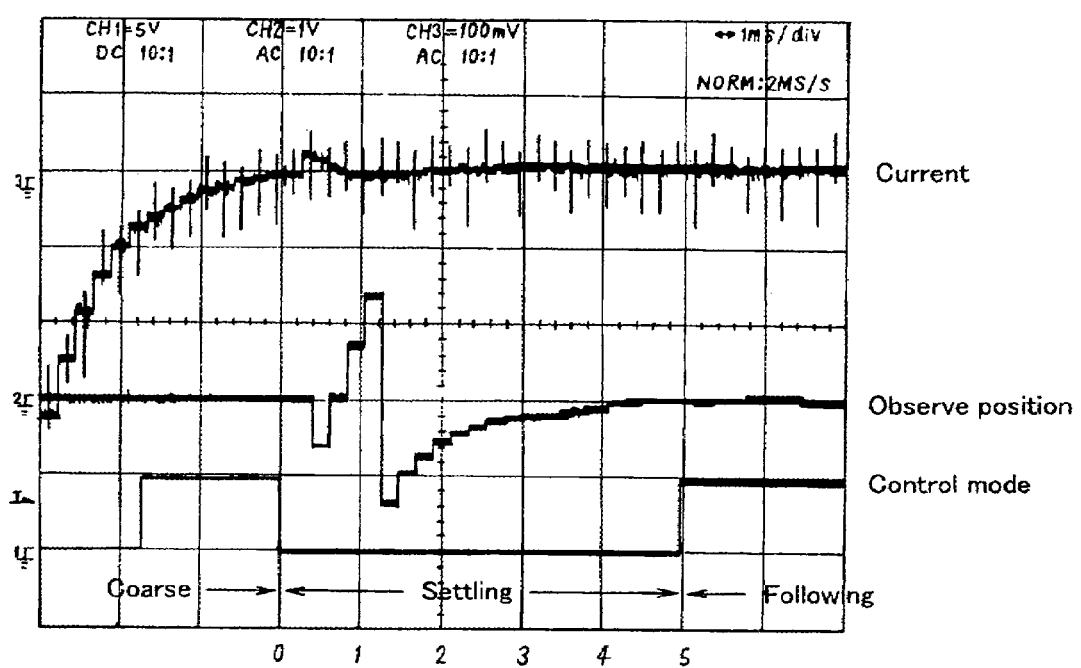
FIG. 22 is a drawing showing the response results of the prior art (1/2).
Figure 23:
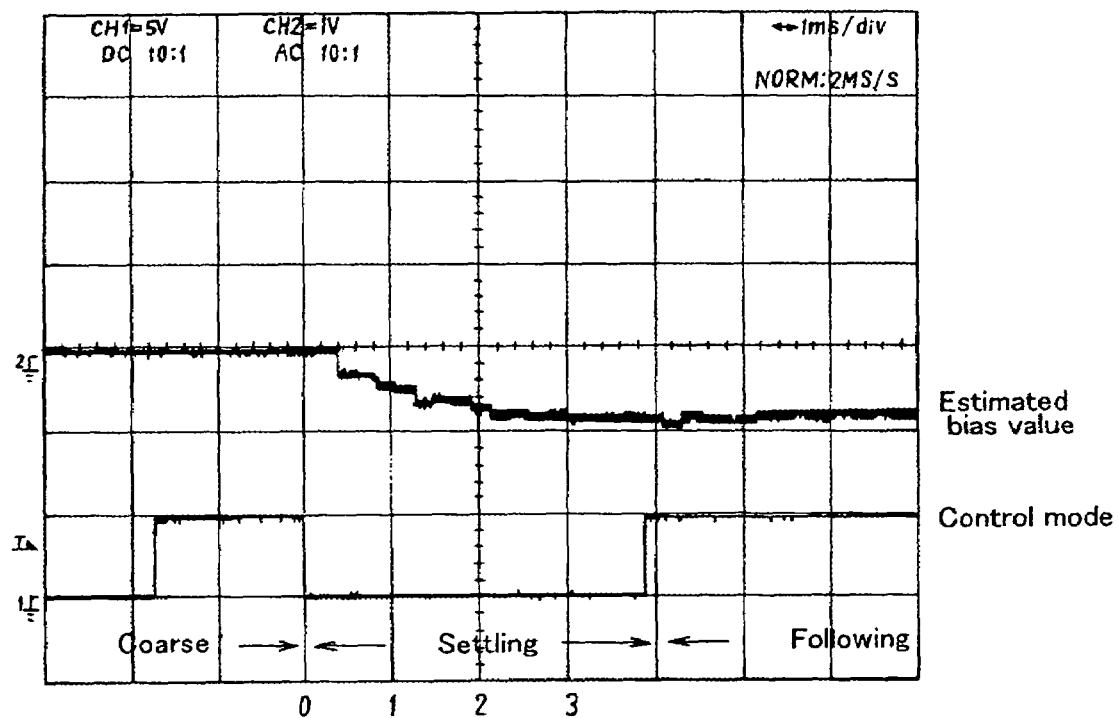
FIG. 23 is a drawing showing the response results of the prior art (2/2).
Figure 24:
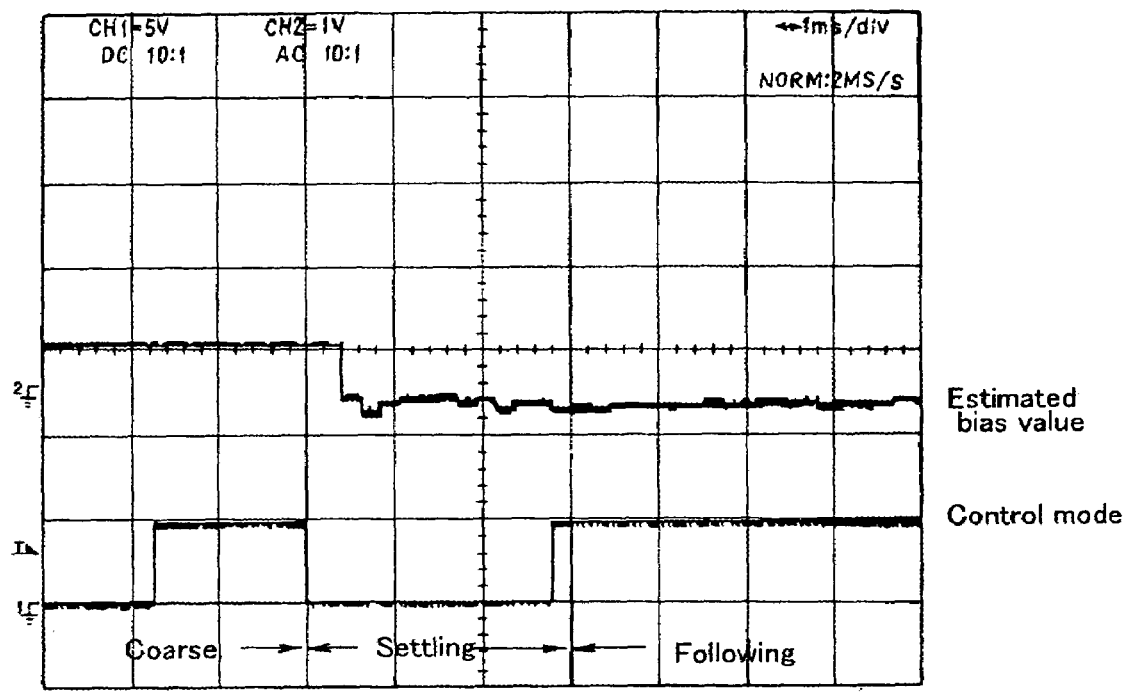
FIG. 24 is a drawing showing the response results of the invention (1/2).
Figure 25:
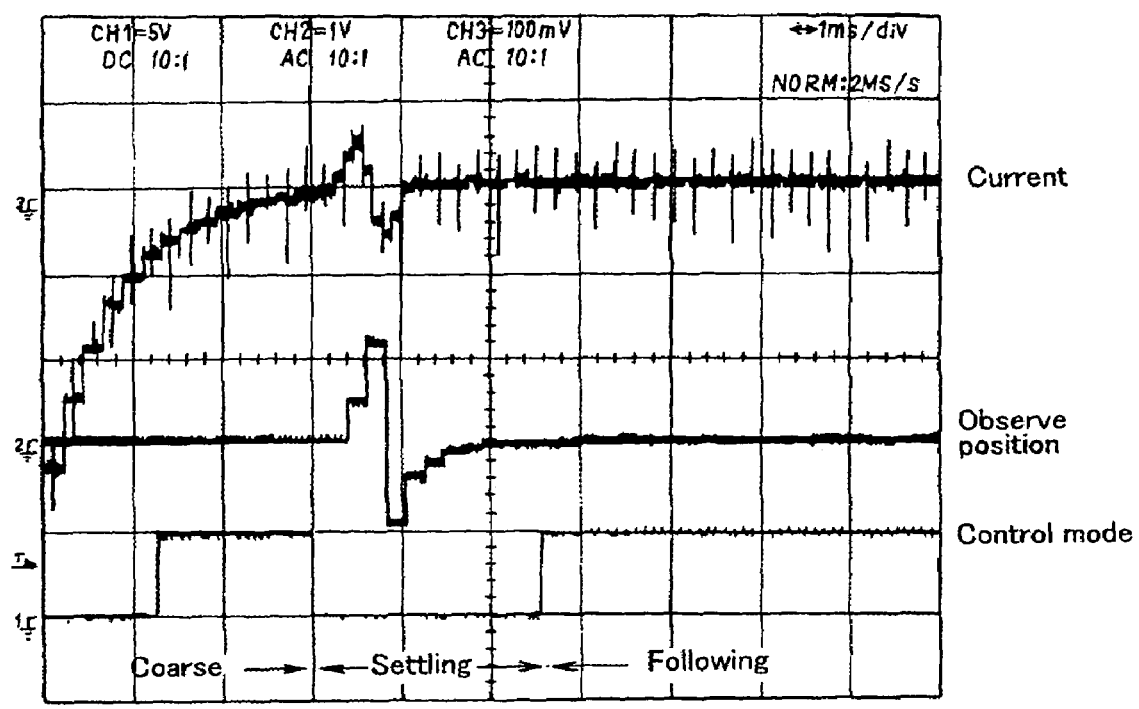
FIG. 25 is a drawing showing the response results of the invention (2/2).

Next, the test results are shown. FIG. 22 and FIG. 23 show the response waveform of the prior settling control (observer control where the initial bias value is set to '0'). FIG. 24 and FIG. 25 show the response waveform of the settling control of this invention.

FIG. 22 shows the current, observed position and control mode for the prior settling control, and FIG. 23 shows the estimated bias value and control mode for the prior settling control. As can be seen in FIG. 22, it takes 4 ms to converge on the position during settling. The reason for this, as shown is FIG. 23, is that it takes about 3 ms to converge on the estimated bias value. The reason that the convergence time becomes long is that the estimated bias value at the start of settling is not the correct value.

FIG. 24 shows the estimated bias value and control mode of settling control of this invention, and FIG. 25 shows the current, observed position and control mode of settling control of this invention. As can be seen in FIG. 24, the correct bias value is shown from the start of settling. Moreover, this bias value is constant and does not fluctuate directly after settling starts. Furthermore, as shown in FIG. 25, the FF current and target position track, that correspond to the initial position and initial velocity, are given for 4 samples from the start of settling. Therefore, the position quickly reaches the target position. In this example, the settling time is 2.5 ms. In the prior example shown in FIG. 22, it took 4 ms. When the average seek time is 10 ms, for example, this 1.5 ms improvement is large.

Figure 26:
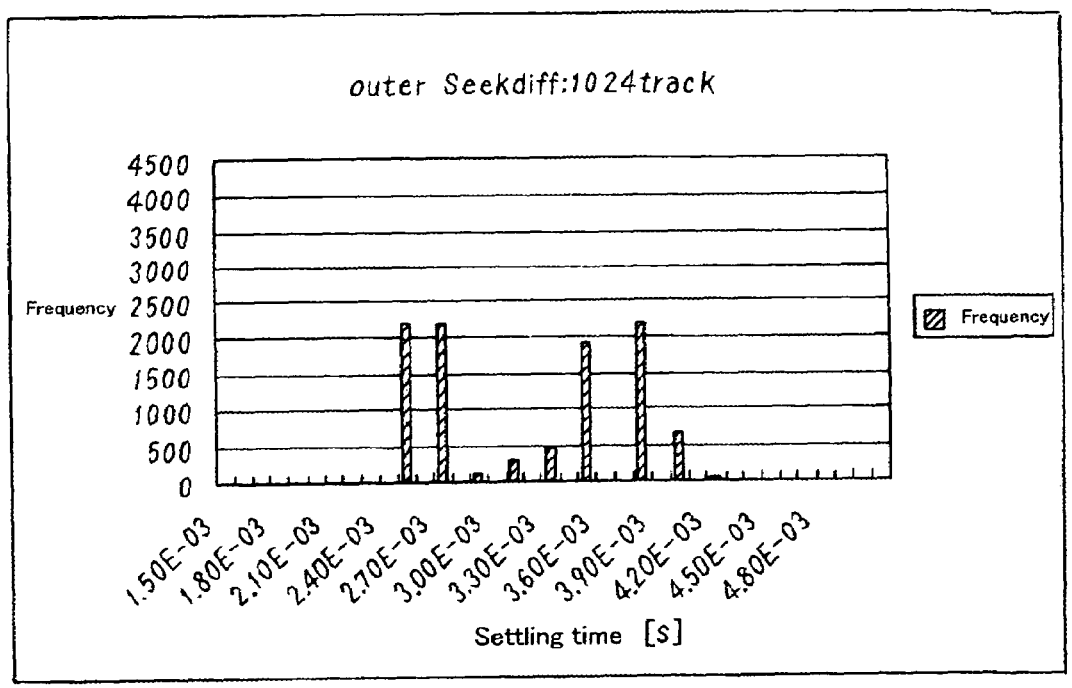
FIG. 26 a histogram of the settling time of the prior art.
Figure 27:
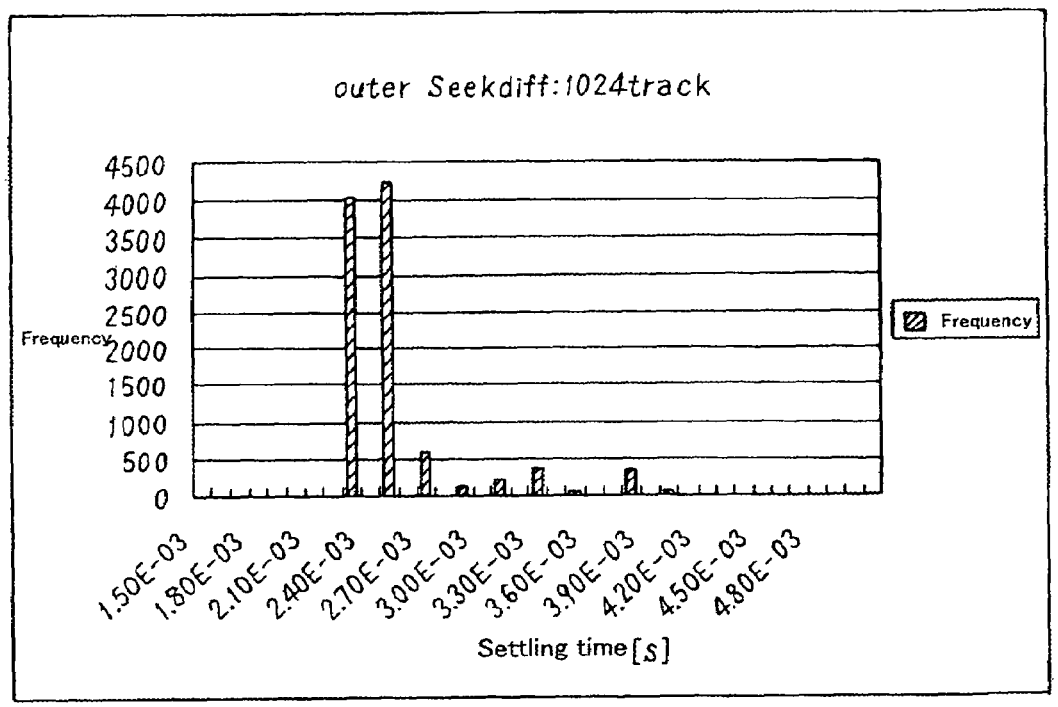
FIG. 27 a histogram of the settling time of the invention.

Next, the fluctuation in settling time when seeking is performed 10,000 times is tested for a 2.5-inch HDD. FIG. 26 is a histogram of the settling time for the prior settling control, and FIG. 27 is a histogram of the settling time of the settling control of this invention. The distance is 1024 tracks. The conditions for the seek control method are the same, and only settling control is changed.

As shown in FIG. 26, the settling time for the prior settling control fluctuated. Therefore, the average value is a long 3.1 ms. As shown in FIG. 27, the settling time in the settling control of this had little fluctuation, and the average value became 2.5 ms. It is possible to reduce the average time by 0.6 ms. Furthermore there is little fluctuation.

Positioning Control of Another Embodiment

Figure 28:
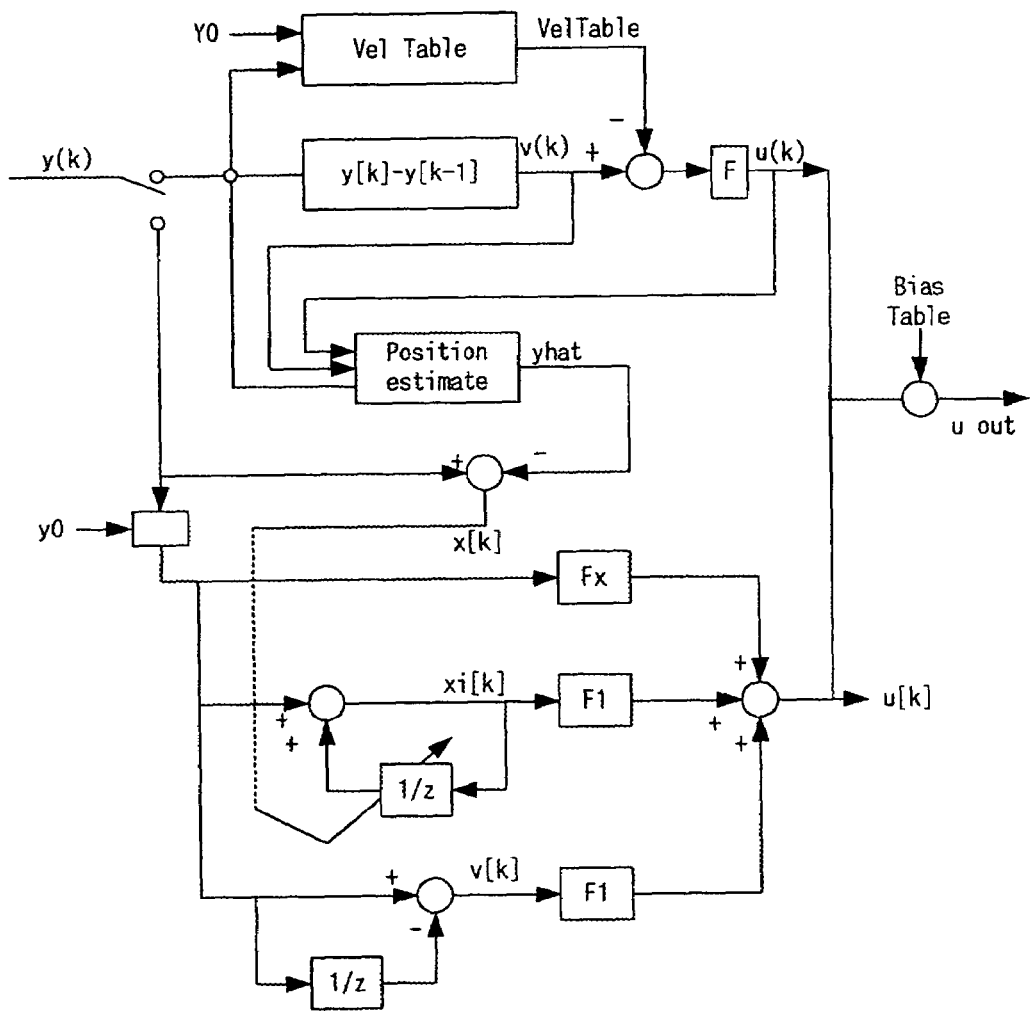
FIG. 28 is a drawing of a model of the control of another embodiment of the invention.

FIG. 28 shows a model of the positioning control system of another embodiment of this invention. In this embodiment, velocity control is used for the coarse control, and PID control is used for the settling control and following control.

In coarse control, velocity is generated according to the position difference. In other words, the actual velocity $v[k]$ is obtained by the following equation.

$$v[k]=y[k]-y[k-1]$$

Moreover, the velocity table is referenced for the distance $(y[k]-y0)$ remaining to the target position $y0$, to generate the target velocity $VelTable(y[k]-y0)$, then the velocity error is fed back, and the instruction current $u[k]$ and output current $u\ out[k]$ are obtained.

$$u[k]=-F \cdot (v[k]-VelTable(y[k]-y0))$$

$$u\ out[k]=u[k]+BiasTable(y[k])$$

At this time, the distance $y\ hat[k+1]$ for the next sample is estimated.

$$y\ hat[k+1]=y[k]+v[k]+Am/2 \cdot u[k]$$

A PID regulator is used during settling control. In other words, the position, derivative and integral components are obtained by the following equations, and then multiplied by a gain to generate current.

$$x[k]=y[k]-y0$$

$$v[k]=x[k]-x[k-1]$$

$$xi[k]=xi[k-1]+x[k]$$

$$u[k]=-Fp \cdot x[k]-Fi \cdot xi[k]-Fv \cdot v[k]$$

The bias value $b[k]$ is estimated by the aforementioned equation (8) at the start of settling, and it is set as the integral component of the PID regulator.

In this way it is possible to apply it to a control system that does not use an observer.

Next, yet another embodiment of the invention is explained.

Figure 29:
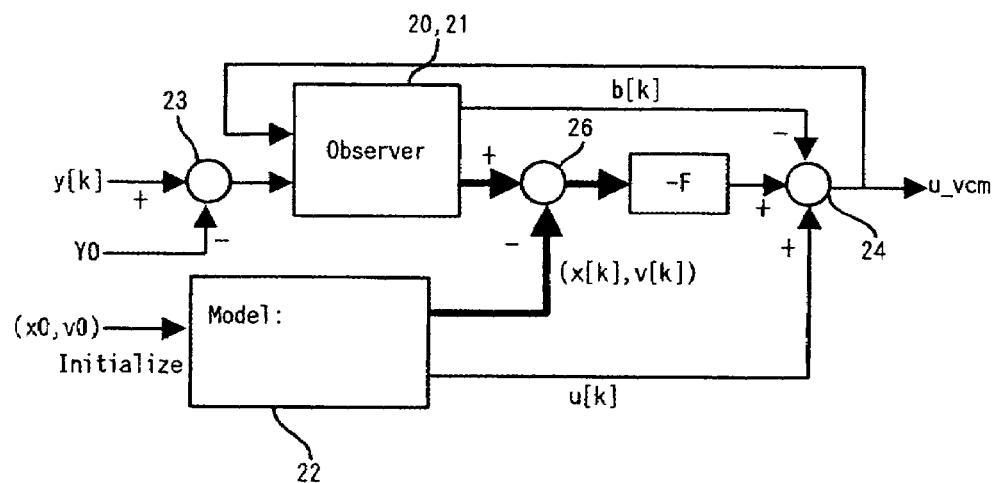
FIG. 29 is a drawing of a model of the control of yet another embodiment of the invention.

FIG. 29 shows a model of another embodiment of the invention.

FIG. 29 shows an example of the change in FF control of the control system of FIG. 6. The same code numbers are used for items that are the same as in FIG. 6. First, the model (track generator) 22 in FIG. 6 calculates the position $x[k]$, velocity $v[k]$ and current $u[k]$. The construction of this model 22 is basically the same as that in FIG. 6, however, generation of the velocity $v[k]$ is different. At this time, a feedback system is constructed as shown in the figure. First, the differences between the position and velocity $x[k]$, $v[k]$ of the target track generator 22 and the position and velocity of the observers 20, 21 are obtained by a differentiator 26, and then multiplied by the feedback gain (−F), to generate a feedback current for the shift from the track. The FF current $u[k]$ is then added to this by an adder 24.

Figure 30:
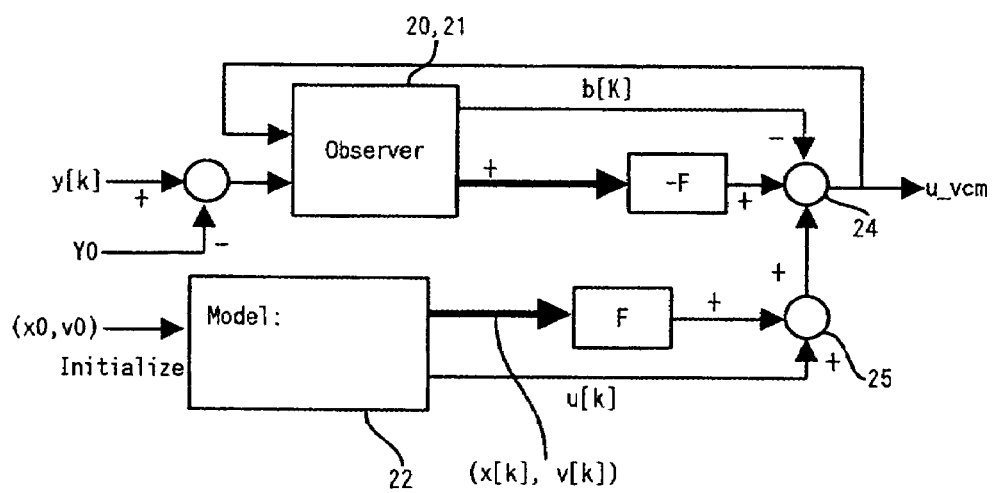
FIG. 30 is a drawing of a model of the control of a further embodiment of the invention.

FIG. 30 shows a model of still a further embodiment of the invention, and shows a variation from FIG. 29.

Here, after the target position $x[k]$ and target velocity $v[k]$ of the model 22 are multiplied by a feedback gain (F) it is added to the system as current. In other words, the FF current $u[k]$ and this current are added by an adder 25, and then added to the adder 24. By doing this, only the value of the current need to be saved in a table. In other words, there is a FF current for the initial position and a FF current for the initial velocity. It is no longer necessary to have a target position trajectory.

[Positioning Control of Another Embodiment]

Figure 31:
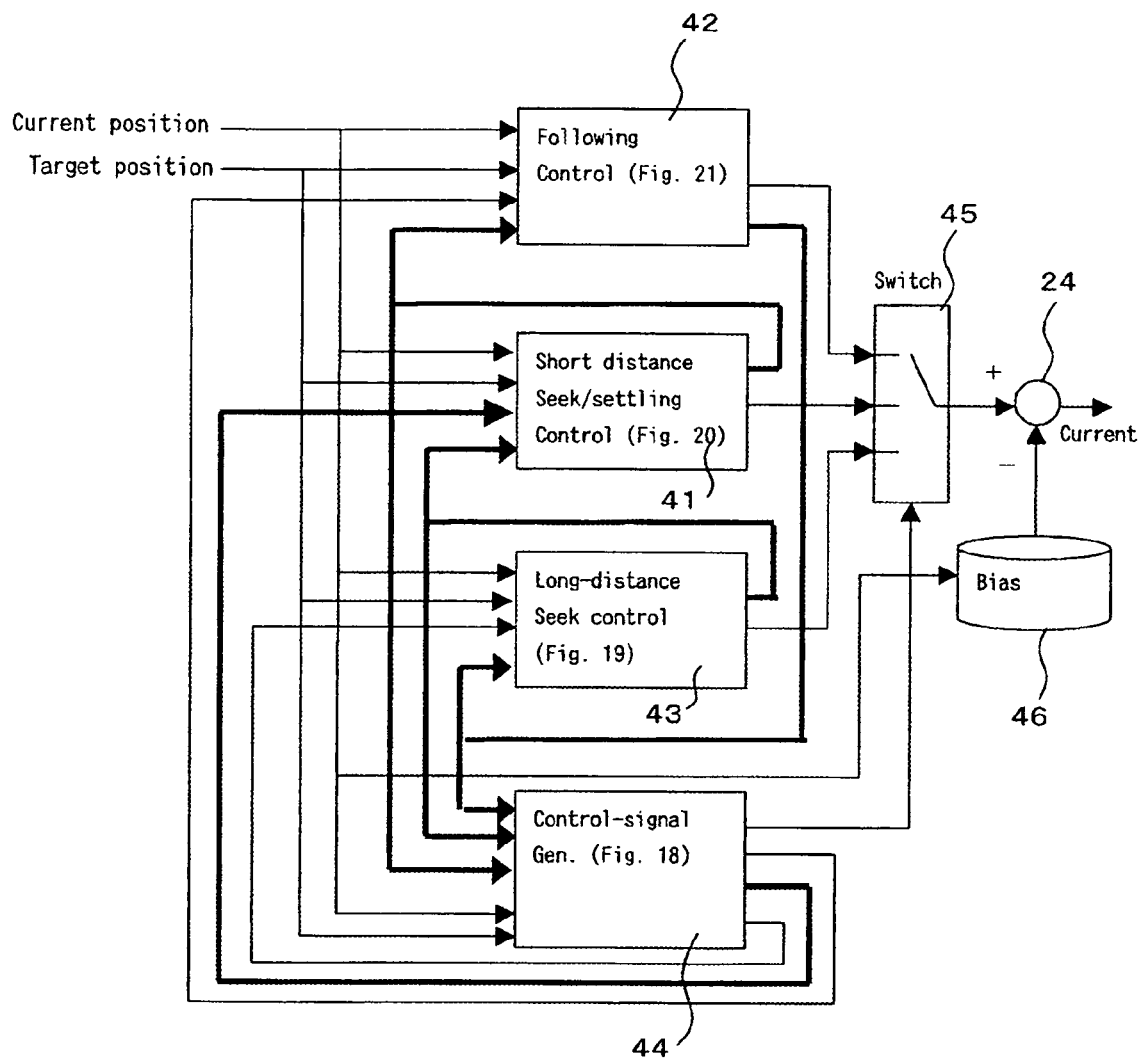
FIG. 31 is a drawing of a model of the positioning control system of another embodiment of the invention.
Figure 32:
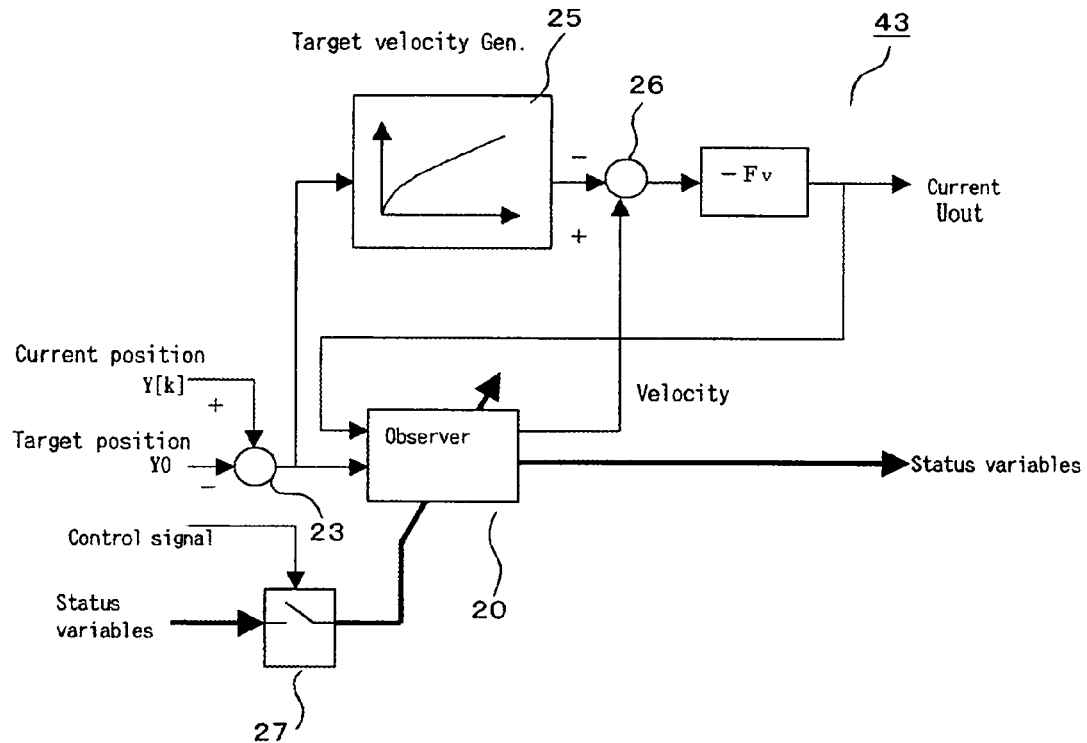
FIG. 32 is a schematic diagram of the long-distance seek control unit in FIG. 31.
Figure 33:
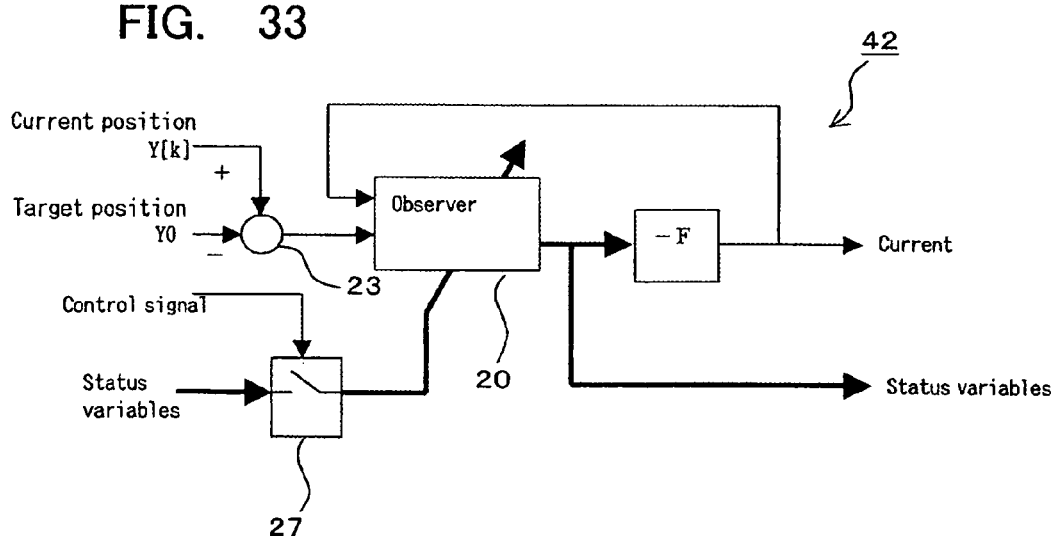
FIG. 33 is a schematic diagram of the following control unit in FIG. 31.
Figure 34:
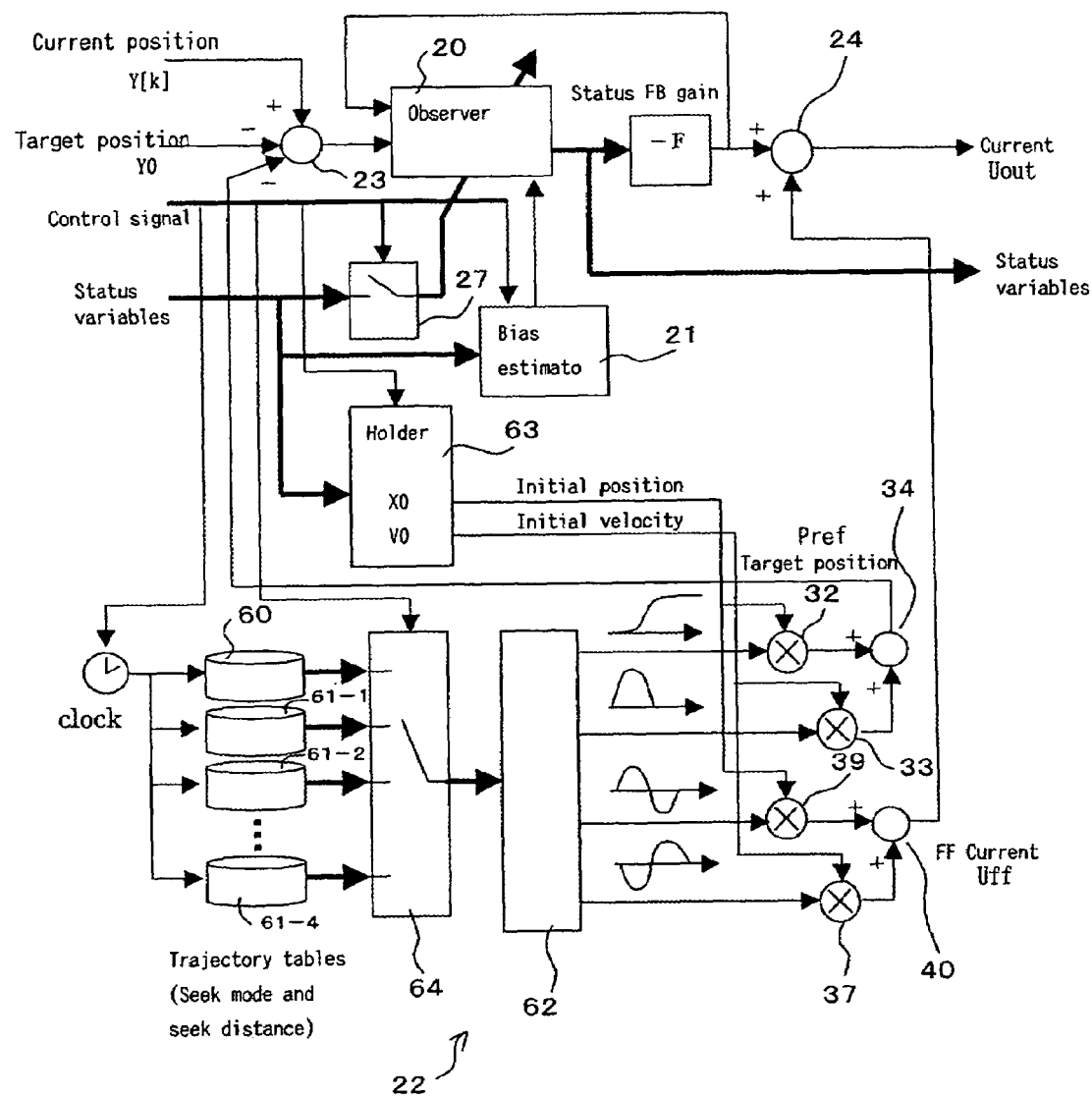
FIG. 34 is a block diagram of the short-distance seek/settling control unit in FIG. 31.
Figure 35:
FIG. 35 is a drawing explaining the trajectory tables in FIG. 34.
Figure 35:
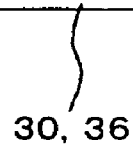
Figure 35:

Next, the trajectory control explained using FIG. 6 will be explained in further detail. FIG. 31 is a block diagram of the positioning control system of another embodiment of the invention, FIG. 32 is a block diagram of the long-distance seek control (coarse control) shown in FIG. 31, FIG. 33 is a block diagram of the following control shown in FIG. 31, FIG. 34 is a block diagram of the short-distance and settling control shown in FIG. 31, and FIG. 35 is a schematic diagram of the trajectory table of FIG. 31.

As shown in FIG. 31, the positioning control system comprises a control-signal generator 44, long-distance seek controller 43, short-distance seek/settling controller 41, following controller 42, switching unit 45, bias table 46 and adder 24.

The control-signal generator 44 and switching unit 45 make up a block that performs the same control as the task control explained using FIG. 18. In other words, when an on-track start command is received and the target value 'y0' has not changed, then following control 42 is specified, and at the instant that the target value 'y0' changes, the distance to the target value 'y0' is determined whether or not it is 16 tracks or less. When the distance to the target value 'y0' is not 16 tracks or less, then long-distance seek control (coarse control) 43 is specified (see FIG. 19).

When the distance to the target value 'y0' is 16 tracks or less at the instant when the on-track start command is received, then short-distance seek control 41 is specified. When long-distance seek control 43 is specified and when the distance to the target value 'y0' is 4 tracks or less and the specified settling conditions are satisfied, then control changes to following control 42. However, when the specified settling conditions are not satisfied, settling control 41 (see FIG. 20) is executed.

Moreover, for seek processing, in long-distance seek (here this is seeking of 16 tracks or more), when coarse control is performed and the distance becomes 4 tracks or less, then control changes to settling control, and when the settling conditions are satisfied, then control changes to following control. Also, in short-distance seek (here this is seeking of less than 16 tracks), the same settling control is performed, and when the settling conditions are satisfied, control changes to following control.

The instruction current from this switching unit 45 is added to the value of the bias table 46, that stores the bias table value accessed at the current position, by the adder 24, and is then output to the actuator amp.

Next, long-distance seeing (coarse) control will be explained using FIG. 32. This coarse control is the velocity control that uses the observer 20 shown as a block in FIG. 19, and the operation is the same.

In other words, the observer 20 initializes the present estimated position x bar[k] to the distance (y[k]−y0) from the adder 23. y[k] is the detected position (current position) obtained from the head 4, and y0 is the target position. The target velocity generator 25 calculates the target velocity vobj[k] that corresponds to the distance (y[k]−y0) according to the velocity curve of the coarse control shown in FIG. 4.

In addition, the observer 20 obtains the present estimated position x hat[k] and estimated velocity v hat[k] from the sum of the estimated position x bar[k] and estimated velocity v bar[k], that were calculated for the previous sample, and the difference of the observed position (detected position) y(k) and estimated position x bar[k] multiplied by the gain L. The equations used for calculation are shown below.

$x\ \text{hat}[k]=x\ \text{bar}[k]+L4(y[k]-x\ \text{bar}[k])$ $v\ \text{hat}[k]=v\ \text{bar}[k]+L5(y[k]-x\ \text{bar}[k])$ Furthermore, the adder 26 obtains the instruction current value u[k] by multiplying the difference (velocity error) between the present estimated velocity v hat[k] and the target velocity vobj[k] with the gain F. The output current u out(k) is obtained by adding the bias table value BiasTable (y[k]) in FIG. 31 to the instruction current value u(k). The equations used for calculation are shown below.

$u[k]-F4(v\ \text{hat}[k]-vobj[k])$ $u\ \text{out}[k]=u(k)+\text{BiasTable}(y[k])$ Moreover, the observer 20 calculates the estimated position x bar[k+1] and estimated velocity v bar[k+1] for the next sample corresponding to this instruction current u(k) from the present estimated position x hat[k] and estimated velocity v hat[k] and instruction current u(k). The equations used for calculation are shown below.

$x\ \text{bar}[k+1]=x\ \text{hat}[k]+v\ \text{hat}[k]+Am/2*u(k)$ $v\ \text{bar}[k+1]=v\ \text{hat}[k]+Am*u(k)$ The control-signal generator 44 determines whether or not the distance (y[k]−y0) is 4 tracks or less, and when the distance (y[k]−y0) is 4 tracks or less, long-distance seek control ends and control changes to settling control. However, when the distance (y[k]−y0) is not less than 4 tracks, the control-signal generator 44 waits for the next sample and then repeats the operation.

Next, following control 42 will be explained using FIG. 33. This following control is the observer control, which estimates the steady-state bias that was explained using FIG. 21, that has been taken as a block.

In other words, the observer 20, first obtains the present estimated position x hat[k], estimated velocity v hat[k] and estimated bias b hat[] from the sum of the estimated position x bar[k], estimated velocity v bar[k] and estimated bias b bar[k], calculated for the previous sample, and the difference (output from the adder 23) between the observed position (detected position) y(k) and the estimated position x bar[k] multiplied by the gain L. The equations used for calculation are shown below.

$x\ \text{hat}[k]=x\ \text{bar}[k]+L1(y[k]-x\ \text{bar}[k])$ $v\ \text{hat}[k]=v\ \text{bar}[k]+L2(y[k]-x\ \text{bar}[k])$ $b\ \text{hat}[k]=b\ \text{bar}[k]+L3(y[k]-x\ \text{bar}[k])$ Next, the instruction current u[k] is obtained by multiplying the present estimated position x hat[k], estimated velocity v hat[k] and estimated bias b hat[k] with the gain F. Furthermore, the output current u out[k] is obtained by adding the bias table value BiasTable (y[k]) to the instruction current u(k) as shown in FIG. 31. The equations used for calculation are shown below.

$u[k]=-F*x\ \text{hat}[k]-F2*v\ \text{hat}[k]-F3*b\ \text{hat}[k]$ $u\ \text{out}[k]=u(k)+\text{BiasTable}(y[k])$ The observer 20 calculates the estimated position x bar [k+1], estimated velocity v bar[k+1] and estimated bias b bar[k+1] for the next sample corresponding to this instruction current u(k) from the present estimated position x hat[k] and estimated velocity v hat[k], estimated bias b hat[k] and instruction current u(k). The equations used for calculation are shown below.

$x\ \text{bar}[k+1]=x\ \text{hat}[k]+v\ \text{hat}[k]+b\ \text{hat}[k]+Ka/2*u(k)$ $v\ \text{bar}[k+1]=v\ \text{hat}[k]+2*b\ \text{hat}[k]+Ka*u(k)$ $b\ \text{bar}[k+1]=b\ \text{hat}[k]$ This is repeated.

Next, short-distance seek/settling control is explained using FIG. 34 and FIG. 35. This control is basically the observer control that estimates the steady-state bias explained using FIG. 6 and FIG. 20. However, a table for short-distance seek is added. In other words, the trajectory table comprises a trajectory table for settling control 60, and N trajectory tables (4 tables in this example) for short-distance seek 60-1 to 60-4.

In each of the trajectory tables 60, 61-1 to 61-4, there are trajectory tables 30, 31, that were explained using. FIG. 6, and current tables 36, 38 that correspond to the control mode and seek distance. The switching unit 64 selects the trajectory tables 60, 61-1 to 61-4 according to a control signal from the control-signal generator 44, and the distributor 62 distributes the four outputs of the selected trajectory tables to the multipliers 32, 33, 37, 39.

FIG. 34 shows an example of giving the current and position in the trajectory to the control system. In other words, a trajectory generator 22 contains the current trajectory and the target position trajectory. Therefore, the trajectory tables 60, 61-1 to 61-4 have unit trajectory generators 36, 38 for the current and unit trajectory generators 30, 31 for the target position. In addition, the trajectory generator 22 drives the unit trajectory generators 30, 31 for the target position according to the clock source, and generates a target position trajectory using the multipliers 32, 33 and adder 34 that is proportional to the initial position X0 and initial velocity V0 at the start of short distance seek or settling. This target position trajectory is given to the adder 23 at the front stage of the observer 20 as a target value, and the difference between that value and the detected position is found, and then it is input to the observer 20 as the observed position.

Similarly, the trajectory generator 22 drives the unit trajectory generators 36, 38 for the current and generates a target current trajectory using the multipliers 37, 39 and adder 40 that is proportional to the initial position X0 and initial velocity V0 at the start of short distance seek and settling. This target current trajectory is given to the adder 24 at the output stage of the observer 20.

In this way, feed-forward control is performed during short-distance seek and settling control, so a high-speed response is possible. Also, since the initial velocity is also used as a parameter in addition to the initial position, feed-forward control that is capable of shortening the convergence time is possible even when the initial velocity differs. Moreover, since resonance effects, including the current amp characteristics, are taken into consideration when designing the trajectory, high-speed response is possible even when feed-forward control is performed.

As described below, the unit trajectory is designed such that the convergence time will be a minimum, and differs depending on settling control and the short-distance seek distance. In this example, short-distance seeking is divided into four types: 1 (0 to 4 tracks), 2 (5 to 8 tracks), 3 (9 to 12 tracks) and 4 (13 to 16 tracks), and there is a respective trajectory table 61-1 to 61-4 designated for each.

This operation will be explained. Initial values are set at the start of short-distance seek and the start of settling control. First, the bias estimator 21 sets the estimated velocity v bar[k] to the current velocity 'V0'. When doing this, as described above, the velocity is corrected according to difference between observed position y[k] and estimated position x bar[k]. In other words, the initial value for the estimated velocity v bar[k] is obtained from Equation (9).

$$v\ bar[k] = v\ bar[k] + Kv(y[k] - x\ bar[k]) \quad (9)$$

In addition, the bias estimator 21 calculates the initial bias value from equation (8) based on the error between the actual position and the position estimated by the observer 20.

$$b\ bar[k] = Kx(y[k] - x\ bar[k]) \quad (8)$$

Furthermore, the observer 20 sets the estimated position x bar[k] to the current position X0 (=y[k]). The initial position and initial velocity are held in a holding unit 21. Next, count value Count, that indicates the feed-forward period, is initialized to '1'.

Next, the observer 20 determines whether or not the count value Count is greater than 'N' (feed-forward end value). When the count value Count is not greater than 'N', the observer 20 reads the unit trajectory values PxTable[Count], PvTable[Count], that correspond to the count value Count, from the trajectory tables 60, 60-1 to 60-4 (blocks 30 and 31 in FIG. 6), that are selected by the selector 64 according to the seek mode and the distance of short-distance seek, and then using the multipliers 32, 33 and adder 34, calculates the trajectory value (target position) Pref, that corresponds to the initial position X0 and initial velocity V0, from the following equation.

$$Pref = X0 * PxTable[Count] + V0 * PvTable[Count]$$

Moreover, the observer 20 reads the unit current values UxTable[Count], UvTable[Count], that correspond to the count value Count, from the trajectory tables 60, 60-1 to 60-4 (current tables (blocks 36, 38 in FIG. 6)), that are selected by the selector 64 according to the seek mode and short-distance seeking distance, and then using the multipliers 37, 39 and adder 40, calculates the current value Uff, that corresponds to the initial position X0 and initial velocity V0, from the following equation.

$$Uff = X0 * UxTable[Count] + V0 * UvTable[Count]$$

Furthermore, the observer 20 increases the count value Count by an increment of '1'. On the other hand, when the count value Count is greater than 'N', the feed-forward period has ended so the observer 20 sets the trajectory value Pref and current value Uff to '0'.

In addition, the observer 20 obtains the present estimated position x hat[k], estimated velocity v hat[k] and estimated bias b hat[k] from the sum of the estimated position x bar[k], estimated velocity v bar[k] and estimated bias b bar[k], that were calculated for the previous sample, and the difference between the observed position (detected position) y(k) and the estimated position x bar[k] and trajectory value Pref, that is multiplied by a gain L. The equations used for calculation are shown below.

$$x\ hat[k] = x\ bar[k] + L1(y[k] - x\ bar[k] - Pref)$$

$$v\ hat[k] = v\ bar[k] + L2(y[k] - x\ bar[k] - Pref)$$

$$b\ hat[k] = b\ bar[k] + L3(y[k] - x\ bar[k] - Pref)$$

Moreover, the observer 20 obtains the instruction current u[k] by multiplying the present estimated position x hat[k], estimated velocity v hat[k] and estimated bias b hat[k] with a gain F. Furthermore, the output current u out[k] is obtained by adding the bias table value BiasTable (y[k]) in FIG. 31 and the feed-forward current value Uff to the instruction current u[k] by the adder 24. The equations used for calculation are shown below.

$$u[k] = -F1 * x\ hat[k] - F2 * v\ hat[k] - F3 * b\ hat[k]$$

$$u\ out[k] = u(k) + BiasTable(y[k]) + Uff$$

The observer 20 calculates the estimated position x bar[k+1], estimated velocity v bar[k+1] and estimated bias b bar[k+1] for the next sample corresponding to this instruction current u(k) from the present estimated position x hat[k] and estimated velocity v hat[k], estimated bias b hat[k] and instruction current u(k). The equations used for calculation are shown below.

$$x\ bar[k+1] = x\ hat[k] + v\ hat[k] + b\ hat[k] + Ka/2 \cdot u(k)$$

$$v\ bar[k+1] = v\ hat[k] + 2 * b\ hat[k] + Ka * u(k)$$

$$b\ bar[k+1] = b\ hat[k]$$

The control-signal generator 44 determines whether or not settling is complete. For example, settling is determined to be complete when the distance (y[k]−y0) is 0.1 track or less (during reading), or when the distance continues to be 0.1 track or less (during writing) for the specified sample. When settling is determined to be complete, the control-signal generator 44 notifies that settling is complete (enables reading/writing). In other words, control changes to following control shown in FIG. 17.

The initial bias estimator 21 of this observer 20 is the same as described above. In other words, the initial bias estimator 21 finds the difference between the position x bar[k] observed by the observer 20 and the actual position y[k] at the start of short-distance seeking, start of settling or just before the start of settling, and multiplies that position error by a preset gain Kx to calculate the bias value, then sets that initial bias value for the observer 20. Furthermore, the initial bias estimator 21 adds the product of the position error multiplied by the gain Kv to the estimated velocity v bar[k] of the observer 20 to correct the estimated velocity. In FIG. 6, the value of obtained by subtracting the target position Yo from the detected position y[k] (absolute position) is taken to be the actual position (relative position). The detected position y[k] is obtained from the position signal from the magnetic head 4 described above.

In this invention, in order to further shorten the short-distance seek time and the settling time, feed-forward control is used during short-distance seeking and settling control. In other words, by only estimating the bias value, only the settling time is shortened because the response depends on the range or status feedback pole of the control system. For example, when the status feedback pole is located at 500 Hz, convergence takes 1/500=2 ms.

In order to speed up this response, feed-forward control is adopted in short-distance seeking and settling control. In order to do this, as shown in FIG. 6, a trajectory generator 22 is used. The trajectory generator 22 generates a target trajectory and feed-forward current (call the FF current below) that correspond to the initial position x0 and initial velocity v0 at the start of settling, and gives those to the control system.

This target trajectory and feed-forward current generates the trajectory and current that corresponds to the initial position 'x0' and initial velocity 'v0'. In this way, the shortest seek time that corresponds to the initial position and initial velocity is obtained. The trajectory and current for this are designed in advance as described later. For this control, the trajectory and current design must take into consideration the effects of the cutoff frequency of the current amp and the effects of resonance of the actuator.

FIG. 35 shows an example of this trajectory table. The trajectory is divided into position trajectories 30, 36 and velocity trajectories 31, 38. In other words, position trajectories 30, 36 when the initial position is track '1', and the initial velocity is 0 tracks/sample, and the final position and final velocity are '0'; and trajectories (velocity trajectories) 31, 38 when the initial position is track '0', and the initial velocity is 1 track/sample, and the final position and final velocity are '0'. The position trajectories and velocity trajectories contain a time waveform for time versus target position 'X' and time versus current 'u'.

In FIG. 35, the target position, changes at a single rate (sample interval), and the current changes at a multiple rate (half of the sample interval) in order that high-speed convergence can be obtained. In addition, the trajectories when the initial position is track X0 and the initial velocity is V0 tracks/sample are combined by multiplying two trajectories by gains for X0 and V0. By doing this, it is possible to obtain trajectories for arbitrary initial positions and initial velocity by combining one unit trajectory.

Feed-forward is performed according to the feed-forward current in this way, and since the position offset is fed forward on the position trajectory by the feed-forward current before the plant response so it is possible to greatly shorten the convergence time. Also, since feed-forward control is applied to short-distance seeking in addition to settling control so it is possible to further shorten the seek time in short-distance seeking. Moreover, trajectory control can be applied to short-distance seeking alone, or to settling control alone. Furthermore, since both a settling control and short-distance seeking share the same control system, it is possible to make the circuits more compact and reduce the scale of the program used.

[Trajectory Generation Method]

Figure 36:
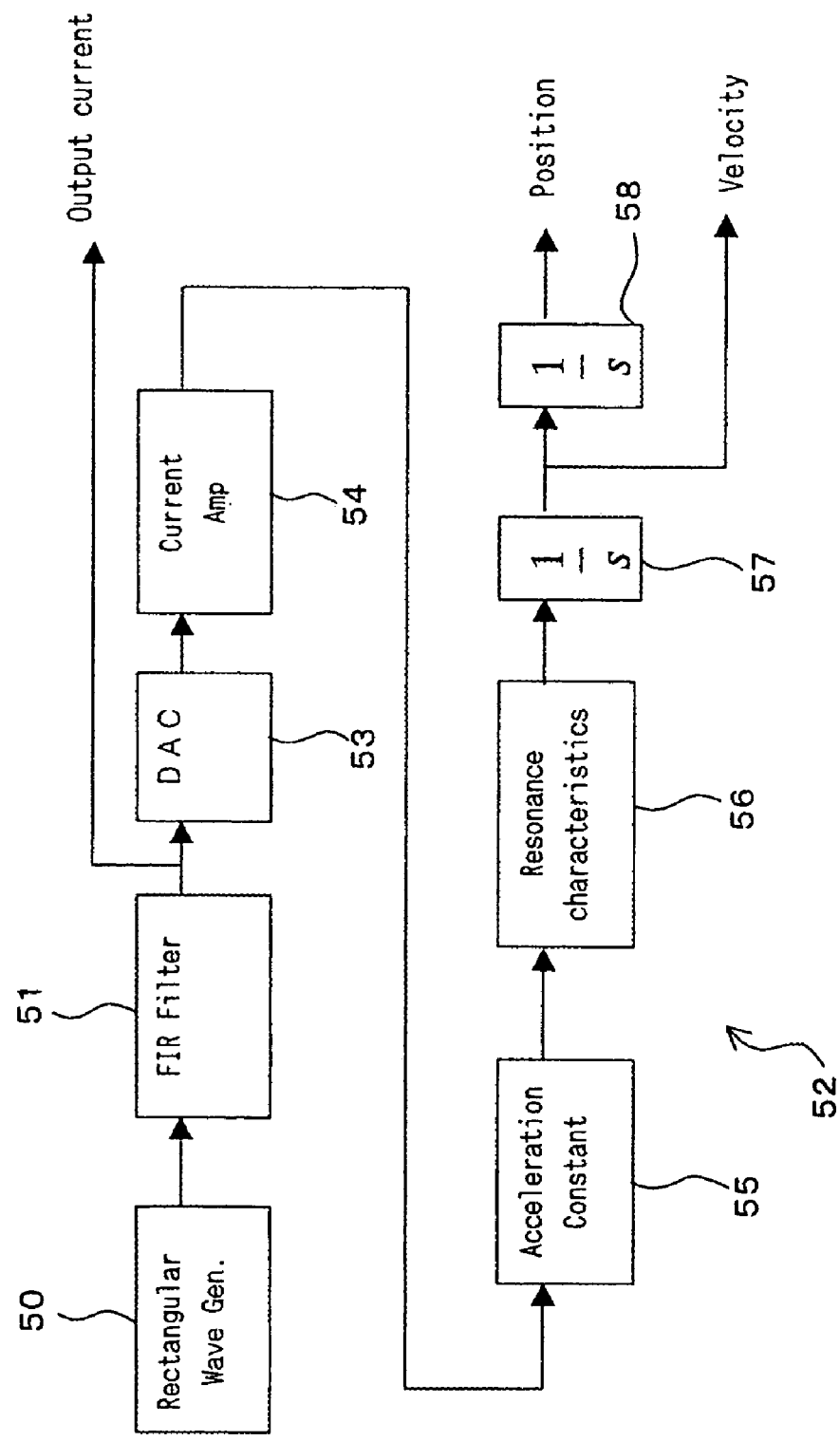
FIG. 36 is a drawing explaining the trajectory design simulation model of another embodiment of the invention.
Figure 37:
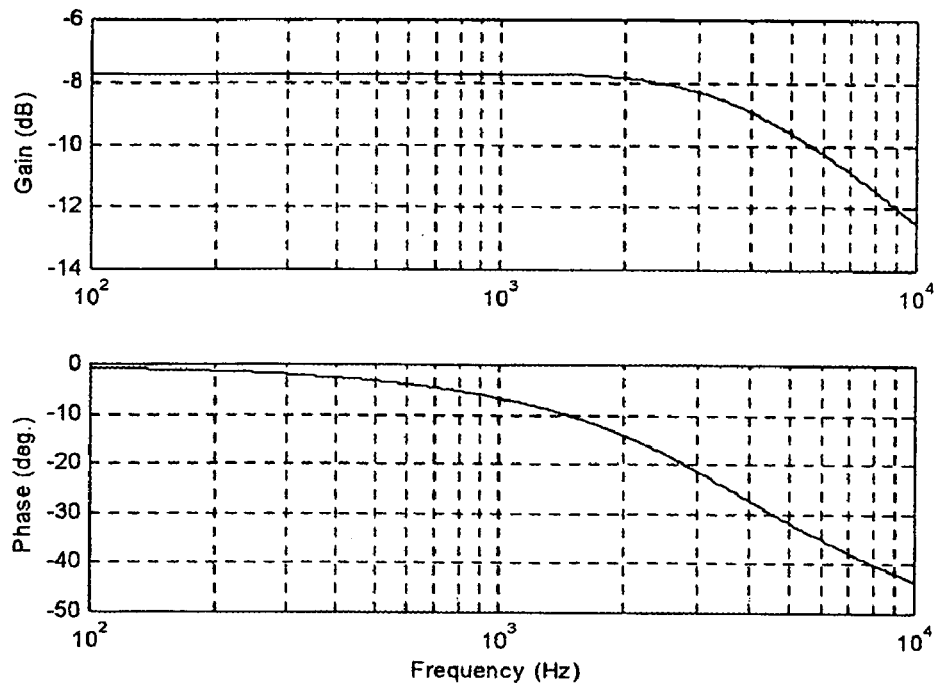
FIG. 37 is a drawing explaining an example of a model of the current amp in FIG. 36.
Figure 38:
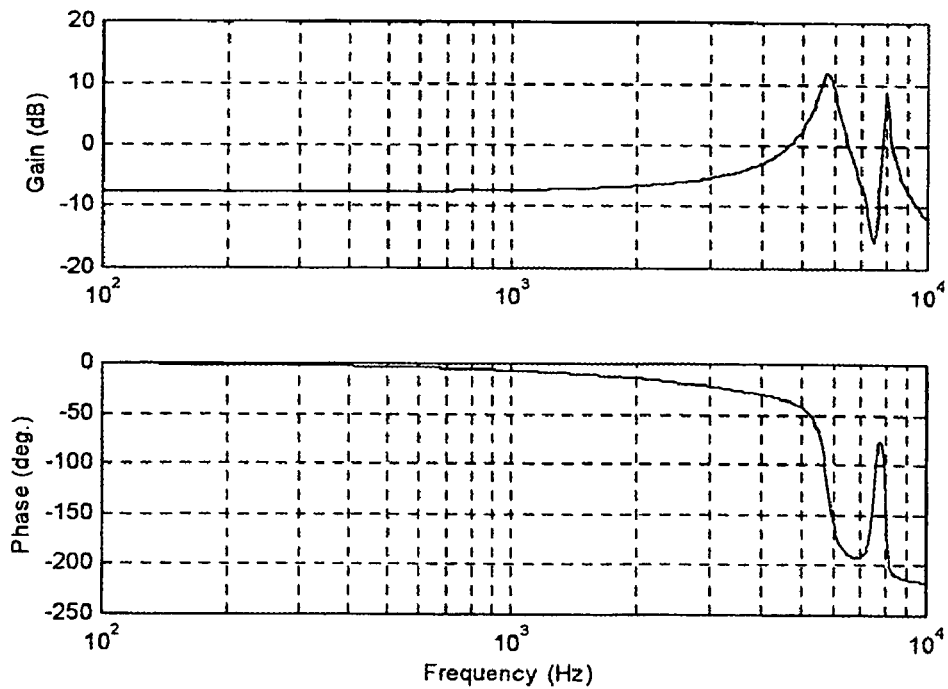
FIG. 38 is a drawing explaining a model of the resonance characteristics in FIG. 36.
Figure 39:
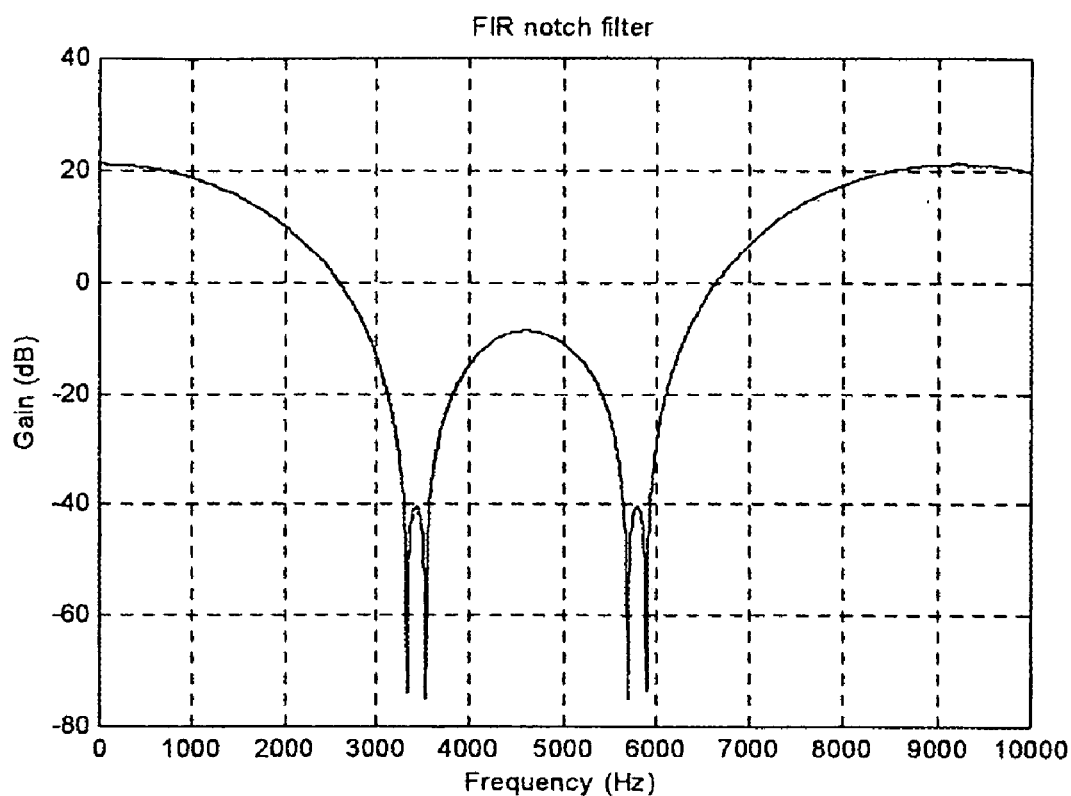
FIG. 39 is a drawing showing the frequency characteristics of the FIR filter in FIG. 36.
Figure 40:
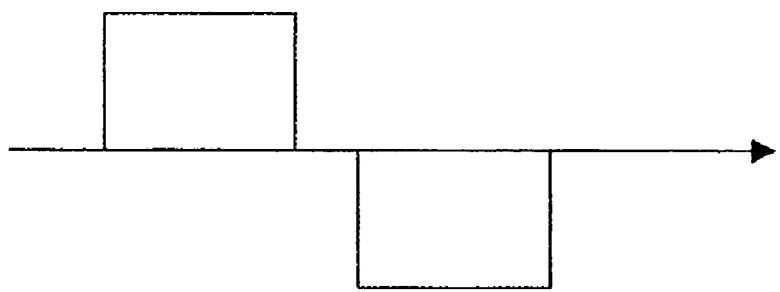
FIG. 40 is a drawing explaining the rectangular waveform of the position trajectory generation in FIG. 36.
Figure 41:
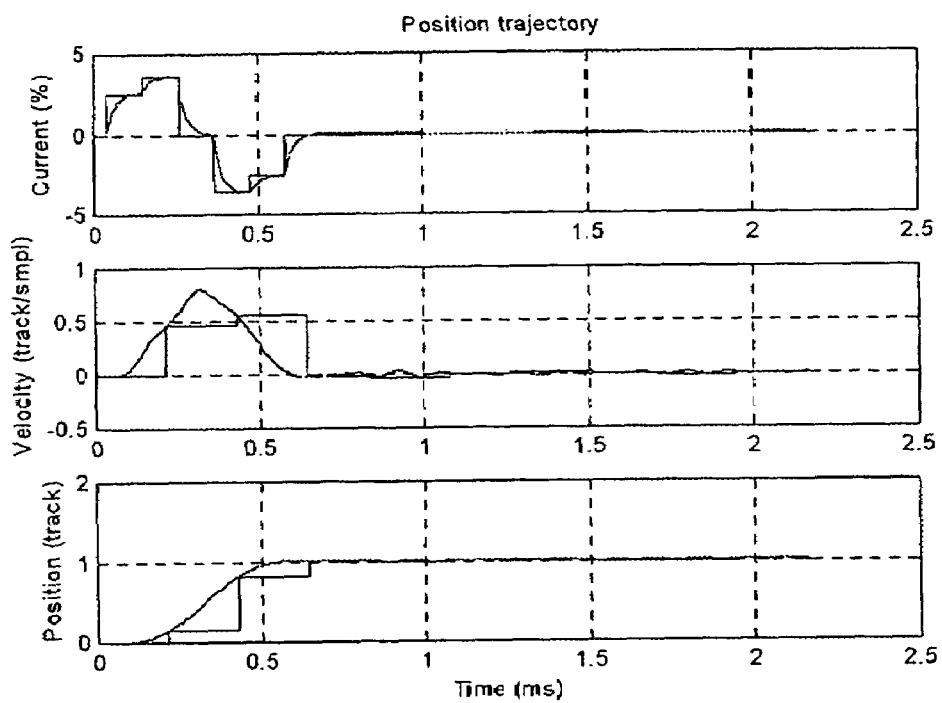
FIG. 41 is a drawing explaining the position trajectory generation in FIG. 36.

Next, an example of designing the unit position trajectories and velocity trajectories for the trajectory tables 60, 61-1 to 61-4 will be explained in detail. FIG. 36 is a block diagram of simulation for designing trajectories and FF current; FIG. 37 is a drawing explaining a model of the current amp; FIG. 38 is a drawing explaining a model of the characteristics of resonance; FIG. 39 is a drawing explaining an example of the design for an FIR filter; FIG. 40 and FIG. 41 are drawings explaining the position trajectory design; and FIG. 42 to FIG. 45 are drawings explaining the velocity trajectory design.

First, as shown in FIG. 36, in order to design the seek trajectory, a detailed model of the plant is made, to remove any difference between the actual response and the simulation. For the simulation model shown in FIG. 36, it is possible to use commercially sold software such as MATLAB sold by The MathWorks, Inc. (USA), or it is possible to independently use a general-purpose programming language such as C language.

Here, a design example is shown for an HDD having a sample frequency for detecting position of 4.62 kHz, and that drives the current output at a sample frequency that is double that.

The controlled model 52 shown in FIG. 36 is an actuator, current amp or other filter characteristics (only when using an analog or digital notch filter or low-pass filter in the circuit), and each is expressed by a transfer function.

The procedure for finding the transfer function is the same for each, and is performed as follows.

The frequency characteristics are measured with an FFT analyzer, and a transfer function is found such that it matches the measured frequency characteristics (gain and phase curve). In order to find the transfer function, analysis software such as MATLAB may be used. Also, in the case that the transfer function has already been found analytically, that transfer function can be used. However, it is necessary to make sure there is no difference between the actual measurement results.

The model of the current amp 54 in FIG. 36 is frequency versus gain and the frequency characteristics of the phase shown in FIG. 37. Also, the resonance characteristics model 56 of the actuator in FIG. 36 is the frequency characteristics shown in FIG. 38. Moreover, the acceleration model 55 is a model of the acceleration of the actuator. Furthermore, DAC 53 is a model of the DA converter.

Next, the specifications for digital control are set. First, the sample period for the current output (or the sample period for position detection) is set. For example, when performing double multi-rate control, the sample period is half the sample period for position detection.

Next, the delay time for the current output is set. This delay time is defined as the time from when the position signal is detected until the current actually changes. Moreover, when setting the DAC resolution, or in other words, the VCM current, this delay time determines the resolution set by the number of DAC bits.

Finally, the other specifications are set. First, the target seek times are set for each seek distance. The specifications for the target seek times for each distance, such as 1 track or 2 tracks, are set. However, when actually designing a target trajectory it is necessary to shorten the time less than the target seek time set here. This is because it is necessary to have time (settling time) for checking the fluctuation in position after seeking. Also, as in the table example shown in FIG. 31, the same target seek time may be selected for a plurality of tracks at one time instead of in 1 track units. The seek time is in units of the sample period of the current output. Therefore, it is possible for a plurality of distances to have the same seek time.

Particularly, since the track width for recent HDD is μm or less, one track of an older HDD is equal to 10 or more tracks of a recent HDD. Taking this into consideration it is reasonable that the same seek time can be used for a plurality of distances. For example the tracks can be separated 4-track units: 0 to 4, 5 to 8, 9 to 12 and 13 to 16. In this example up to 16 tracks are used, however it is possible to design for distances greater than this.

Next, the maximum current is set. This is for setting the maximum current that can flow from the current amp. In addition, since the acceleration constant for the actuator differs depending on the location and temperature, it is necessary to make allowances for that amount. Moreover, it is necessary to make allowances for the amount of current needed for correcting the steady-state bias and eccentricity. Therefore, 100% of the maximum current that can be output cannot be used when designing the seek trajectory. It is necessary to reduce it by at least 20%.

It is possible with some current amps to switch the current output range to 1×, ½×, 1.4× and ⅛×. When switching the output range, the gain and the current offset differ a little for each range. Therefore, for the seek trajectory provided here, it is better that the output range not be switched during seeking. The maximum current is limited by the output range of the current amp.

Next, the FIR filter 51 in FIG. 36 is set. In other words, the FIR filter for suppressing the resonant frequency component is set. The FIR filter mainly has notch-filter characteristics. The frequency range to be suppressed is determined by combining several notch filters. When doing this, the resonance characteristics, current amp characteristics and other filter characteristics are designed together.

The more frequencies to be suppressed by this FIR filter, the longer the seek time becomes. This is because the time for the filter output signal becomes longer. Therefore, it is better that the filter be set such that the number of frequencies to be suppressed for a short distance is small, and the number of frequencies to be suppressed for a long distance is large.

Residual vibration that accompanies the resonance effect becomes large as the seeking distance becomes long and the seeking time becomes short. Therefore, there are cases when it is okay to have a small number of frequencies to be suppressed for a short distance. The seek time should be adjusted while actually performing simulation.

An example of the design for the FIR filter is shown in FIG. 39. Here, the filter only corresponds to the resonant frequency near 5.8 kHz. Also, the resonant frequency changes depending on the temperature and material differences. Therefore, a wide range of frequencies are suppressed by combining two notch filters.

Each of the models 51 to 58 are designed in this way to form a trajectory design simulation model such as shown in FIG. 36. The individual models described above are combined together.

Next, the designs of the position trajectories 30, 36 are explained using FIG. 40 and FIG. 41. A rectangular wave, as shown in FIG. 40, is supplied to the FIR filter 51 from the rectangular wave generator 50 shown in FIG. 36. As shown in FIG. 40, the current is set by supplying an acceleration/deceleration waveform.

The waveform (instruction current in FIG. 36) after passing the FIR filter 51, and the length of the input waveform (rectangular wave) of the rectangular wave generator 50 is adjusted until the length fits within the specifications for the target seek time. When doing this, when the effect due to resonance that is not suppressed by the FIR filter is large, and the residual vibration cannot be ignored, then the length of the trajectory is increased.

After that, the height of the rectangular wave is adjusted so that it matches the target distance. FIG. 41 shows the current, velocity and position of the position trajectory. In other words, it is an example of the instruction current, velocity and position output after the model in FIG. 36 has been adjusted.

Next, the design of the velocity trajectories 31, 38 will be explained using FIG. 42 to FIG. 45.

Figure 42:
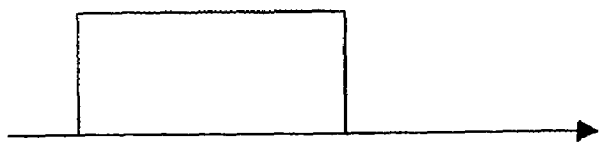
FIG. 42 is a drawing explaining the rectangular waveform of the velocity trajectory generation in FIG. 36.

The velocity trajectories use a FIR filter 51 that is the same as that used in the design of the position trajectories. The rectangular wave shown in FIG. 42 is supplied to this FIR filter 51 from the rectangular wave generator 50 in FIG. 36.

Figure 43:
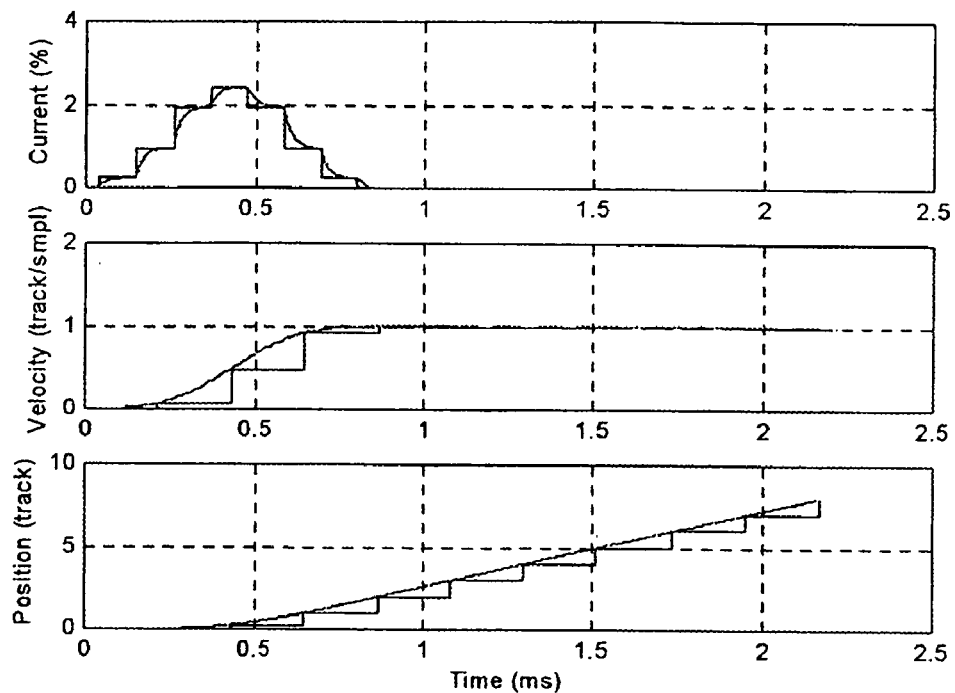
FIG. 43 is a drawing explaining the velocity trajectory generation in FIG. 36 (1/3).

The velocity after the rectangular wave in FIG. 36 has been supplied is observed, and a wave height of the rectangular wave, that makes it possible to generate a velocity of 1 track/sample, is found. FIG. 43 is an example of the instruction current, velocity and position output after the model in FIG. 36 has been adjusted at that time.

Figure 44:
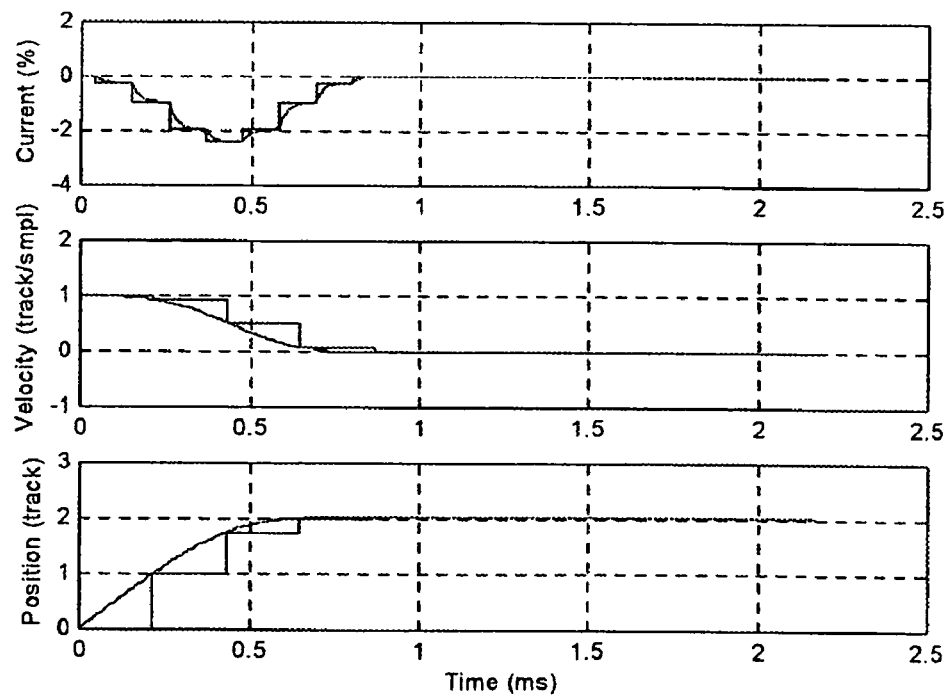
FIG. 44 is a drawing explaining the velocity trajectory generation in FIG. 36 (2/3).

Next, in order to suppress the velocity to '0' when the actuator moves at the velocity of 1 track/sample, the inverse (code inverted) signal of the aforementioned rectangular wave is supplied to the FIR filter 51 from the rectangular wave generator 50. FIG. 44 is an example of the instruction current, velocity and position output after the model in FIG. 36 has been adjusted at that time.

As shown by the position characteristics in FIG. 44, the position moves at that time. The amount that the position moves is made to return to '0' by the position trajectory waveform that was designed in FIG. 41.

Figure 45:
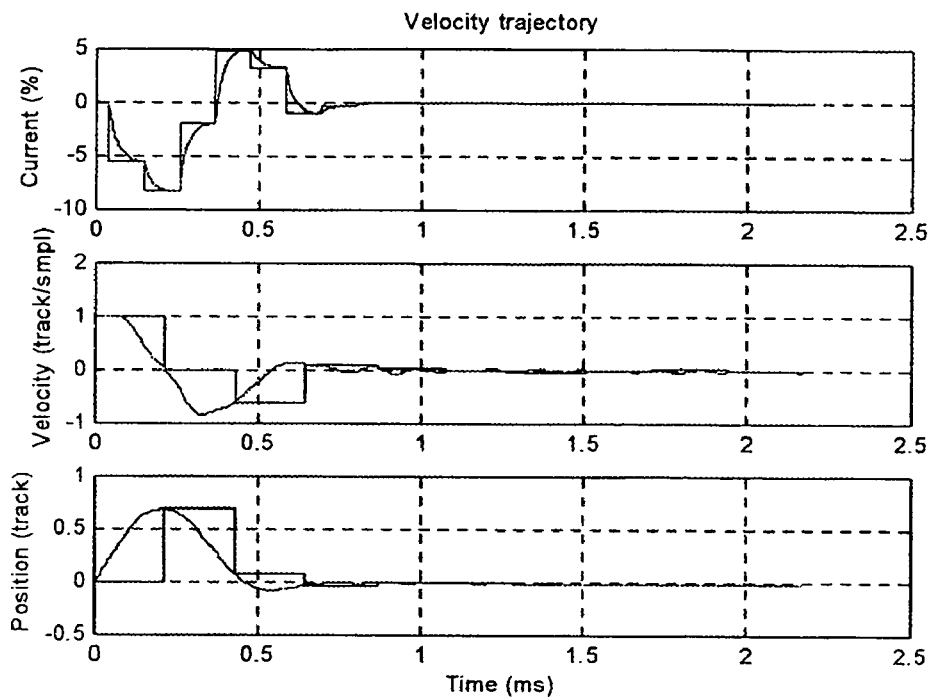
FIG. 45 is a drawing explaining the velocity trajectory generation in FIG. 36 (3/3).

The position trajectory waveform in FIG. 41 is multiplied by '2', and the inverted waveform is added to the waveform in FIG. 44. By doing this, as shown in FIG. 45, a combined waveform becomes the velocity trajectory for initial position '0', initial velocity '1', end position '0' and end velocity '0'.

Designed as described above, trajectories are found that correspond to the initial position and initial velocity. In the example in FIG. 31, both the position trajectory and velocity trajectory use current and position.

In this way, the trajectory is divided into a position trajectory and velocity trajectory. In other words, divided into the trajectory (position trajectory) when the initial position is track '1' and the initial velocity is 0 track/sample, and the trajectory (velocity trajectory) when the initial position is 0 track and the initial velocity is 1 track/sample. Also, the trajectory when the initial position is track 'X0' and the initial velocity is V0 tracks/sample is a combination of two trajectories that are multiplied by the gains X0 and V0. In this way, it is possible to obtain a trajectory for an arbitrary initial position and initial velocity by combining one unit trajectory.

By doing this, it is possible to design a trajectory for which the initial conditions are track '1' and initial velocity of 0 track/sample, and the end conditions are track '0' and 0 track/sample, and a trajectory for which the initial conditions are track '0' and initial velocity of 1 track/sample, and the end conditions are track '0' and 0 track/sample.

[Example of Trajectory Design]

Figure 46:
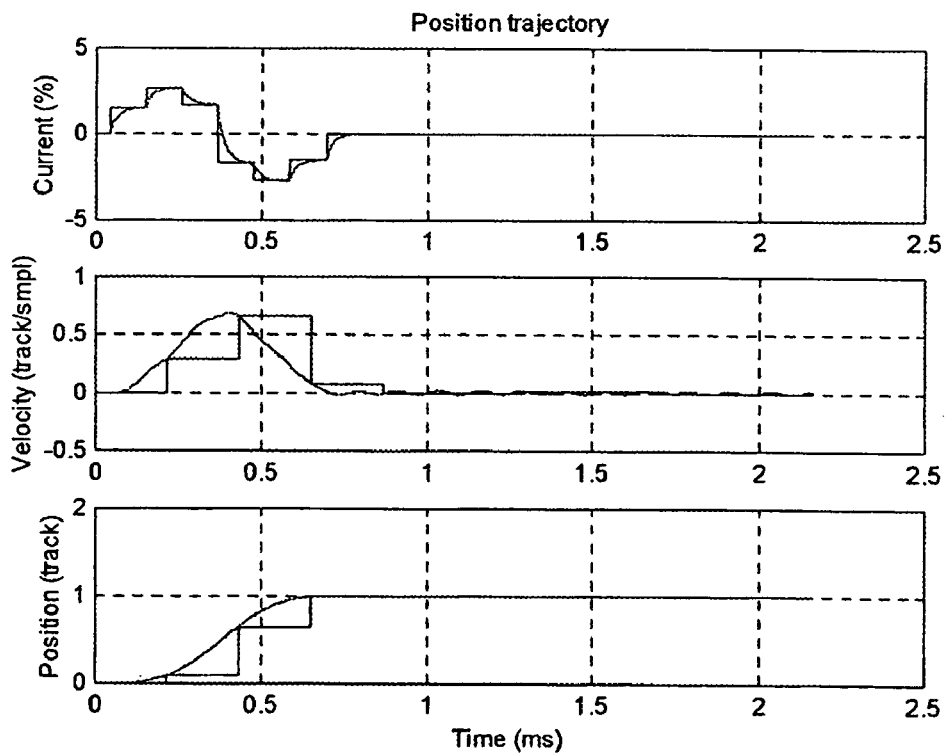
FIG. 46 is a drawing explaining an example of the design trajectory for the 0 to 4 track seek in FIG. 36 (1/2).
Figure 47:
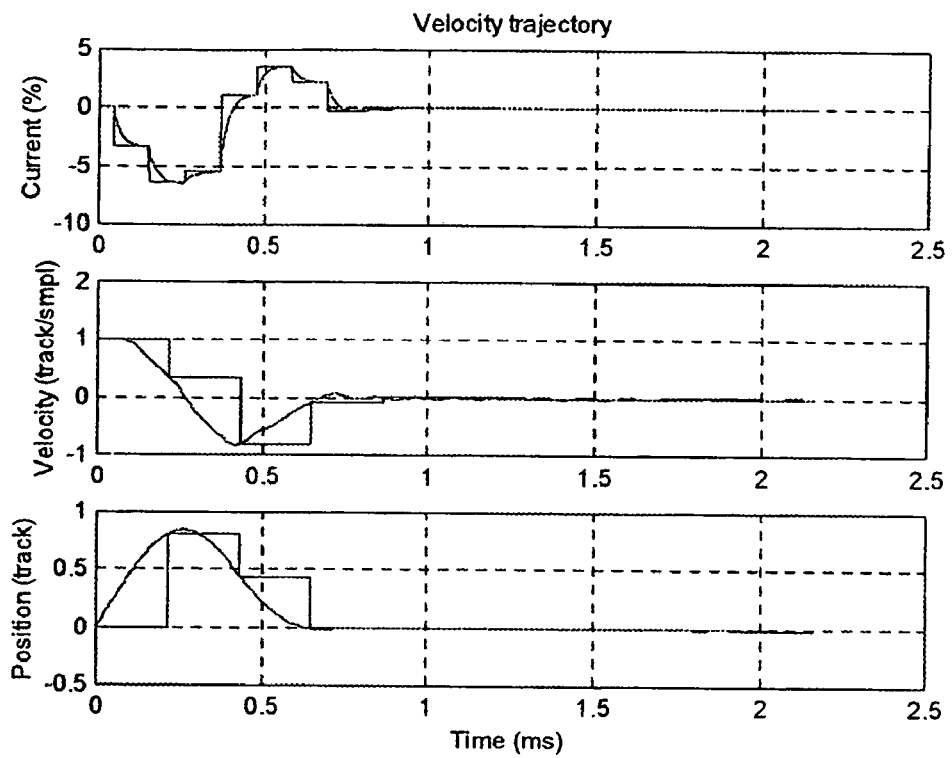
FIG. 47 is a drawing explaining an example of the design trajectory for the 0 to 4 track seek in FIG. 36 (2/2).
Figure 48:
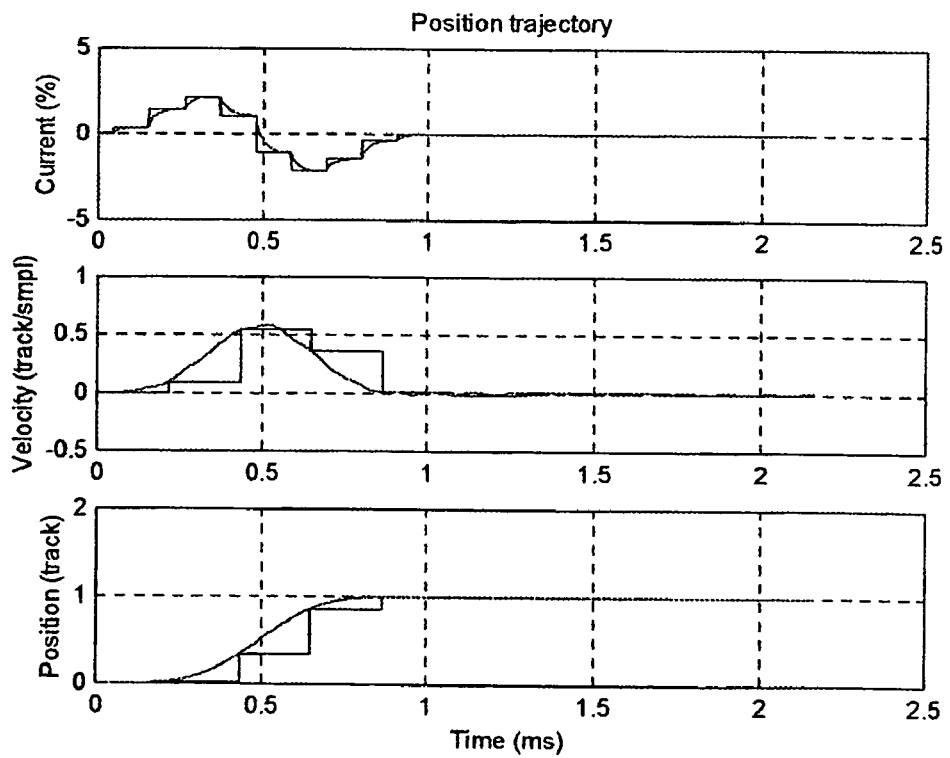
FIG. 48 is a drawing explaining an example of the design trajectory for the 5 to 8 track seek in FIG. 36 (1/2).
Figure 49:
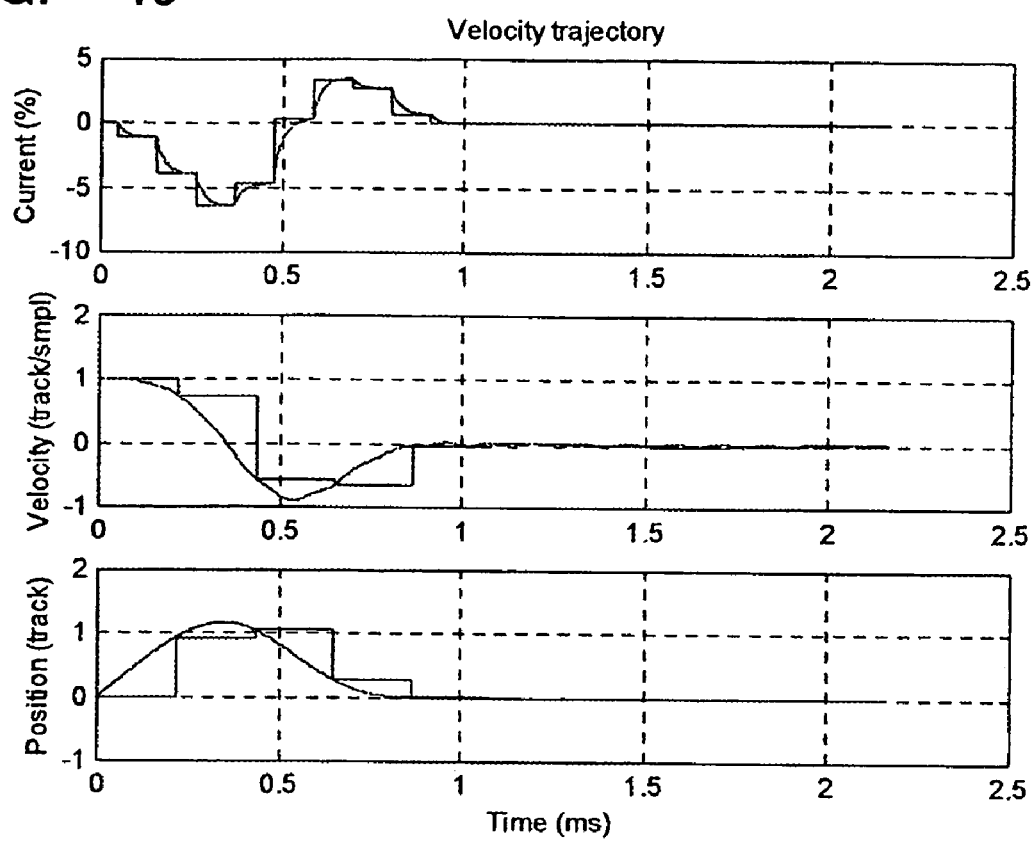
FIG. 49 is a drawing explaining an example of the design trajectory for the 5 to 8 track seek in FIG. 36 (2/2).
Figure 50:
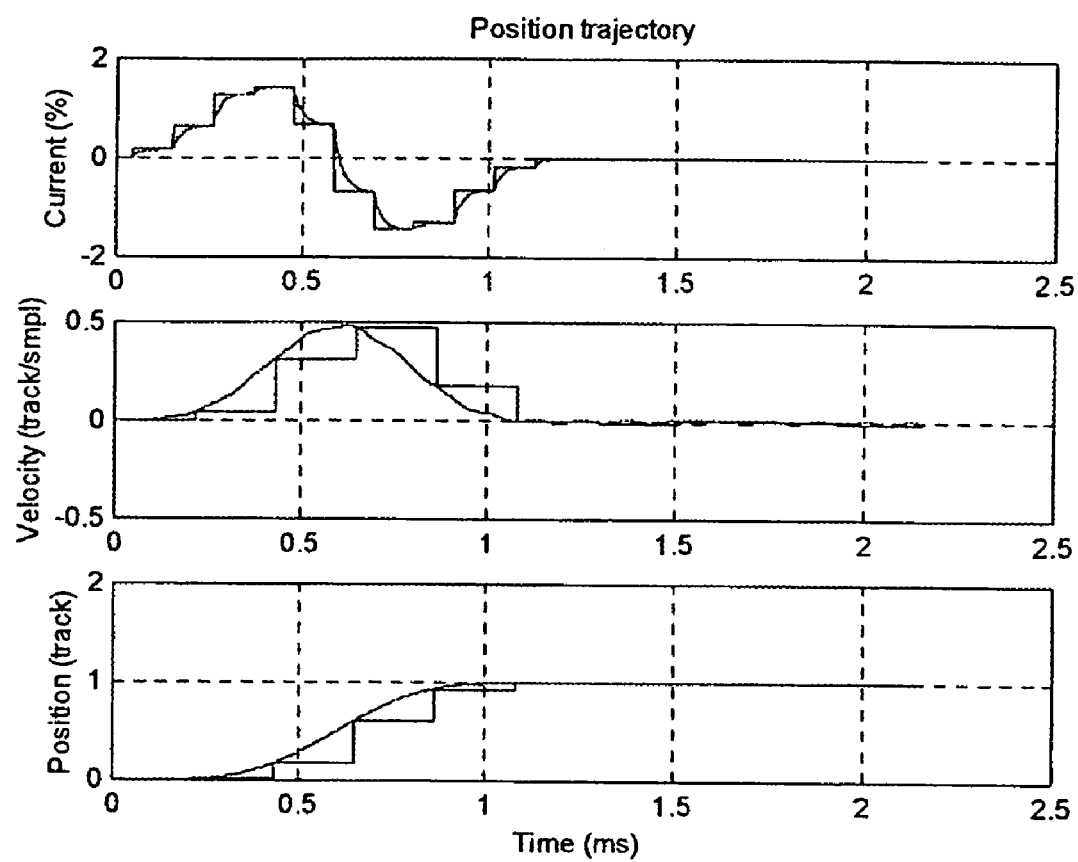
FIG. 50 is a drawing explaining an example of the design trajectory for the 9 to 12 track seek in FIG. 36 (1/2).
Figure 51:
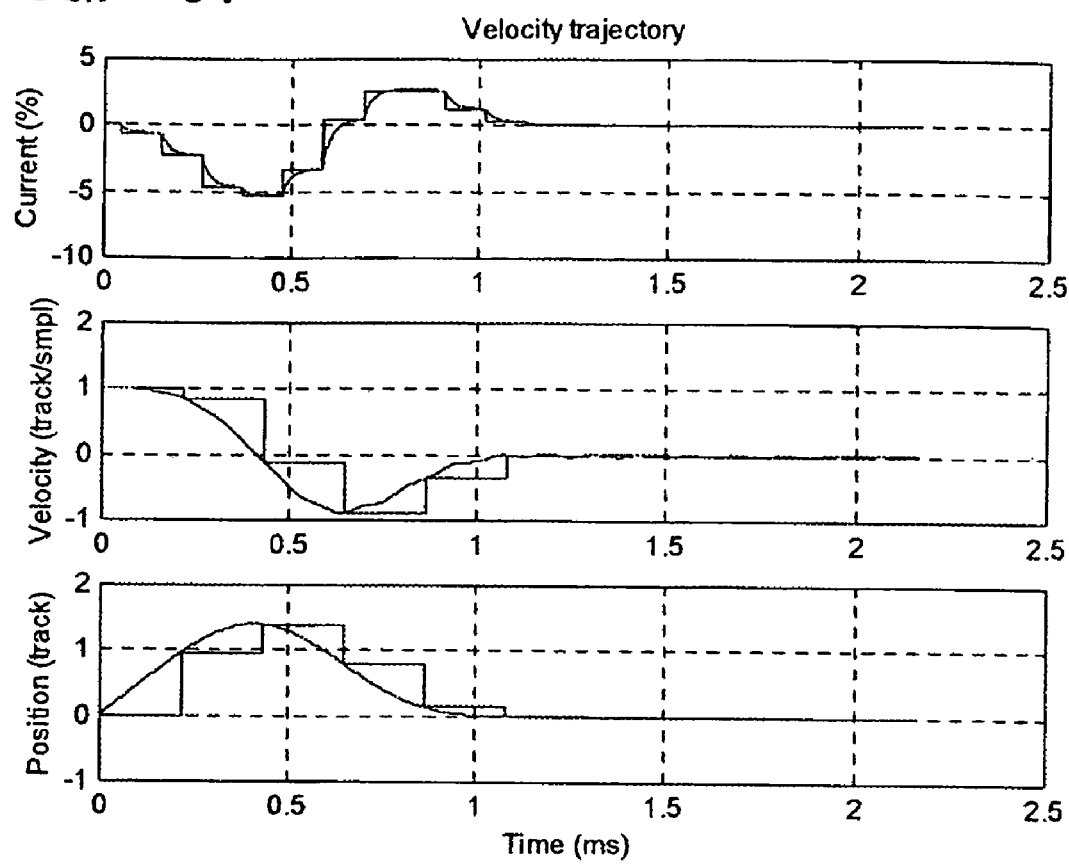
FIG. 51 is a drawing explaining an example of the design trajectory for the 9 to 12 track seek in FIG. 36 (2/2).
Figure 52:
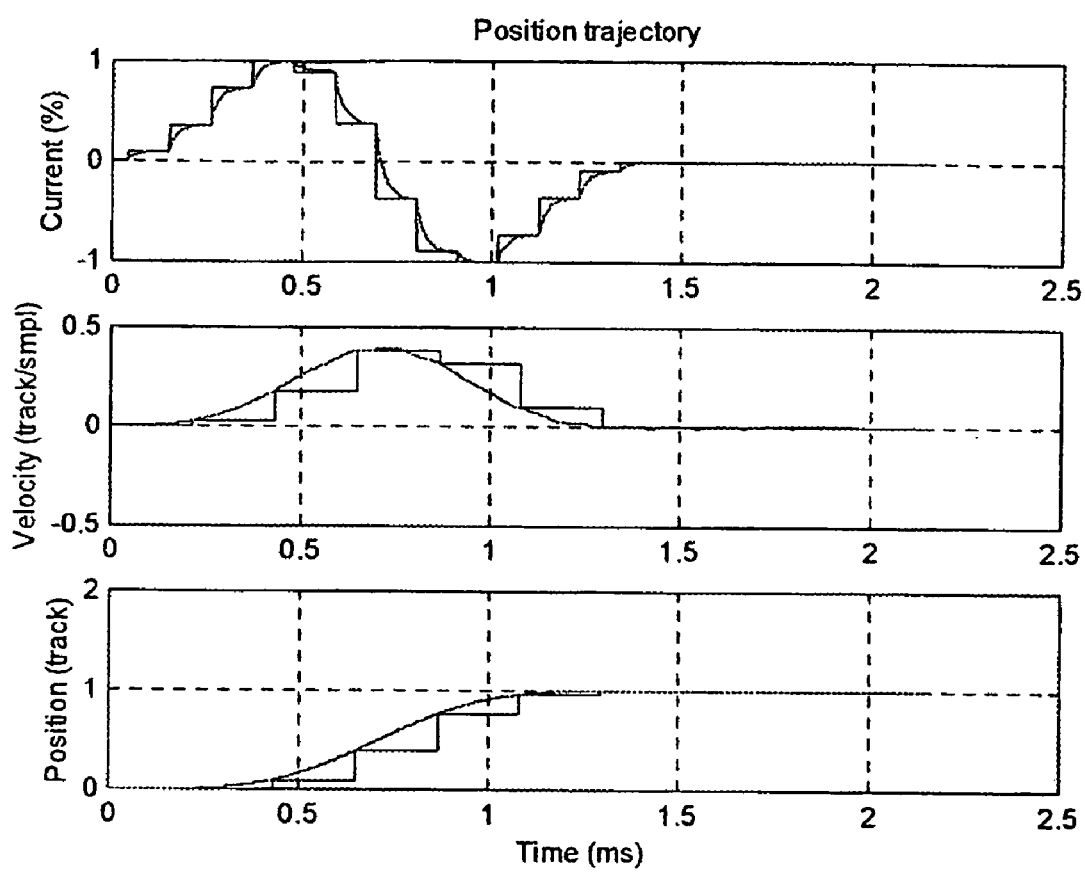
FIG. 52 is a drawing explaining an example of the design trajectory for the 13 to 16 track seek in FIG. 36 (1/2).
Figure 53:
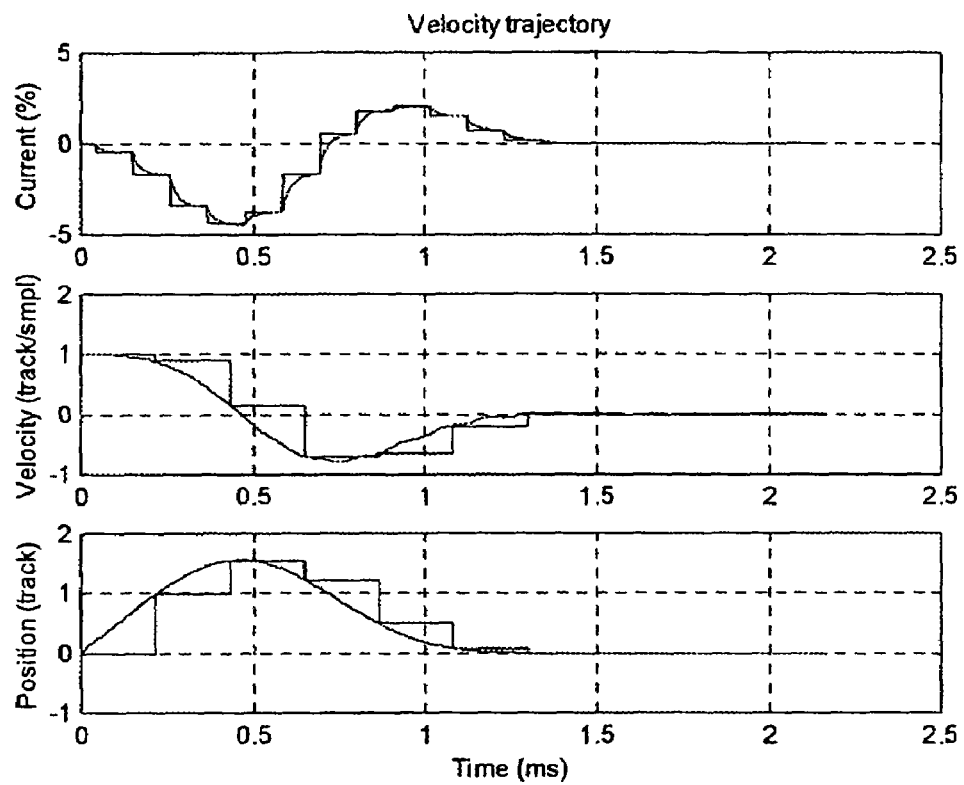
FIG. 53 is a drawing explaining an example of the design trajectory for the 13 to 16 track seek in FIG. 36 (2/2).

FIG. 46 and FIG. 47 show an example of the trajectories for the initial position and initial velocity of the distance from track '0' to '4'; FIG. 48 and FIG. 49 show an example of the trajectories for the initial position and initial velocity of the distance from track '5' to '8'; FIG. 50 and FIG. 51 show an example of the trajectories for the initial position and initial velocity of the distance from track '9' to '12'; and FIG. 52 and FIG. 53 show an example of the trajectories for the initial position and initial velocity of the distance from track '13' to '16'.

Each of the above is a design example for a 2.5-inch HDD, and where the current is normalized by the maximum current. In this way position and velocity trajectories that are capable of obtaining the shortest convergence according to the seeking distance are designed and set in the tables 61-1 to 61-4. Similarly, position and velocity trajectories for settling control are set as shown in FIG. 14 to FIG. 17 and set in table 60.

Figure 54:
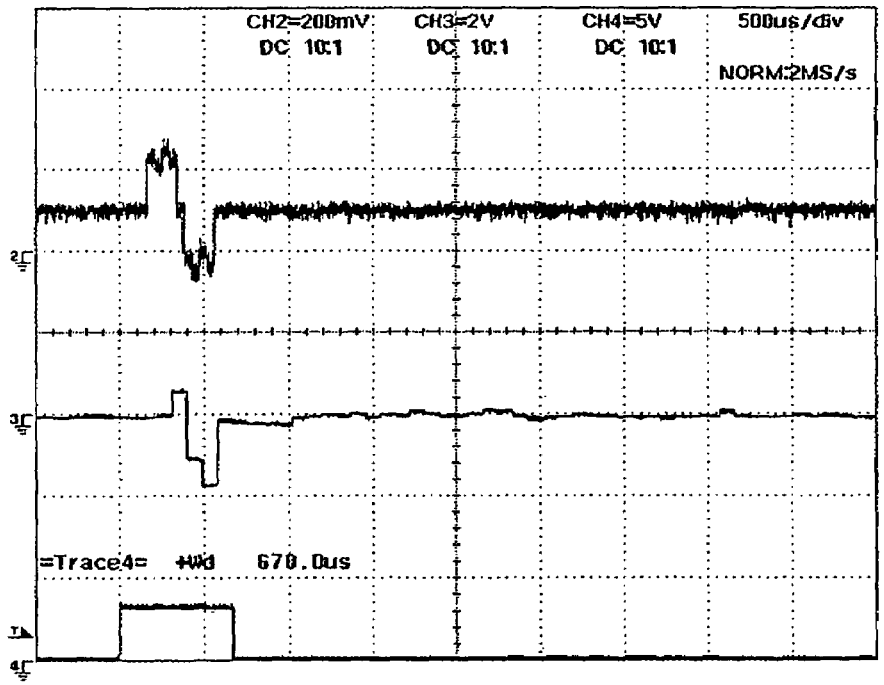
FIG. 54 is a drawing explaining an experiment example of another embodiment of the invention (1/2).
Figure 55:
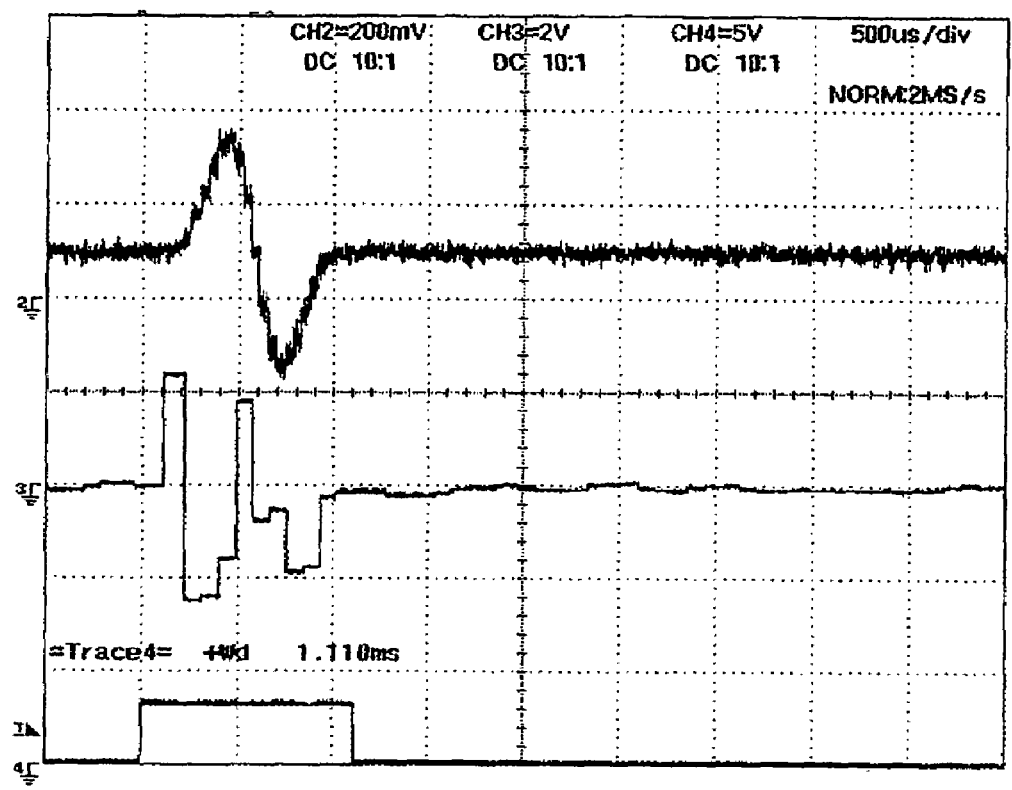
FIG. 55 is a drawing explaining an experiment example of another embodiment of the invention (2/2).
Figure 56:
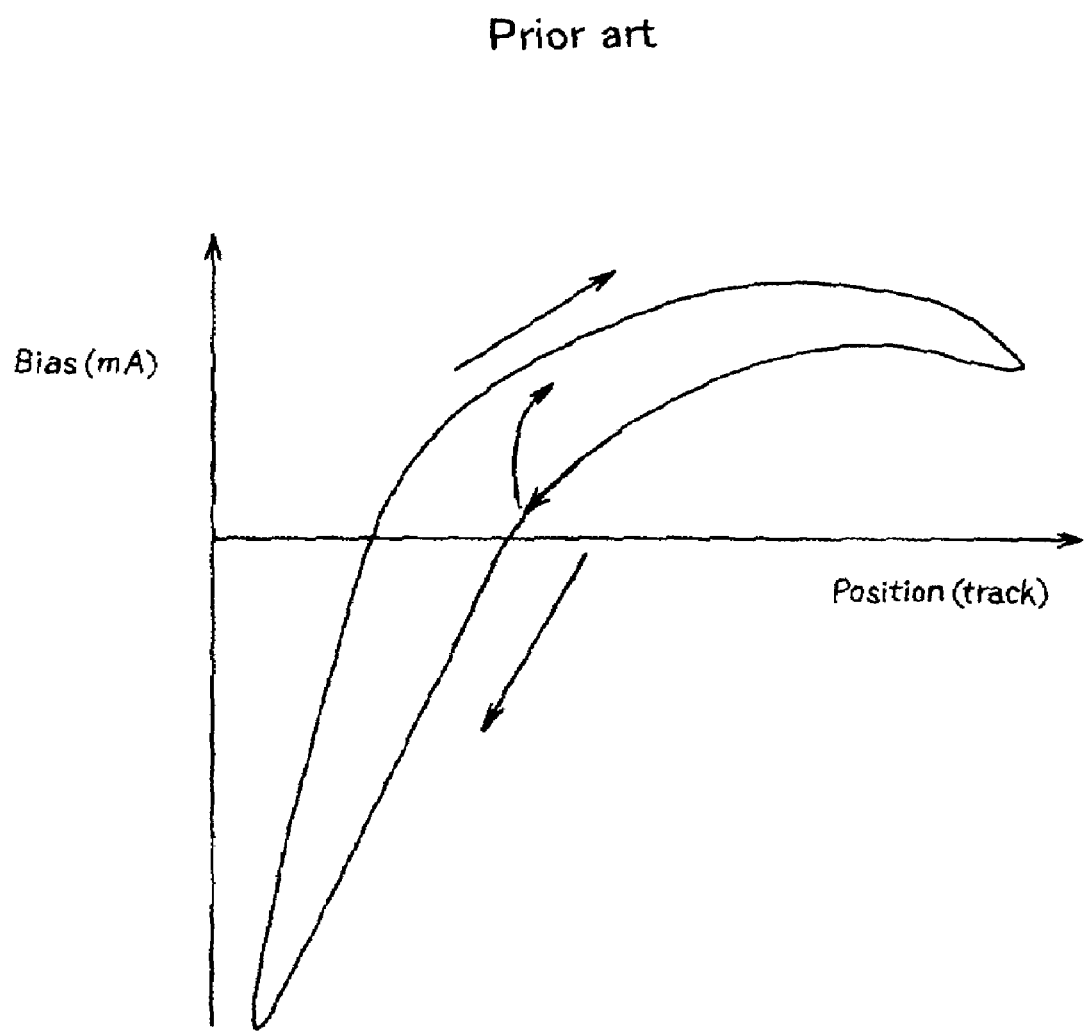
FIG. 56 is a drawing of the steady-state bias characteristics.

FIG. 54 and FIG. 55 are drawings of test example of trajectory control for short-distance seek. FIG. 54 shows from the top down the instruction current, position error from the target position, and seek status signal for 4-track seek, where the 4-track seeking ends after approximately 1 ms, and FIG. 55 shows from the top down the instruction current, position error from the target position, and seek status signal for 15-track seek, where the 15-track seeking ends after approximately 1.5 ms.

In this way, feed-forward control that takes velocity into consideration during short-distance seeking is performed so high-speed response is possible. Moreover, when designing the trajectories, the resonance effects as well as the current amp characteristics are taken into consideration so high-speed response is possible even though feed-forward control is performed.

OTHER EMBODIMENT

In addition to the embodiments described above, the invention can be changed as follows:

(1) In the embodiments described above, the bias value was estimated for 1 sample just before starting settling control. In this method, when there are errors in the position signal for 1 sample, or when there is a shift in the position signal and it is written to the disk, there is a possibility that the estimation error will be large. Therefore, it is possible to estimate the bias value for a plurality of samples and take the average value to be the initial value.

(2) When the estimated bias value changes, there are large fluctuations in the position after seeking, and the settling time become longer. By monitoring the settling time, it is possible to determine when the shift in the estimated value becomes large. The shift in the estimated bias value occurs due to a shift in the estimation gain Kb in equation (8). This gain Kb changes according to the power constant B1 of the actuator. In addition, when monitoring the settling time and it is found that the settling time has become longer, then it can be determined that the gain has shifted, and it is possible to perform a process to measure the gain.

(3) It is possible to determine the gain of the program for the disk drive, based on the value that was simulated by the simulation program of the computer that uses position error to estimate the bias value and correct the velocity.

(4) Instead of the aforementioned computer simulation, following control can be performed by the firmware of the disk drive to measure the bias value. Next, the same control as that during seek is performed to cause a little position shift to occur, and that position shift and velocity shift are measured. It is possible to measure the bias correction gain, and velocity shift correction gain from the amount of position shift. By using this method, it is not necessary to redesign the bias estimation gain and velocity correction gain each time the design of the control system is changed. The value can be measured once and stored in a non-volatile memory area such as on a disk or in ROM.

(5) There are other causes for position error besides the bias value. For example, an external vibration. When there is external vibration, the estimated bias value (initial value) becomes uncertain. When the estimated bias value becomes uncertain, there is a possibility of running wild. Therefore, when the value of the shock sensor installed in the HDD is larger than a reference value, external vibration is determined to be large, and so the bias value is not estimated or the estimated gain is lowered. Moreover, when positioning precision is poor during normal following control, it can be assumed that there is large external vibration, and so similarly, the bias value is not estimated or the estimated gain is lowered. Furthermore, the normal positioning precision is +−5 to 10% with respect to the track width. When the estimation error is within this range, then it is not possible to determine whether the position error is due to a shift in the bias value, motor vibration or unstable writing of the position signal. Therefore, when the position error is within this range, the bias value is not estimated or the estimated gain is lowered.

(6) As mentioned above, by supplying a target track during settling, a high-speed response is possible. In this case, it is possible to supply only the initial position track or the initial velocity track. When supplying only the initial position track, it is presumed that the velocity is sufficiently small. Moreover, when supplying only the initial velocity track, the velocity is large so it is effective when it is supposed that overshooting will occur as is.

(7) It is possible to speed up the track response to the position and velocity. For example, suppose the track for the initial position is 1.5 ms and the track for the initial velocity is 1 ms. The position can be observed directly, however the velocity can only be estimated. Therefore, errors accompany the estimated velocity, so the correction of the initial velocity is speeded up in order that the position can reach the target when the shift due to velocity error converges. This makes it possible to reduce effects caused by the velocity error.

(8) As described above, the method for generating trajectories designs a track from which the actuator resonance has been removed. However, when there is already a filter in the circuitry of the disk drive such that the actuator resonance component is sufficiently removed, it is not necessary to remove the resonant frequency component included in the trajectory.

(9) Track design can be performed by using computer simulation. When there is a shift in the computer response and the actual response, the response can be corrected. For example, the position trajectory and velocity trajectory are corrected when calibrating the drive. The amplitude of the current is adjusted such that at an initial velocity of 0, it flows for 1 track, so the distance moved becomes 1 track. Furthermore, the position error from the target track for that time is found, and the target track itself is corrected just the amount of the position error. The position trajectory is corrected in this way. Next, the velocity trajectory is corrected. The amplitude of the current of the velocity trajectory is corrected just the amount of the gain corrected by the position track. Next, at a velocity of 1 track/sample, constant velocity seeking is performed, and the position at the start of measurement is taken to be the target position, and the velocity track is given making it converge at the target position. The position error at that time is measured and the position trajectory of the trajectory for the initial velocity can be corrected just the amount of position error.

(10) When switching to settling control, it is possible to wait for the transition timing to settling control until the current that flows after switching converges to within a specified range. When the current becomes large, unexpected high-frequency resonance occurs during simulation, so waiting makes it possible to avoid this effect.

(11) During coarse control, it is possible to estimate the bias value in real time, and estimate the real position and real velocity, and according to those values, switch from coarse control to settling control. The real velocity is estimated instead of the observer estimated position, and control is switched to settling control at that velocity. This makes it possible to avoid moving in the reverse direction, the velocity becoming 0, or never coming close to the target position.

(12) It is possible to constantly observe the difference between the observed position and estimated position, and when the fluctuation of that position error is within a predetermined range, the bias value is determined to be correctly estimated, and control is switched to settling control.

The preferred embodiments of the present invention have been explained, however the invention is not limited to these embodiments and can be embodied in various forms within the scope of the present invention.

As described above, this invention has the following effects.

(1) In control in which integral compensation and bias compensation are not performed, the difference between the detected position and the estimated position is proportional to the bias value, so the initial bias value at the start of settling can be calculated from the difference between the detected position and estimated position in control in which integral compensation and bias compensation are not performed. Therefore, even when there are differing bias values for the same target position, the initial bias value for settling control, in which integral compensation or bias compensation are performed, is accurately set. This makes it possible to reduce the time for correcting the bias shift during settling control, and to greatly reduce the time required for settling control.

(2) Moreover, since the initial bias value for settling control that performs integral compensation or bias compensation is accurately set, it is possible to prevent fluctuation in the seek time.

(3) Feed-forward control is performed during short-distance seeing and/or settling control so high-speed response is possible. Moreover, the initial velocity is also used in addition to the initial position as a parameter for generating trajectories, so feed-forward control that is capable of shortening the convergence time is possible even though the initial velocity differs.

What is claimed is:

1. A head positioning control method for a storage device for positioning a head at a specified location on a storage medium and comprising:
    a step of generating a position trajectory and feed-forward current based on a current position and current velocity of said head; and
    a step of supplying said position trajectory and feed-forward current to a feedback control system that calculates the amount of control according to a position error between said current position and a target position of said head,
    wherein said generating step further comprises a step of generating the position trajectory and feed-forward current based on an estimated position and an estimated velocity obtained by an observer control system, and
    wherein said feedback control system includes said observer control system.

2. The head positioning control method of claim 1 wherein said supply step comprises:
    a step of correcting said position error by said position trajectory; and a step of adding said feed-forward current to said control amount that is calculated by said feedback control system from said corrected position error.

3. The head positioning control method of claim 1 wherein said generation step is executed during seek of a relatively short distance.

4. The head positioning control method of claim 1 wherein said generation step is a step that is executed during settling control when seeking over a relatively long distance.

5. The head positioning control method of claim 1 wherein said generation step comprises:
    a step of generating said position trajectory and feed-forward current based on current position and current velocity of said head according to said seek distance.

6. A head positioning control method for a storage device for positioning a head at a specified location on a storage medium, comprising:
    a step of generating a position trajectory and feed-forward current based on a current position and current velocity of said head; and
    a step of supplying said position trajectory and feed-forward current to a feedback control system that calculates the amount of control according to a position error between said current position and a target position of said head,
    wherein said generation step comprises:
    a step of multiplying a unit position trajectory by said current position trajectory to generate said position trajectory; and
    a step of multiplying a unit velocity trajectory by said current velocity to generate said feed-forward current.

7. A head positioning control device for a storage device for driving an actuator to position a head at a specified location on a storage medium and comprising:
- a detection means for detecting a current position of said head; and
- a control means that performs seek control of said actuator based on said detected position,
- wherein said control means generates a position trajectory and feed-forward current based on a current position and current velocity of said head, and supplies said position trajectory and feed-forward current to a feedback control system that calculates the amount of control according to a position error between said current position and a target position of said head, and
- wherein said control means further comprises an observation means and generates the position trajectory and feed-forward current based on an estimated position and an estimated velocity of said observation means.

8. The head positioning control device of claim 7 wherein said control means corrects said position error by said position trajectory, and adds said feed-forward current to said control amount that is calculated by said feedback control system from said corrected position error.

9. The head positioning control device of claim 7 wherein said control means executes said supply when seeking over a relatively short distance.

10. The head positioning control device of claim 7 wherein said control means executes said supply during settling control when seeking over a relatively long distance.

11. The head positioning control device of claim 7 wherein said control means generates said position trajectory and feed-forward current based on the current position and current velocity of said head according to said seeking distance.

12. A head positioning control device for a storage device for driving an actuator to position a head at a specified location on a storage medium comprising:
- a detection means for detecting a current position of said head; and
- a control means that performs seek control of said actuator based on said detected position,
- wherein said control means generates a position trajectory and feed-forward current based on a current position and current velocity of said head, and supplies said position trajectory and feed-forward current to a feedback control system that calculates the amount of control according to a position error between said current position and a target position of said head, and
- wherein said control means multiplies a unit position trajectory by said current position to generate said position trajectory, and multiplies a unit velocity trajectory by said current velocity to generate said feed-forward current.

* * * * *